United States Patent [19]
Nomura

[11] Patent Number: 5,933,189
[45] Date of Patent: Aug. 3, 1999

[54] SOLID STATE IMAGE PICKUP APPARATUS

[75] Inventor: Hitoshi Nomura, Kawasaki, Japan

[73] Assignee: Nikon Corporation, Tokyo, Japan

[21] Appl. No.: 08/611,826

[22] Filed: Mar. 6, 1996

[30] Foreign Application Priority Data

| Mar. 9, 1995 | [JP] | Japan | 7-077123 |
| Mar. 14, 1995 | [JP] | Japan | 7-080849 |
| Mar. 14, 1995 | [JP] | Japan | 7-080850 |
| Mar. 14, 1995 | [JP] | Japan | 7-080851 |
| Aug. 15, 1995 | [JP] | Japan | 7-229683 |

[51] Int. Cl.$^6$ .............. H04N 3/14; H04N 5/335
[52] U.S. Cl. .......... 348/302; 348/241; 348/308
[58] Field of Search ................ 348/241, 243, 348/302, 303, 304, 305, 306, 307, 308, 309, 310

[56] References Cited

U.S. PATENT DOCUMENTS

| 4,809,075 | 2/1989 | Akimoto et al. | 358/213.18 |
| 4,819,070 | 4/1989 | Hynecek | 358/213.11 |
| 4,942,474 | 7/1990 | Akimoto et al. | 358/213.11 |
| 5,134,488 | 7/1992 | Suaer . | |
| 5,162,912 | 11/1992 | Ueno et al. | 358/213.16 |
| 5,276,521 | 1/1994 | Mori | 358/213.31 |

*Primary Examiner*—Wendy Garber
*Assistant Examiner*—Christopher Onuaku
*Attorney, Agent, or Firm*—Foley & Lardner

[57] ABSTRACT

A solid-state image pickup device which enables an improvement in the S/N ratio of the video signal. The solid-state image pickup device has a current sample-and-hold means which stores either a current signal consisting of a first component which is responsive to the sum of the incident light and the dark output from a plurality of pixels at separate times or a current signal consisting of a second component which is responsive to the dark output, and a means for the purpose of sequentially reading out, to a horizontal read line, only a current signal consisting of a component that is responsive to the amount of incident light, this being obtained by means of a subsequent subtraction performed between the other of the first-component and second-component current signals and the current signal which has already been stored in the current sample-and-hold means.

3 Claims, 27 Drawing Sheets

SOLID STATE IMAGE PICKUP APPARATUS

BACKGROUND OF THE INVENTION

1. Field of the Invention

The present invention relates to a solid-state image pickup device (apparatus) which features low noise and fast operation.

2. Related Background Art

FIG. 1 is a schematic circuit diagram which shows the overall configuration of a general image pickup device (including the case of an amplifying type image pickup device). In the image pickup device shown in FIG. 1, for the purpose of the description to follow, the example shown is that of a 2-row-by-2-column matrix of 4 pixels, in which MOS static induction transistors (hereinafter referred to as MOSSITs or simply SIT transistors) $S_{101}$, $S_{102}$ $S_{201}$, and $S_{202}$ are used in a source-follower type signal reading system.

The sources of each of the SIT transistors $S_{101}$, $S_{102}$ $S_{201}$, and $S_{202}$ are connected in common to a vertical source lines (vertical read-out lines) 2a and 2b of each of columns of the matrix arrangement, the drains thereof being connected in common to the power supply voltage VDS. Each of the gate electrodes of the SIT transistors $S_{101}$, $S_{102}$ $S_{201}$, and $S_{202}$ are connected to the clock lines 20a and 20b, which are scanned by the vertical scanning circuit 4 for each of the rows in the matrix arrangement, the voltage drive pulses ΦG1 and ΦG2, which are sent by the vertical scanning circuit 4, providing drive in units of rows.

The vertical source lines 2a and 2b each have one end connected, via capacitors $CS_{1\ and\ CS2}$ for light signal output storage and via capacitors $CD_1$ and $CD_2$ for dark output storage, to MOS transistors $TS_1$ and $TS_2$, which are for transmitting an light signal output and to MOS transistors $TD_1$ and $TD_2$, which are for transmitting a dark output. These capacitors $CS_1$, $CS_2$, $CD_1$, and $CD_2$ are connected, via horizontal read selection MOS transistors $TH_{S1}$, $TH_{S2}$, $TH_{D1}$, and $TH_{D2}$, to the signal output line (horizontal read line) 16a and dark output line (horizontal read line) 16b.

In general, the signal output line 16a and the dark output line 16b have associated with them parasitic capacitances $C_{HS}$ and $C_{HD}$. One end of the signal output line 16a and the dark output line 16b is connected to the buffer amplifier 17b and 17a, respectively.

The other ends of the signal output line 16a and the dark output line 16b are connected respectively to the drains of the horizontal read MOS transistors $TR_{HS}$ and $TR_{HD}$ which reset the residual video signal. When a drive pulse signal ΦRSH sent from a drive pulse generating circuit 18 is supplied to the gate electrodes of these horizontal read MOS transistors $TR_{HS}$ and $TR_{HD}$ via a clock line 18a, the horizontal read MOS transistors $TR_{HS}$ and $TR_{HD}$ operate.

The gate electrodes of the horizontal read selection MOS transistors $TH_{S1}$ and $TH_{D1}$ and the gate electrodes of the horizontal read selection MOS transistors $TH_{S2}$ and $TH_{D2}$ are connected in common, respectively, to the horizontal selection signal line 19a and the horizontal selection signal line 19b, horizontal reading being controlled by the drive pulses ΦH1 and ΦH2 which are sent from the horizontal scan circuit 6.

A drive pulse ΦTS which is sent from the drive pulse generating circuit 14 is supplied, via an light signal line 14a, to each of gate electrodes of light signal output transmitting MOS transistors $TS_{1\ and\ TS2}$, and a drive pulse ΦTD which is sent from the drive pulse generating circuit 15 is supplied, via an light signal line 14b, to each of gate electrodes of dark output transmitting MOS transistors $TD_1$ and $TD_2$. By means of these drive pulses ΦTS and ΦTD, light signal output transmitting MOS transistors $TS_1$ and $TS_2$ and dark output transmitting MOS transistors $TD_{1\ and\ TD2}$ are alternately operated in a prescribed sequence.

One each of the vertical source lines 2a and 2b is connected at each column to the drains of the resetting MOS transistors $TR_{V1}$ and $TR_{V2}$ and also to the regulated power supplies 22a and 22b, the sources of each of the resetting MOS transistors $TR_{V1}$ and $TR_{V2}$ being connected to ground, and the power supplies 22a and 22b supplying the power supply voltage VC.

The gate electrodes of the resetting MOS transistors $TR_{V1}$ and $TR_{V2}$ are connected to the drive pulse generating circuit 21 via the clock line 21a. When the drive pulse ΦRSV, which is sent from the drive pulse generating circuit 21, is supplied to the gate electrodes of the resetting MOS transistors $TR_{V1}$ and $TR_{V2}$, these resetting MOS transistors $TR_{V1}$ and $TR_{V2}$ operate, the vertical source lines 2a and 2b, the light signal output storage capacitors $CS_1$ and $CS_2$, and the dark output storage capacitors $CD_1$ and $CD_2$ are reset.

SUMMARY OF THE INVENTION

To achieve the above-noted object, a solid-state image pickup device according to the present invention has a plurality of pixels which convert an electrical charge that is responsive to light incident thereupon to a current signal, these being arranged in a two-dimensional matrix, a plurality of vertical read lines which scan each row of pixels in the matrix arrangement of pixels sequentially in the column direction so as to sequentially extract a current signal from each of the pixels, and a horizontal read line which scans each column of pixels in the matrix arrangement of pixels sequentially in the row direction so as to sequentially extract a current signal from each of the pixels. Each of the vertical read lines is provided with a current sample-and-hold means for storing a current signal that is output from a scanned pixel to which it is connected thereto. Between each current sample-and-hold means and horizontal line is provided a switching means, whereby when scanning of each pixel of each row is performed, a current signal consisting of a first component, which is responsive to the sum of the amount of light incident to a pixel and the dark output, and a current signal which is responsive to the dark output are output separately at different times, one of the first-component current signal and the second-component current signal being stored in the current sample-and-hold means, after which a subtraction is performed between the other of the first-component current signal and the second-component current signal and the current signal which had already stored in the current sample-and-hold means, thereby obtaining a current signal having only a component which is responsive to the amount of incident light, this being sequentially read out to the horizontal read line.

In another solid-state image pickup device according to the present invention, a current-stabilizing means is further provided between a plurality of pixels and a sample-and-hold means, this current-stabilizing means acting to limit the variation of the value of the current signal which is output from a pixel.

Yet another solid-state image pickup device according to the present invention includes a photoelectric conversion element which generates and stores an electrical charge in response to incident light, an amplifying element which generates an electrical current responsive to an electrical charge received in a control region, a transfer control element which selectively transfers an electrical charge, which is generated and stored in the photoelectric conversion element, to a control region of the amplifying element, and a resetting element for the purpose of selectively initializing the electrical charge in the control region of the amplifying element.

In yet another solid-state image pickup device according to the present invention, a means is included for the purpose of making the average voltage at the output terminal of the current-stabilizing means equal to a bias voltage which is applied to the output terminal of a horizontal read line.

A photoelectric conversion device according to the present invention has a photoelectric current amplification means which stores an electrical charge obtained by photoelectrically converting incident light, amplifies it, and outputs it as a current, a current-establishing means which causes a prescribed amount of bias current to flow, a current-adjusting amplifying element which is inserted between the photoelectric current amplification means and the current-establishing means, and a current-adjusting means, having a sample-and-hold function, which not only samples the output current from the photoelectric current amplification means but also adjusts and holds the bias condition of the current-adjusting amplifying element so that, when sampling is performed, the output current of the photoelectric current amplification means is equal to the bias current of the current-establishing means. One of the dark current immediately after resetting of the stored charge in the photoelectric current amplification means and the signal current stored in response to incident light is read, and the bias condition of the current-adjusting means is held so that the read out current is equal to the bias current of the current-establishing means, after which the other current is read, and the signal current is extracted at the connection point between the current-adjusting means and the current-establishing means.

It is desirable that the above-noted photoelectric current amplification means has a photoelectric conversion element, an amplifying element, a transfer element which transfers electric charge which is detected and stored by the photoelectric conversion element to a control electrode of the amplifying element, and a reset switching element which resets the electrical charge at the control region of the amplifying element. In this case, the current output from the amplifying element immediately after resetting of the electric charge of the control electrode by the switching element is read out, the electrical charge detected by the photoelectric conversion element passing through the transfer element and being transferred to the control electrode of the amplifying element, after which point the output is read as the signal current.

It is also desirable that the above-noted current-adjusting means have a current-adjusting amplifying element which is inserted between the photoelectric current amplification means and the current-establishing means, a capacitance, one end of which is connected to the control electrode of the current-adjusting amplification means and the other end of which is connected to ground, and a sampling switching element which is connected between the current output electrode and the control electrode of the current-adjusting amplifying element. In this case, when the sampling switching element is on, sampling operation is performed, and when the sampling switching element is off, holding operation is performed.

A solid-state image pickup device according to the present invention has a plurality of pixels which are arranged in a two-dimensional matrix in row and column directions, and each of which is formed by a photoelectric current amplification means which stores an electrical charge responsive to incident light, amplifies it, and outputs it as a current signal, a plurality of vertical read lines which scan each row of pixels in the matrix arrangement of pixels sequentially in the column direction so as to sequentially extract a current signal from each of the pixels, a horizontal read line which scans each column of pixels in the matrix arrangement of pixels sequentially in the row direction so as to sequentially extract a current signal from each of the pixels, a plurality of current-establishing circuits which are provided so as to correspond to each of the vertical read lines and which cause a prescribed bias current to flow, a plurality of current-adjusting circuits which are inserted between each vertical read line and corresponding current-regulating circuit, which include a current-adjusting amplifying element, and which adjust and hold the bias condition of the current-adjusting amplifying element so that the output current from a vertical read line in response to a prescribed sample command signal is equal to a prescribed bias current which is established by the current-adjusting amplifying element, and a plurality of horizontal read switching circuits which have a horizontal read switching element that reads the current signal at the connection between each current-adjusting circuit and current-establishing circuit sequentially to the horizontal read line for vertical read line.

In this case, it is desirable that each of the horizontal read switching circuits be on in complimentary fashion with the horizontal read switching elements, and have a second switching element for the purpose of causing current to flow in a vertical read line when reading is not being performed.

A plurality of read switches can also be provided so as to be connected between each of the vertical read line and the horizontal read line, these being off when sampling is being performed by the current-adjusting circuit, for the purpose of preventing the output current from a vertical read line from flowing into a horizontal read circuit during the sampling operation.

It is desirable that each of the pixels have a photoelectric conversion element, an amplifying element, a transfer element which transfers an electric charge which is detected and stored by the photoelectric conversion element to a control electrode of the amplifying element, and a switching element which resets the electrical charge of control electrode of the amplifying element. In this case, output of amplifying element immediately after resetting of the electrical charge of the control element is read out as the dark current, and the output after transfer of the electrical charge detected by the photoelectric conversion element via the transfer element to the amplifying element is read out as the signal current.

In addition, it is desirable that the current-adjusting amplification means have a current-adjusting amplifying element which is connected between the output of a pixel and a current-establishing circuit, a capacitance, one end of which is connected to the control electrode of the current-adjusting means and the other end of which is connected to ground, and a sampling switching element which is connected between a current output electrode and a control electrode of the current-adjusting element. In this case, when the sampling switching element is on, sampling operation is performed, and when the sampling switching element is off, holding operation is performed.

A solid-state image pickup device according to the present invention has a plurality of pixels which are arranged in a two-dimensional matrix in row and column directions, and each of which converts an electrical charge responsive to incident light to a voltage signal and outputs this signal, a plurality of vertical read lines which scan each row of pixels in the matrix arrangement of pixels sequentially in the column direction so as to sequentially extract a voltage signal from each of the pixels, and a horizontal read line which scans each column of pixels in the matrix arrangement of pixels sequentially in the row direction so as to sequentially extract a voltage signal from each of the pixels. A storage means is provided for each vertical read line, this storage means storing the voltage signal which is output from a pixel to which it is connected when the pixel is scanned, and these storage means being connected to a first switching means provided for the purpose of controlling the storage and resetting operations of all the storage means. This solid-state image pickup device is also provided with a voltage-to-current conversion means. With this voltage-to-current conversion means, by means of the first switching means and by performing sequential control of each pixel, a voltage signal consisting of a first component, which is responsive to the sum of the amount of light incident to a pixel and the dark output, and a voltage signal which is responsive to the dark output are output separately at different times, one of the first-component voltage signal and the second-component voltage signal being stored in the storage means, after which a subtraction is performed between the other of the first-component voltage signal and the second-component voltage signal and the voltage signal which had already stored in the storage means, thereby obtaining a current signal output having only a component which is responsive to the amount of incident light. Between each of the voltage-to-current conversion means and the horizontal read line is provided a second switching means for the purpose of sequentially reading the current signal to the horizontal read line.

In another solid-state image pickup device according to the present invention, a pixel includes a photoelectric conversion element which stores an electrical charge generated in response to incident light, an amplifying element which generates a voltage signal responsive to an electrical charge received from a control region, a transfer control element which selectively transfers an electrical charge, which is generated and stored in the photoelectric conversion element, to a control region of the amplifying element, and a resetting element for the purpose of selectively initializing the electrical charge in the control region of the amplifying element.

A solid-state image pickup device according to the present invention has a plurality of pixels which are arranged in a two-dimensional matrix in row and column directions, and each of which converts an electrical charge responsive to incident light to a voltage signal and outputs this signal, a plurality of vertical read lines which scan each row of pixels in the matrix arrangement of pixels sequentially in the column direction so as to sequentially extract a voltage signal from each of the pixels, and a horizontal read line which scans each column of pixels in the matrix arrangement of pixels sequentially in the row direction so as to sequentially extract a voltage signal from each of the pixels. A first storage means is provided for each vertical read lines, this first storage means storing the voltage signal which is output from a pixel to which it is connected when the pixel is scanned, and this first storage means being connected to a first switching means provided for the purpose of controlling the storage and resetting operations of all the storage means. This solid-state image pickup device is also provided with a voltage-to-current conversion means. With this voltage-to-current conversion means, by means of the first switching means and by performing sequential control of each pixel, a voltage signal consisting of a first component, which is responsive to the sum of the amount of light incident to a pixel and the dark output, and a voltage signal which is responsive to the dark output are output separately at different times, one of the first-component voltage signal and the second-component voltage signal being stored in the storage means, after which a subtraction is performed between the other of the first-component voltage signal and the second-component voltage signal and the voltage signal which had already stored in the first storage means, thereby obtaining a current signal output having only a component which is responsive to the amount of incident light. At the output side of each voltage-to-current conversion means a current storage means is provided, which stores a characteristics offset current of the voltage-to-current conversion means. Between each of the voltage-to-current conversion means and the horizontal read line is provided a second switching means for the purpose of sequentially reading to the horizontal read line a current signal derived by a subtraction performed between a current signal which is the sum of the current signal and the offset current and the offset current which is stored in the storage means.

In another solid-state image pickup device according to the present invention, a pixel includes a photoelectric conversion element which stores an electrical charge generated in response to incident light, an amplifying element which generates a voltage signal responsive to an electrical charge received from a control region, a transfer control element which selectively transfers an electrical charge, which is generated and stored in the photoelectric conversion element, to a control region of the amplifying element, and a resetting element for the purpose of selectively initializing the electrical charge in the control region of the amplifying element.

DESCRIPTION OF THE PREFERRED EMBODIMENTS

Figure 1:
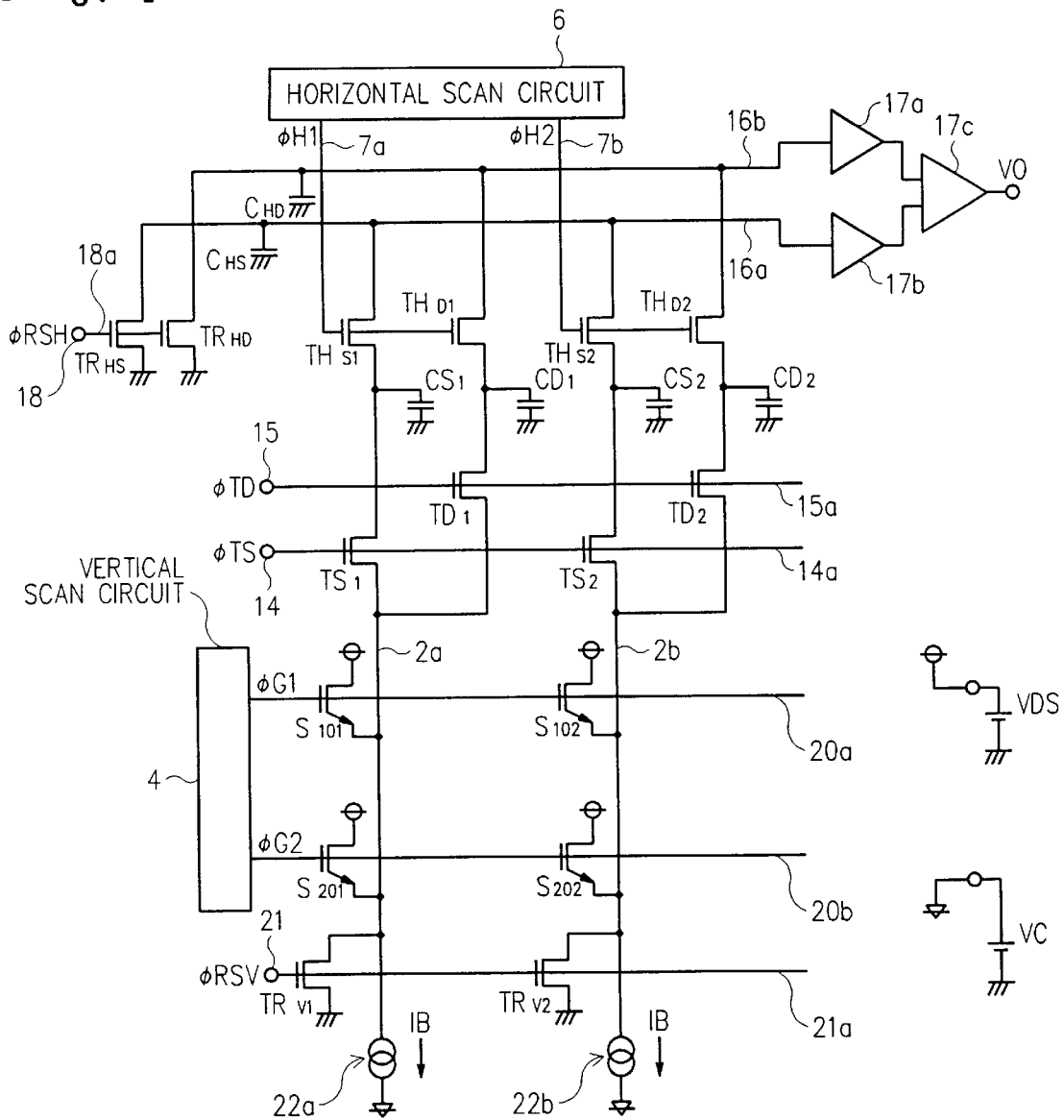
FIG. 1 is a schematic circuit diagram which shows the general configuration of a conventional solid-state image pickup device of the past.
Figure 2:
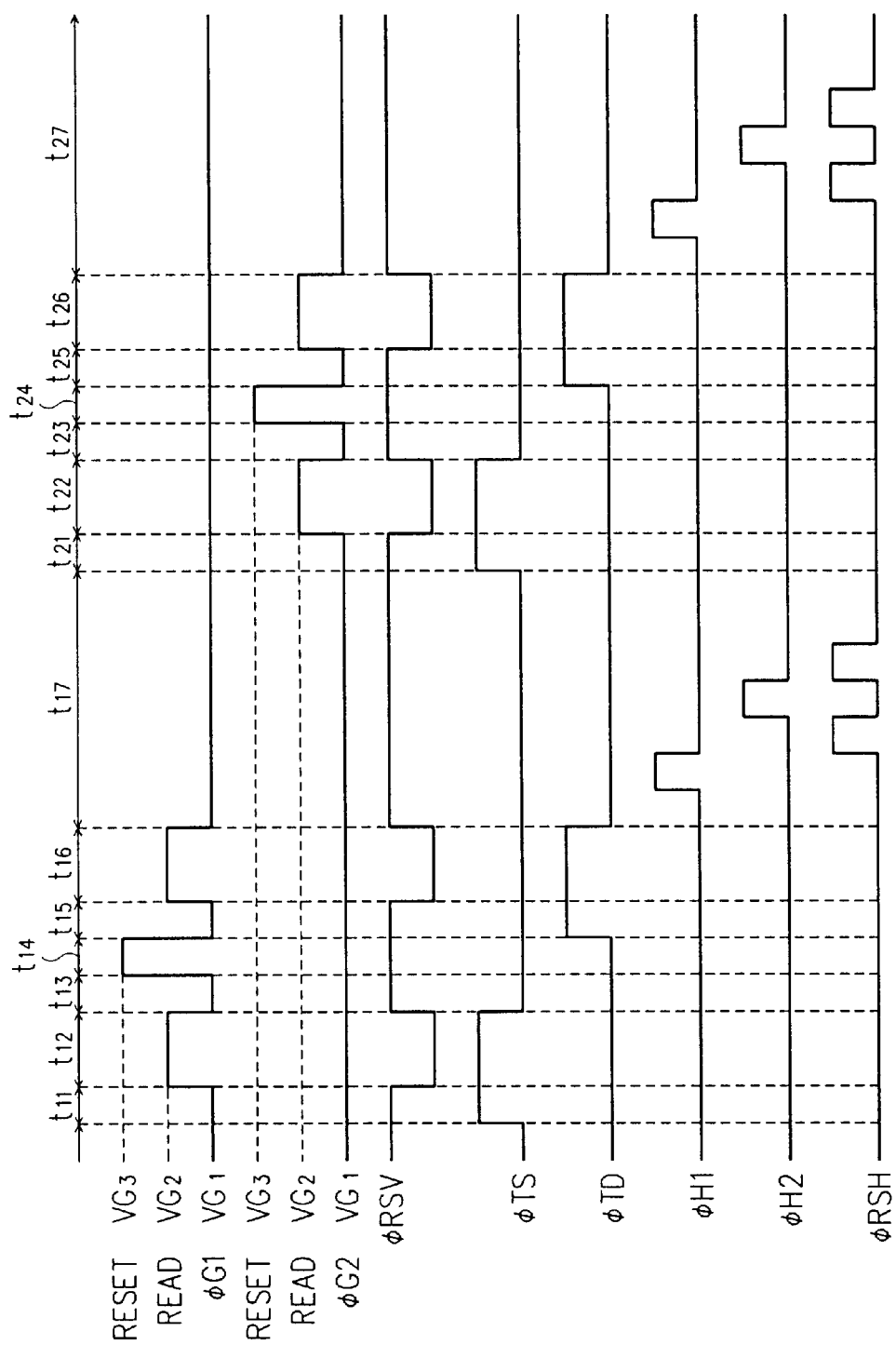
FIG. 2 is a timing diagram for the purpose of illustrating the operation of a conventional solid-state image pickup device, which is shown in FIG. 1.

The operation of a solid-state image pickup device as described with regard to FIG. 1 is as follows. First, as shown in the timing diagram of FIG. 2, in the time period $t_{11}$, the drive pulse ΦTS is drive to a high level. As a result, in the same manner as the resetting MOS transistors $TR_{V1}$ and $TR_{V2}$, which are conducting because of the drive pulse ΦRSV which is already at a high level, the light signal output transfer MOS transfer MOS transistors $TS_{1\ and\ TS2}$ are put in the conducting state.

As a result, these resetting MOS transistors $TR_{V1}$ and $TR_{V2}$ and light signal output transfer MOS transfer MOS transistors $TS_1$ and $TS_2$ conduct, so that a signal charge which remains in the light signal output storage capacitors $CS_1$ and $CS_2$ is extracted, via the vertical source lines $2a$ and $2b$, from the resetting MOS transistors $TR_{V1}$ and $TR_{V2}$, these light signal output storage capacitors $CS_1$ and $CS_2$ being rest to the ground level (initialized). When this is done, the gates of the SIT transistors $S_{101}$, $S_{102}$, $S_{201}$, and $S_{202}$ accumulate the electrical charge which is photoelectrically converted by means of the photoelectric conversion section.

Next, during the time period $t_{12}$, the drive pulse φRSV is changed to the low level, this not only cutting off the resetting MOS transistors $TR_{V1}$ and $TR_{V2}$, but also reading the drive pulse ΦG1 voltage as the level $VG_2$, the first row SIT transistors $S_{101}$ and $S_{102}$ being placed in the read condition.

As a result, the SIT transistors $S_{101}$ and $S_{102}$ operate as source followers, so that the electrical charge stored at the gates of these SIT transistors $S_{101}$ and $S_{102}$ is read out to vertical source lines $2a$ and $2b$, the electrical charge (video signal) which is read via the light signal output transistors $TS_1$ and $TS_2$ which are in the conducting state because of the drive pulse ΦTS which is already at the high level is stored in the light signal output storage capacitors $CS_1$ and $CS_2$. This video signal includes a dark component, D, and an light signal component S, this video signal hereinafter being referred to as the combined voltage signal (VD+VS).

Next, in the time period $t_{13}$ the drive pulse ΦTS is changed to the low level, causing the light signal output transfer MOS transistors $TS_1$ and $TS_2$ to be placed in the cutoff condition. As a result, the combined voltage signal (VD+VS) is held as is in the light signal output storage capacitors $CS_1$ and $CS_2$.

When this occurs (during time period $t_{13}$), the drive pulse ΦG1 voltage is changed to the setting level $VG_1$, the reading condition of the first row SIT transistors $S_{101}$ and $S_{102}$ being stopped. The drive pulse ΦRSV is changed to the high level, and the resetting MOS transistors $TR_{V1}$ ad $TR_{V2}$ are placed in the conducting state. As a result, the vertical source lines $2a$ and $2b$ are grounded.

Next, in the time period $t_{14}$, the drive pulse ΦG1 is changed to the resetting level $VG_3$. As a result, the first row SIT transistors $S_{101}$ and $S_{102}$ are reset (initialized) by means of the resetting MOS transistors $TR_{V1}$ and $TR_{V2}$ which are already at high level and in the conducting state. After the first row SIT transistors $S_{101}$ and $S_{102}$ are reset, the drive pulse ΦG1 voltage is changed to the setting level $VG_1$, the operation of the first row SIT transistors $S_{101}$ and $S_{102}$ being stopped.

Next, in the time period $t_{15}$, the drive pulse ΦTD is changed to the high level, the dark output transfer MOS transistors $TD_1$ and $TD_2$ being place in the conducting state. As a result, the resetting MOS transistors $TR_{V1}$ and $TR_{V2}$, which were already at the high level and conducting, and the dark output transfer MOS transistors $TD_1$ and $TD_2$ conduct, the residual signal charge on the dark output storage capacitors $CD_1$ and $CD_2$ is extracted, via the vertical source lines $2a$ and $2b$, from the resetting MOS transistors $TR_{V1}$ and $TR_{V2}$, these dark output storage capacitors $CD_1$ and $CD_2$ being reset (initialized) to the ground level.

Next, in the time period $t_{16}$, the drive pulse ΦRSV is changed to the low level, this setting the resetting MOS transistors $TR_{V1}$ and $TR_{V2}$ being to the conducting state, and the drive pulse ΦG1 voltage is changed to the read level $VG_2$, this placing the first row SIT transistors $S_{101}$ and $S_{102}$ into the reading condition.

As a result, the SIT transistors $S_{101}$ and $S_{102}$ operate as source followers, so that after the SIT transistors $S_{101}$ and $S_{102}$ are reset, the video signal is read out to the vertical source lines $2a$ and $2b$, the video signal being stored in the dark output storage capacitors $CD_1$ and $CD_2$ via the dark output transfer MOS transistors $TD_1$ and $TD_2$, which are in the conducting state because of the drive pulse ΦTD, which is already at the high level. This video signal includes only a dark component, D, and will hereinafter be referred to as the dark voltage signal VD.

Next, in time period $t_{16}$, the drive pulse ΦG1 is changed to the setting level $VG_1$ and the drive pulse ΦTD is changed to the low level, the drive pulse ΦRSV being changed to the high level. As a result, the first row SIT transistors $S_{101}$ and $S_{102}$ once again go into the condition in which an electrical charge according incident light is stored at the gates thereof, the dark output storage capacitors $CD_1$ and $CD_2$ being placed in the cutoff condition, these dark output storage capacitors $CD_1$ and $CD_2$ being maintained at the dark voltage signal VD level. The resetting MOS transistor $TR_{V1}$ and $TR_{V2}$ are placed in the conducting condition.

Next, in the time period $t_{17}$, first the drive pulse ΦH1 is applied to the gate electrodes of horizontal read selection MOS transistors $TH_{S1}$ and $TH_{D1}$ from the horizontal scan circuit 6. As a result, the horizontal read selection MOS transistors $TH_{S1}$ and $TH_{D1}$ operate, the combined voltage signal (VD+VS) which is stored in the light output storage capacitor $CS_1$ and the dark voltage signal VD stored in the dark output storage capacitor $CD_1$ are read, respectively, to the signal output line 16a and the dark output line 16b, these being output via buffer amplifiers 17a and 17b to the output terminal VO.

In general, because of the parasitic capacitances $C_{HS}$ and $C_{HD}$ which exist on the signal output line 16a and the dark output line 16b, when the combined voltage signal (VD+VS) is read out to the signal output line 16a or the dark voltage signal VD is read out to the dark output line 16b, part of each of these voltage signals ((VD+VS) and VD) is held by the parasitic capacitances $C_{HS}$ and $C_{HD}$, this remaining on the signal output line 16a and the dark output line 16b. For this reason, a drive pulse ΦRSH is applied to the horizontal read resetting MOS transistors $TR_{HS}$ and $TR_{HD}$, the voltages ((VD+VS) and VD) which remain on each of the signal output line 16a and the dark output line 16b are removed, thereby resetting (initializing) the signal output line 16a and the dark output line 16b to the ground level.

Next, in a drive pulse ΦH2 is applied once again from the horizontal scan circuit 6 to the gate electrodes of the horizontal read selection MOS transistors $TH_{S2}$ and $TH_{D2}$. As a result, the horizontal read selection MOS transistors $TH_{S2}$ and $TH_{D2}$. As a result, the horizontal read selection MOS transistors $TH_{S2}$ and $TH_{D2}$ operate, the combined voltage signal (VD+VS) which is stored in the light signal output storage capacitor $CS_2$ and the dark voltage signal VD which is stored in the dark output storage capacitor $CD_2$ being read, respectively, to the signal output line 16a and the dark output line 16b, these being output to the output terminal VO via the buffer amplifiers 17a and 17b.

Then a drive pulse ΦRSH is applied to the horizontal read resetting MOS transistors $TR_{HS}$ and $TR_{HD}$, this removing the residual voltage signals ((VD+VS) and VD) from the signal output line 16a and the dark output line 16b, so that the signal output line 16a and dark output line 16b are reset (initialized) to the ground level.

Specifically, in the time period $t_{17}$, the following operation is performed. First, the drive pulses (ΦH1 and ΦH2) which are sent from the horizontal scan circuit 6 and drive pulse ΦRSH are sequentially alternated between high and low levels, thereby causing the horizontal read selection MOS transistors $TH_{S1}$, $TH_{D1}$, $TH_{S2}$, and $TH_{D2}$ to operate. By doing this, the voltage signals ((VD+VS) and VD) which were stored respectively in the light signal output storage capacitors $CS_1$ and $CS_2$ and the dark output storage capacitors $CD_1$ and $CD_2$ are output, via the signal output line 16a, the dark output line 16b, and via the buffer amplifiers 17a and 17b, to the output terminal VO. After this, the horizontal read resetting MOS transistors $TR_{HS}$ and $TR_{HD}$ are caused to operate, thereby resetting (initializing) the signal output line 16a and the dark output line 16b to the ground level.

Between the output terminal VO and the buffer amplifiers 17a and 17b, a subtraction processing amplifier 17c is provided. This is provided to perform a subtraction between the combined voltage signal (VS+VD), which is read out to the signal output line 16a, and the dark voltage signal, which is read out to the dark output line 16b, the result ((VS+VD)−VD) of this subtraction causing an output of only the true video signal (that is, the light voltage signal VS).

By performing the above-noted operations with regard to the second row IT transistors $TR_{201}$ and $TR_{202}$ in the same manner (in time periods $t_{21}$ through $t_{27}$) a so-called raster scan is performed.

In a solid-state image pickup device which performs a read operation by means of a source follower, because the electrical charge is amplified and read by a source follower, not only is the S/N ratio high and the video signal linearity good, but also, by storing the dark voltage signal VD (in $CD_1$ and $CD_2$) it is simple to take the difference of this with respect to the combined voltage signal (VS+VD), thereby eliminating variations in thresholds between each of the pixels (SIT transistors $S_{101}$, $S_{102}$, $S_{201}$, and $S_{202}$), which is a cause of fixed-pattern noise (FPN).

However, in the above-noted solid-state image pickup device, the problems described below occur because the amplified electrical charge is read out to the horizontal read lines 16a and 16b by the transistors $S_{101}$, $S_{102}$, $S_{201}$, and $S_{202}$ directly a voltage.

Firstly, there is the problem that the reading of the electrical charge (video signal) requires time. This is because of the existence, on the horizontal read line, of the parasitic capacitances $C_{HS}$ and $C_{HD}$, so that when reading the video signals (combined voltage signal (VD+VS) and dark voltage signal VD) to the output lines, it is necessary not only to charge these parasitic capacitances, but also to reset these parasitic capacitances, slowing the read operation speed to the degree that this resetting operation requires additional time.

Secondly, two horizontal read lines 16a and 16b are provided for the purpose of separately outputting the combined voltage signal (VD+VS) and the dark voltage signal VD, this requiring the provision of two buffer amplifiers (17a and 17b), thereby not only increasing the cost, but also resulting in an effective increase in random noise by a factor of $2^{1/2}$.

Thirdly, because of the existence of the parasitic capacitances $C_{HS}$ and $C_{HD}$ on the horizontal read lines 16a and 16b, the charge distribution in accordance with these parasitic capacitances causes a drop in the voltages of the video signals (combined voltage signal (VD+VS) and dark voltage signal VD).

Fourthly, the input impedances of the buffer amplifiers 17a and 17b are generally designed to be high, so that the electrical charges (video signals) stored in the capacitors $CS_1$, $CS_2$, $CD_1$ and $CD_2$ are not attenuated. That is, the buffer amplifiers 17a and 17b are designed to have a high input impedance, in order to achieve a good video signal S/N ratio.

However, when the input impedance of the buffer amplifier is made high, it becomes susceptible to externally induced noise, so that the actual result is a tendency for the S/N ratio to worsen.

A solid-state image pickup device according to the present invention is chiefly formed by a plurality of pixels, a plurality of vertical read lines, a horizontal read line, a current sample-and-hold means, and a switching means.

The above-noted plurality of pixels are arranged in a two-dimensional matrix, convert an electrical charge responsive to incident light to a current signal, and output this current signal. The plurality of vertical read lines scan the plurality of pixels sequentially in the column direction in common for each row of the matrix arrangement, and extract a current signal from each pixel for each column. The horizontal read line scans the plurality of vertical read lines in the row direction, and sequentially output a current signal as a time series for each row.

The current sample-and-hold means is provided for each vertical read line, and stores the current signal which is output from a scanned pixel when a pixel connected to each vertical read line is scanned.

Using the switching means, by scanning each pixel of each row, a current signal consisting of a first component, which is responsive to the sum of the amount of light incident to a pixel and the dark output, and a current signal which is responsive to the dark output are output separately at different times, one of the first-component current signal and the second-component current signal being stored in the current sample-and-hold means, after which a subtraction is performed between the other of the first-component current signal and the second-component current signal and the current signal which had already stored in the current sample-and-hold means, thereby obtaining a current signal having only a component which is responsive to the amount of incident light, this being sequentially read out to the horizontal read line.

That is, in the present invention, from a plurality of pixels either a current signal consisting of a first component responsive to the sum of light incident to a pixel and the dark output or a current signal consisting of a second component responsive to the dark output is output, the thus output current signal being stored in the current sample-and-hold means.

Then, from the plurality of pixels, when the other current of the current signal consisting of a first component responsive to the sum of light incident to a pixel and the dark output and a current signal consisting of a second component responsive to the dark output is output, this output and the current signal which has already been stored in the current sample-and-hold means are combined so as to perform a subtraction between these two current signals. By doing this, a voltage signal consisting of a component which is responsive only to the incident light is read out to the horizontal read line in accordance with the controlling operation of the switching means.

That is, if we hypothesize that the current signal stored in the current sample-and-hold means is a current signal (IS+ ID) consisting of a first component which is responsive to the sum of the incident light(S) and the dark output (D) and further hypothesize that the current signal output from the pixel thereafter is a current signal (ID) consisting of a second component which is responsive to the dark output (D), the subtraction (IS+ID)–(ID)=(IS) is performed, a current signal (IS) consisting of a component (S) which is responsive to only the incident light is read out to a horizontal read line in accordance with the control operation of the switching means.

Therefore, because the video signal read out to the horizontal read line is read as a current signal, the charge distribution caused by the parasitic capacitance existing on the horizontal read line is eliminated, thereby enabling an improvement in the video signal S/N ratio.

In the present invention, because the video signal read out to the horizontal read line is a current signal, it is possible to perform high-speed reading of the video signal.

That is, in a solid-state image pickup device such as shown in FIG. 1, because the video signal read out to the horizontal read line is read as a voltage, it is not possible to ignore the parasitic capacitance that exists on the horizontal read line. For example, in reading the video signal to the horizontal read line, after the parasitic capacitance is charged, because it is necessary to reset the electric charge stored in the parasitic capacitance, a problem arises in that the speed of the reading operation decreases to the extent that time is required for this resetting operation. With the present invention, because the video signal read out to the horizontal read line is a current signal, even if the above-noted parasitic capacitance exists, there is no need to perform a charging and resetting operation of this parasitic capacitance, thereby enabling high-speed reading of the video signal.

In the present invention, by simply superimposing a current signal consisting of a first component which is responsive to the sum of the output from a plurality of pixels caused by the incident light and the dark output and a current signal consisting of a second component which is responsive to the dark output, it is possible to read out to the horizontal read line a current signal (IS) consisting of a component which is responsive to only the incident light. For this reason, it is easy not only to eliminate noise from the video signal, but also to achieve a good video signal S/N ratio.

Additionally, in the present invention, because the video signal read out to the horizontal read line is treated as a current signal, it is possible to use an output circuit having a low input impedance, so that the video signal which is output is not influenced by externally induced noise. It is possible to reduce cost, because it is not necessary to have two buffer amplifiers as shown in the solid-state image pickup device of FIG. 1.

In another solid-state image pickup device according to the present invention, there is further provided a current-stabilizing means, which limits the variation of the signal value of the current signal output from the pixel, between the pixel and the sample-and-hold means.

That is, it is possible that the voltage at the pixel output is different when the current sample-and-hold means stores a current signal which is output from a pixel, from the voltage a the pixel output when reading to a horizontal read line a current signal consisting of a component responsive to the incident light, which is obtained by means of a subtraction.

Specifically, the voltage at the pixel output when the current signal output from the pixel is stored by the current sample-and-hold means is the same as the voltage at the input of the current sample-and-hold means. This is because the output of the pixel is electrically connected to the input of the current sample-and-hold means.

The voltage at the output of the pixel when reading to the horizontal read line a current signal consisting of a component which is responsive to the incident light, this being obtained by means of a subtraction, is equal to the bias voltage which is applied to the output of the horizontal read line. This is because the output of the pixel is electrically connected to the horizontal read line.

Therefore, because there is a difference in the voltage at the output of the pixel between the time when the current signal is stored by the current sample-and-hold means and the time when reading is performed to the horizontal read line, there is a variation in the signal value of the current signal which is output from the pixel, this representing a cause of fixed-pattern noise and the like, therefore possibly leading to a drop in the performance (such as, for example, the S/N ratio) of the solid-state image pickup device.

Because of this problem, a current-stabilizing means is provided between the pixel and the current sample-and-hold means, thereby preventing a variation in the voltage at the output of the pixel between the time when the current signal is stored by the current sample-and-hold means and the time reading to the horizontal read line is performed.

In another solid-state image pickup device according to the present invention, a pixel is configured by, for example, a photoelectric conversion element, a current conversion amplifying element, a transfer control element, and a resetting element.

The above-noted photoelectric conversion element generates and stores an electrical charge which is responsive to the incident light. The current conversion amplifying element generates a current signal which is responsive to an electrical charge that is received in a control region. The transfer control element selectively transfers the electrical charge that was generated and stored by the photoelectric conversion element to the control region of the amplifying element. The resetting element selectively resets the electrical charge in the control region of the amplifying element.

That is, in the MOS static induction transistor (MOSSIT) such as shown in FIG. 1, because due to the construction of the pixel it is necessary to perform a reset (initialization) operation of the pixel between the output of the combined voltage signal (VD+VS) and the output of the dark voltage signal (VD), the operation of reading the video signal is slowed the extent of the time required for performing this resetting operation. However, in a pixel configuration as described above, even if a pixel reset (initialization) operation is not performed between the output of a current signal consisting of a first component which is responsive to the sum of the amount of incident light and the dark output and a current signal consisting of a second component which is responsive to the dark output, it is still possible to output two current signals, thereby enabling a further increase in the speed of reading the video signal.

Another solid-state image pickup device according to the present invention includes a means for making the average voltage at the output of the current-stabilizing means equal to the bias voltage which is applied to the output of the horizontal read line.

That is, when the current signal consisting of a component which is responsive to the incident light, which is obtained by means of a subtraction, is read out to the horizontal read line, the output of the current-stabilizing means is equal to the bias voltage that is applied to the horizontal read line. This is because the output of the current-stabilizing means and the horizontal read line are electrically connected. In the case in which a plurality of current-stabilizing means are provided, the voltages at the outputs of each of the current-stabilizing means differ mutually.

For this reason, the voltage at the output of the current-stabilizing means will vary, this possibly causing fixed-pattern noise or the like.

Therefore, the voltage of the current-stabilizing means is adjusted so that the average voltage at the output of the current-stabilizing means is equal to the bias voltage which is applied to the horizontal read line, thereby preventing variation of the voltage at the output of the current-stabilizing means.

As a result, even when current signal consisting of a component which is responsive to the incident light, which is obtained by means of a subtraction, is read out to the horizontal read line, the voltage at the output of the current-stabilizing means does not vary, thereby enabling a further elimination o the causes of fixed-pattern noise and the like.

First Embodiment

Figure 3:
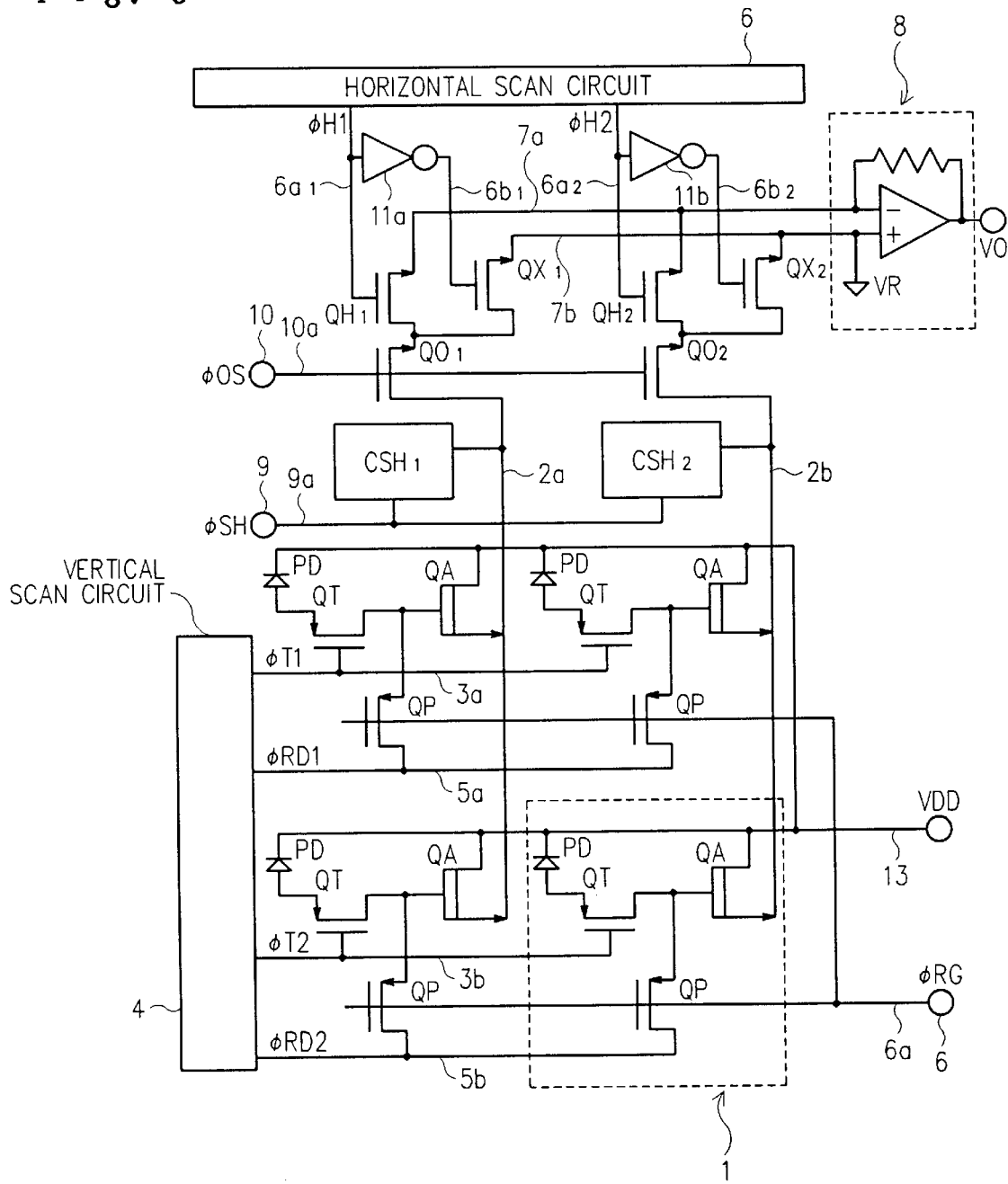
FIG. 3 is a schematic circuit diagram which shows the general configuration of the first embodiment of a solid-state image pickup device according to the present invention.

FIG. 3 is a schematic circuit diagram which shows the general configuration of an embodiment of a solid-state image pickup device according to the present invention. In the solid-state image pickup device which is shown in FIG. 3, for the purpose of the description to follow, the example shown is that of a 2-row-by-2-column matrix of 4 pixels. Each pixel 1 is configured by a photodiode PD which generates and stores an electrical charge in response to incident light, an amplifying transistor QA (an n-channel JFET in this embodiment) which outputs a current signal in response to an electrical charge which is received in a control region, a transferring transistor QT (p-channel type) which selectively transfers the electrical charge which is generated and stored by the photodiode PD to the control region of the amplifying transistor QA, and a resetting MOS transistor QP (p-channel type) for the purpose of selectively resetting the electrical charge of the control region of the amplifying transistor QA, a current signal being read out by means of the source follower operation of the amplifying transistor QA.

The sources of each of the amplifying transistors QA for each column of the matrix arrangement are connected in common to the vertical source lines 2a and 2b, and the drains of each amplifying transistor QA and cathode terminals of the photodiodes are connected in common for all pixels to the power supply voltage VDD. The anode terminals of each photodiode and the gate electrodes of each amplifying transistor QA are connected, respectively, to the source and drain of the associated transferring MOS transistor QT.

The gate electrodes of the transferring MOS transistors QT are connected in common for each row in the matrix arrange to the clock lines 3a and 3b, which are connected to the vertical scan circuit 4, the transferring MOS transistors QT of each row being sequentially operated by means of the drive pulses ΦT1 and ΦT2 sent from the vertical scan circuit 4.

The drain of the resetting MOS transistors QP are connected in common for each row to the clock lines 5a and 5b, which are connected to the vertical scan circuit 4, the gate electrodes of the resetting MOS transistors QP being connected, via the row line 6a, in common for all pixels, to the drive pulse generating circuit 6. The sources of the resetting MOS transistors QP are shared with the sources of the transferring MOS transistors QT. The gate electrodes of these resetting MOS transistors QP reset the associated resetting MOS transistor QP by means of the drive pulse ΦRG which is sent from the drive pulse generating circuit 6.

The vertical source lines 2a and 2b are connected for each column on their output end (load end; upper end in the drawing) respectively to the output switching MOS transistors $QO_1$ and $QO_2$, these output switching MOS transistors $QO_1$ and $QO_2$ being connected via the vertical read MOS transistors $QH_1$ and $QH_2$ and via the shunting MOS transistors $QX_1$ and $QX_2$ to the horizontal read lines 7a and 7b, respectively. Between these horizontal read lines 7a and 7b and the output terminal VO is connected an output amplifying circuit 8, which amplifies the current signal sent from the pixel 1.

The gate electrodes of the output switching MOS transistors $QO_1$ and $QO_2$ are connected, via the clock line 10a, to the drive pulse generating circuit 10, and when a drive pulse ΦOS which is sent from this drive pulse generating circuit 10 is applied to the gate electrodes of the output switching MOS transistors $QO_1$ and $QO_2$, these output switching MOS transistors $QO_1$ and $QO_2$ operate.

The gate electrodes of each of the horizontal read MOS transistors $QH_1$ and $QH_2$ are connected, respectively, to the horizontal selection signal lines $6a_1$ and $6a_2$, which are connected to the horizontal scan circuit 6, the horizontal reading operation being controlled by means of drive pulse ΦH1 and ΦH2, which are sent from the horizontal scan circuit 6.

The horizontal selection lines $6a_1$ and $6a_2$ have connected to them inverters 11a and 11b, respectively, these inverters being connected to the gate electrodes of the shunting MOS transistor $QX_1$ and $QX_2$, respectively. When the drive pulses ΦH1 and ΦH2 are not being sent from the horizontal scan circuit 6, these inverters 11a and 11b apply a voltage to the gate electrodes of the shunting MOS transistor $QX_1$ and $QX_2$, respectively, causing these shunting MOS transistor $QX_1$ and $QX_2$, respectively to operate.

The vertical source lines 2a and 2b having connected to them, respectively, the current sample-and-hold circuits $CSH_1$ and $CSH_2$, for each column. These current sample-and-hold circuits $CSH_1$ and $CSH_2$ are connected, via the clock line 9a, to the drive pulse generating circuit 9, and when the drive pulse ΦSH, which is sent from the drive pulse generating circuit 9, is applied, the operation of the current sample-and-hold circuits $CSH_1$ and $CSH_2$ starts.

The configuration and operation of the vertical scan circuit 4 and the horizontal scan circuit 6 are described in U.S. Pat. No. 5,172,249, which is included by reference herein.

Figure 4:
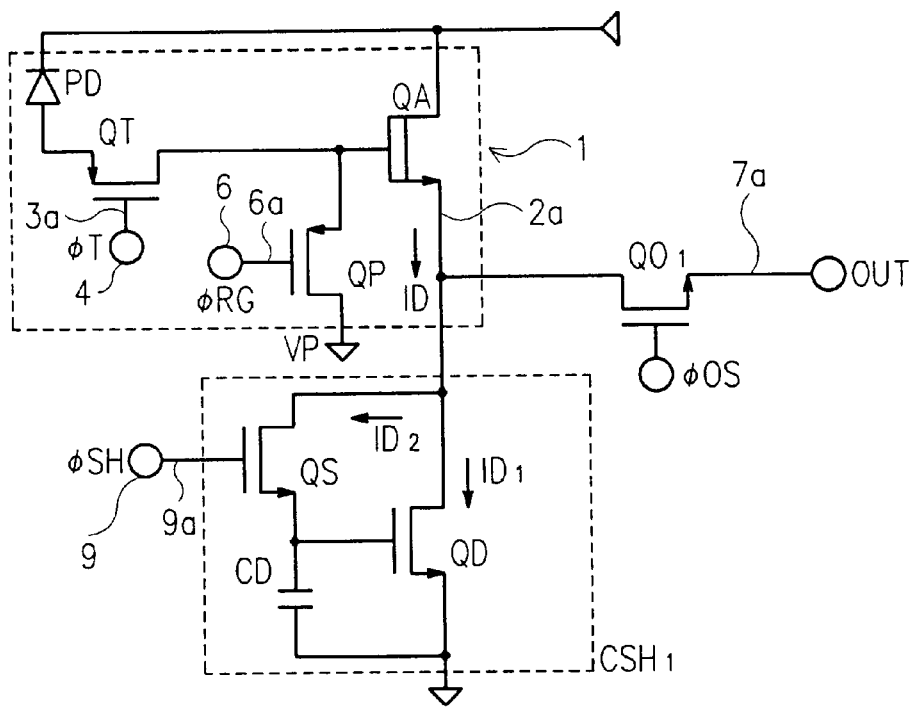
FIG. 4 is a schematic circuit diagram which shows the general configuration of a current sample-and-hold means for the purpose of illustrating the operation thereof.

FIG. 4 is a schematic circuit diagram which shows the general configuration of a current sample-and-hold circuit for the purpose of illustrating the operation thereof. In FIG. 4, to simplify the description, all that is shown in FIG. 4 is a single pixel of the four shown in FIG. 3, and the manner in which it is connected to the current sample-and-hold circuit CSH.

As shown in FIG. 4, the current sample-and-hold circuit $CSH_1$ is configured from a current-establishing MOS transistor QD (n-channel), a sample-and-hold MOS transistor QS, and a voltage storage capacitor CD. In FIG. 4, elements which are the same as in FIG. 3 have been assigned the same reference symbols and will not be explicitly described herein. The drain of the resetting MOS transistor QP of pixel 1 has been simplified is shown in simplified schematic form as being connected to the power supply voltage VP.

The gate electrode of the sample-and-hold MOS transistor QS is connected, via the clock line 9a, to the drive pulse generating circuit 9, the drain thereof being connected to the drain of the current-establishing MOS transistor QD, and the source thereof being connected to the gate electrode of the current-establishing MOS transistor and to one end of the voltage storage capacitor CD.

The source of the current-establishing MOS transistor QD is connected to the power supply voltage, the other end of the voltage storage capacitor CD also being connected to the power supply voltage.

Next, referring to FIG. 4, the operation of the current sample-and-hold circuit $CSH_1$ will be described. First, when the drive pulse ΦRG is applied to the gate electrode of the resetting MOS transistor QP, the resetting MOS transistor QP is made to conduct (that is, go into the on condition), resulting in the gate (control region) of the amplifying transistor QA being biased to voltage level of the power supply voltage VP.

Next, even if the supply of the drive pulse ΦRG to the gate electrode of the resetting MOS transistor QP is stopped, placing the resetting MOS transistor QP in the non-conducting (off) condition, because of the effect of the gate parasitic capacitance, the gate of the amplifying transistor QA remains in the condition in which it is biased to the voltage level of the power supply voltage VP.

Thus, by biasing the gate (control region) of the amplifying transistor QA to the power supply voltage VP, even if the resetting MOS transistor QP is placed in the non-conducting condition (off) condition, the gate (control region) of the amplifying transistor QA remains at the voltage level of the power supply voltage VP, this condition being referred to in general as the resetting (initialization) of pixel 1. When the resetting MOS transistor QP is placed in the non-conducting (off) condition, the thermal noise of the resetting MOS transistor QP is added as the reset noise (referred to as KCT noise) at the gate of the amplifying transistor QA.

That is, when the gate (control region) of the amplifying transistor is reset, the gate voltage $V_{GD}$ of the amplifying transistor QA is given as follows in Equation (1).

$$V_{GD} = VP + VN \qquad (1)$$

In the above, $VN = (KT/C)^{1/2}$

K: Boltzmann's constant

T: Absolute temperature

C: Gate capacitance

Under these conditions, a dark current flows, which includes only the dark component (D) from the source of the amplifying transistor QA. In the following description, for the purpose of simplicity, the dark current signal will be referred to as the "dark current ID."

Next, when the drive pulse ΦSH is applied to the gate electrode of the sample-and-hold switching MOS transistor QS of the current sample-and-hold circuit CSH$_1$, thereby placing the sample-and-hold switching MOS transistor QS in the conducting (on) condition, the dark current ID from the source of the amplifying transistor QA flows via the vertical source line 2a toward the drain of the current-establishing MOS transistor QD and the sample-and-hold switching MOS transistor QS. To simplify the description which follows, the dark current which flows toward the drain of the current-establishing MOS transistor QD will be called ID$_1$, and the dark current ID which flows toward the sample-and-hold switching MOS transistor QS will be called ID$_2$.

The dark current ID$_2$ which flows toward the sample-and-hold switching MOS transistor QS also charges the voltage storage capacitor CD via the sample-and-hold switching transistor QS.

The voltage storage capacitor CD is connected to the gate electrode of the current-establishing MOS transistor QD. The dark current ID$_2$ which flows toward the sample-and-hold switching MOS transistor QS flows into the voltage storage capacitor CD until the dark current ID$_1$ which flows toward the drain of the current-establishing MOS transistor QD is equal to the current which flows from the source of the amplifying transistor QA, after which it automatically becomes zero.

As a result, the gate (control region) of the current-establishing MOS transistor QD is automatically biased and goes into a condition of equilibrium, the gate voltage of the current-establishing MOS transistor QD at this time being stored in the voltage storage capacitor CD. Therefore, even if the application of the drive pulse ΦSH to the gate electrode of the sample-and-hold switching MOS transistor QS is stopped, thereby placing the sample-and-hold switching MOS transistor QS in the non-conducting (off) condition, the voltage on the gate of the current-establishing MOS transistor QD does not change, the result being that the dark current ID flows from the drain to the source of the current-establishing MOS transistor QD.

That is, because the gate-to-source voltage of the current-establishing MOS transistor QD is held constant by the voltage storage capacitor CD, as long as this gate-to-source voltage remains constant there is no change in the source current. Therefore, the dark current ID continues to flow from the drain to the source of the current-establishing MOS transistor QD. Thus, the dark current ID is stored in the current sample-and-hold circuit CSH$_1$ as the drain current.

Next, when the drive pulse ΦT is applied to the gate electrode of the transferring MOS transistor QT, thereby placing it in the conducting (on) condition, so that the electrical charge which was stored in the photodiode PD is transferred to the gate (control region) of the amplifying transistor QA, a combined current signal which includes a dark component (D) from the source of the amplifying transistor QA and a light signal component (S) flows. To simplify the description which follows, this combined current signal will be referred to as the combined current (ID+IS).

That is, when the charge is transferred to the gate (control region) of the amplifying transistor QA, the gate voltage V$_{GS}$ of the amplifying transistor QA is given by the following equation.

$$V_{GS}=V_{GD}+VS \quad (2)$$

In the above equation:

V$_{GD}$: Gate voltage before transfer of the electrical charge to the gate of the amplifying transistor (refer to equation (1))

$$VS=Q_{SIG}/C_G$$

where Q$_{SIG}$: Electrical charge (signal charge)

CG: Gate capacitance

As a result, the drain current I$_{SS}$ which flows into the drain of amplifying transistor QA is given as follows.

$$I_{SS}=ID+IS \quad (3)$$

In the above equation, IS is a current signal containing only the light signal component (S) (hereafter referred to as the light signal current).

That is, the drain current I$_{SS}$ which flows into the drain of amplifying transistor QA is the combined current (ID+IS) formed by adding the light signal current IS to the dark current ID. Therefore, the combined current (ID+IS) flows from the source of the amplifying transistor QA.

When the above-noted combined current (ID+IS) flows to the current sample-and-hold circuit CSH$_1$, because only the dark current ID flows to the current sample-and-hold circuit CSH$_1$ the result is that the light signal current IS only, with the dark current (ID) eliminated, flows to the load (OUT side).

That is, because the gate-to-source voltage of the current-establishing MOS transistor QD of the current sample-and-hold circuit CSH$_1$ is made a voltage that causes just the dark current ID to flow, the light signal current IS of the combined current (ID+IS) does not flow in the current sample-and-hold circuit CSH$_1$.

Figure 5:
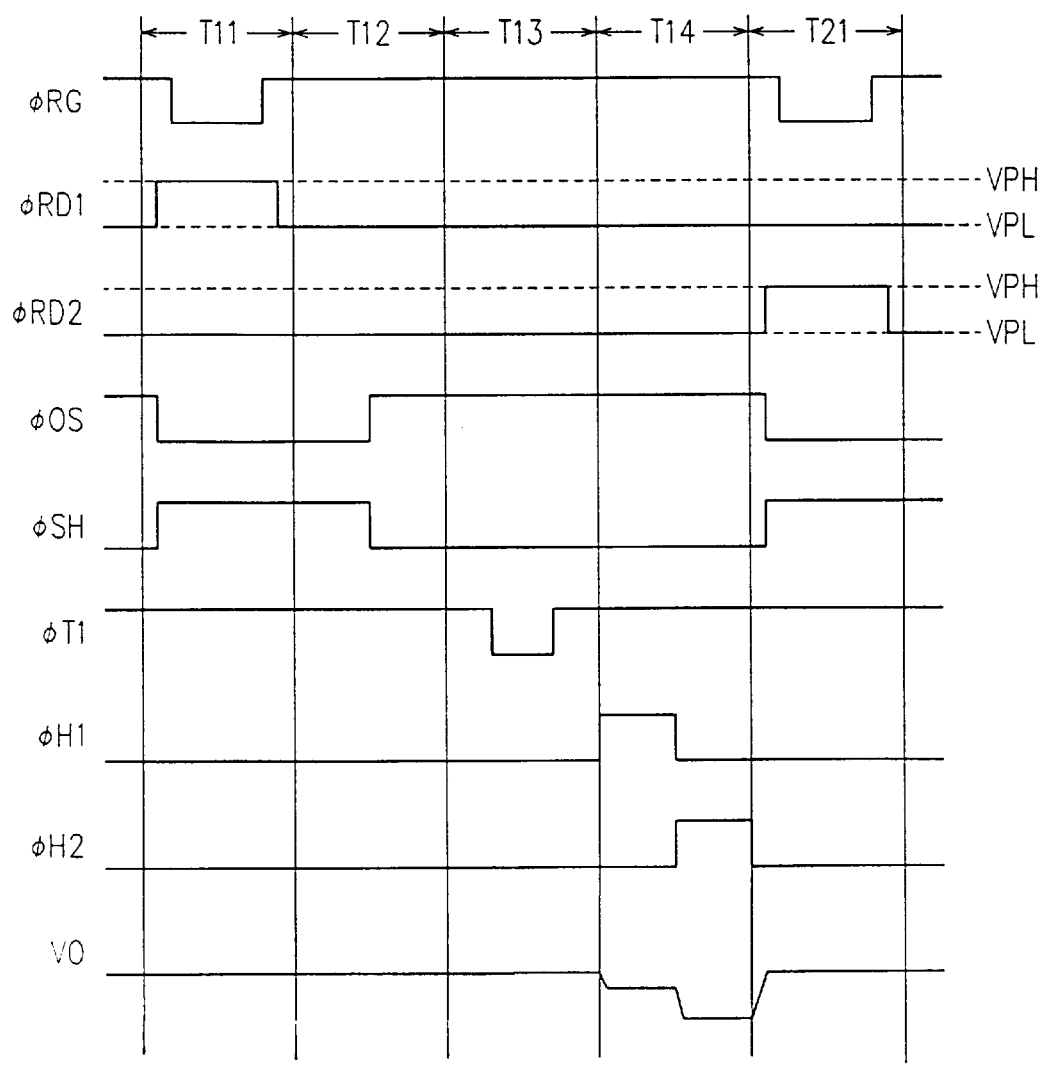
FIG. 5 is a pulse timing diagram which shows the operation of the first embodiment of a solid-state image pickup device according to the present invention shown in FIG. 3.

Next, the operation of the solid-state image pickup device shown in FIG. 3 will be described, with reference made to the pulse timing diagram presented in FIG. 5. In FIG. 5, the time period T11 is the reset period for the pixel 1 of the first row. In this time period T11, a drive pulse ΦRG sent from the drive pulse generating circuit 6 is at a low level, so that the resetting MOS transistor QP is in the conducting (on) condition, the drive pulse which is sent to the resetting MOS transistor QP from the vertical scan circuit 4 being ΦRD1, so that the pixel 1 of the first row is selected. Because the high-level voltage of the drive pulse ΦRD1 sent from the vertical scan circuit 4 is VPH, this voltage level of VPH is applied to the gate (control region) of the amplifying transistor QA via the resetting MOS transistor QP.

As a result, the gate (control region) of the amplifying transistor QA shown in FIG. 3 is biased by the drive pulse ΦRD1 to the voltage level of VPH (refer to FIG. 5), thereby being reset (initialized), a dark current ID which includes the reset noise being output from the source of the amplifying transistor QA to the source lines 2a and 2b.

In this time period T11 (refer to FIG. 5), the drive pulse ΦOS from the drive pulse generating circuit 10 is at the low level, so that the output switching MOS transistors QO$_{1\,and}$ QO$_2$ are placed in the non-conducting (off) condition. The drive pulse ΦSH sent from the drive pulse generating circuit 9 changes to the high level, so that the sample-and-hold switching MOS transistor QS described in connection with FIG. 3 is placed in the non-conducting (off) condition.

As a result, as described with regard to FIG. 4, the dark current ID flows toward the drain of the current-establishing MOS transistor QD and toward the sample-and-hold switching transistor QS, the gate (control region) of the current-establishing MOS transistor QD being automatically biased, placing it in a state of equilibrium, while the gate voltage at the current-establishing MOS transistor QD at this time is stored in the voltage storage capacitor CD, the current sample-and-hold circuits $CSH_1$ and $CHS_2$ starting the operation of storing the dark current ID.

In this time period T11, the drive pulse ΦRD2 sent from the vertical scan circuit 4 is at the low level, so that the pixel 1 of the second row is non-selected, the gate (control region) of the amplifying transistor QA at this time being deeply biased to a voltage level of VPL (refer to FIG. 5) which is lower than the so-called pinch-off voltage, thereby cutting it off.

The next time period, T12, is the time period during which the storage of the dark current ID is completed by the current sample-and-hold circuits $CSH_1$ and $CSH_2$. In this time period T12, the drive pulse ΦSH which is sent from the drive pulse generating circuit 9 is at the low level, so that the sample-and-hold switching MOS transistor QS, which was described in connection with FIG. 4, is placed in the non-conducting (off) condition, the dark current ID flowing into the current sample-and-hold circuits $CSH_1$ and $CSH_2$.

In this time period T12, the drive pulse ΦOS which is sent from the drive pulse generating circuit 10 is at the high level, so that the output switching MOS transistors $QO_1$ and $QO_2$ are place in the conducting (on) condition. As can be seen from the time periods T11 and T12 shown in FIG. 5, the drive pulse ΦOS sent from the drive pulse generating circuit 10 and the drive pulse ΦSH which is sent from the drive pulse generating circuit 9 operate in complimentary fashion.

The next time period, T13, is time period for transfer of the electrical charge stored in the photodiode to the amplifying transistor QA. In this time period T13, the drive pulse ΦT1 which is sent from the vertical scan circuit 4 is at the low level, placing the transferring MOS transistor QT in the conducting (on) condition.

As a result, the electrical charge which is stored in the photodiode is transferred to the gate (control region) o the amplifying transistor QA via the transferring MOS transistor QT. The transferred electrical charge is converted to the combined current (ID+IS) by the amplifying transistor QA and amplified by this amplifying transistor, the result being output from the source thereof to the vertical source lines 2a and 2b. Of this combined current (ID+IS), because the dark current ID is captured by the current sample-and-hold circuits $CSH_1$ and $CSH_2$, only the light signal current IS flows to the output.

The next time period, T14, is the horizontal read time period. In this time period T14, the drive pulses ΦH1 and ΦH2 which are sent from the horizontal scan circuit 6 are set to the high level sequentially, so that the horizontal read MOS transistors $QH_1$ and $QH_2$ are sequentially scanned, the light signal current IS only, from which the dark current ID has been removed, being output via the output amplifying circuit 8 to the output terminal VO.

In this time period T14, when for example the horizontal read MOS transistor $QH_1$ is scanned by means of the drive pulse ΦH1, the inverter 11b operates, the shunting MOS transistor $QX_2$ conducting to the bias voltage VR, thereby preventing saturation of the light signal current IS which is output from the amplifying transistor QA. In the same manner, of course, when for example the horizontal read MOS transistor $QH_2$ is scanned by means of the drive pulse ΦH2, the inverter 11a operates, the shunting MOS transistor $QX_1$ conducting to the bias voltage VR, thereby preventing saturation of the light signal current IS which is output from the amplifying transistor.

By performing the above-described operation with respect to the pixel 1 of the second row, it is possible to obtain a video signal with a good S/N ratio from all the pixels 1.

Second Embodiment

Figure 6:
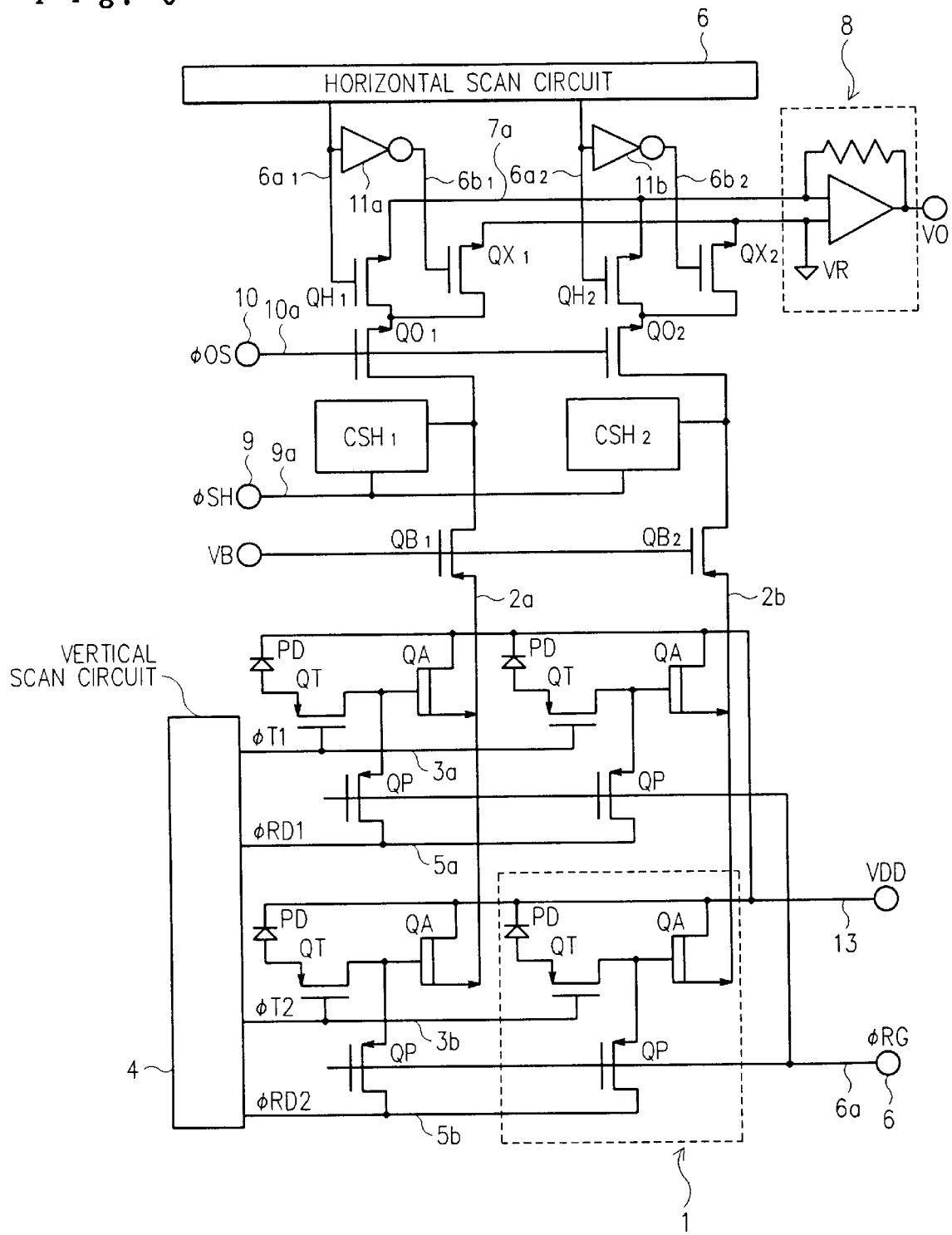
FIG. 6 is a schematic circuit diagram which shows the general configuration of the second embodiment of a solid-state image pickup device according to the present invention.

FIG. 6 is a schematic circuit diagram which shows the general configuration of the second embodiment of a solid-state image pickup device according to the present invention. As shown in FIG. 6, the difference in this embodiment with respect to the first embodiment of a solid-state image pickup device, which is shown in FIG. 3, is the provision of the current-stabilizing elements (current-stabilizing means) $QB_1$ and $QB_2$, which limit the variation in the value (signal value) of the current (for example, the combined current (ID+IS)), on the vertical source lines 2a and 2b between the pixel one and the current sample-and-hold circuits $CSH_1$ and $CSH_2$.

In the first embodiment of a solid-state image pickup device which is shown in FIG. 3, when the dark current ID is stored in the current sample-and-hold circuits $CSH_1$ and $CSH_2$, the source of the amplifying transistor QA, because it is electrically connected to the drain of the current-establishing MOS transistor QD inside the current sample-and-hold circuits $CSH_1$ and $CSH_2$ (refer to FIG. 4), has a source voltage that is equal to the gate voltage of the current-establishing MOS transistor QD within the current sample-and-hold circuits $CSH_1$ and $CSH_2$.

When the light signal current IS is read out by the horizontal scan circuit 6, the voltage on the source of the amplifying transistor QA, because this source is electrically connected to the output terminal VO, is equal to bias voltage VR of the of the output amplifying circuit 8.

For this reason, in the first embodiment of a solid-state image pickup device, which is shown in FIG. 3, the source voltage of the amplifying transistor is different at the time when the dark current ID is stored by the current sample-and-hold circuits $CSH_1$ and $CSH_2$ from what it is at the time the light signal current IS is read out, this variation in voltage being superimposed as is on the combined current (ID+IS) which is output from the source of the amplifying transistor QA, this leading to the possible cause of fixed-pattern noise (FPN).

Therefore, in the second embodiment of a solid-state image pickup device, which is shown in FIG. 6, the current-stabilizing elements $QB_1$ and $QB_2$ are provided on the vertical source lines 2a and 2b between the pixel 1 and the current sample-and-hold circuits $CSH_1$ and $CSH_2$, thereby limiting the variation in the current value, enabling a limiting of the cause of fixed-pattern noise.

Figure 7:
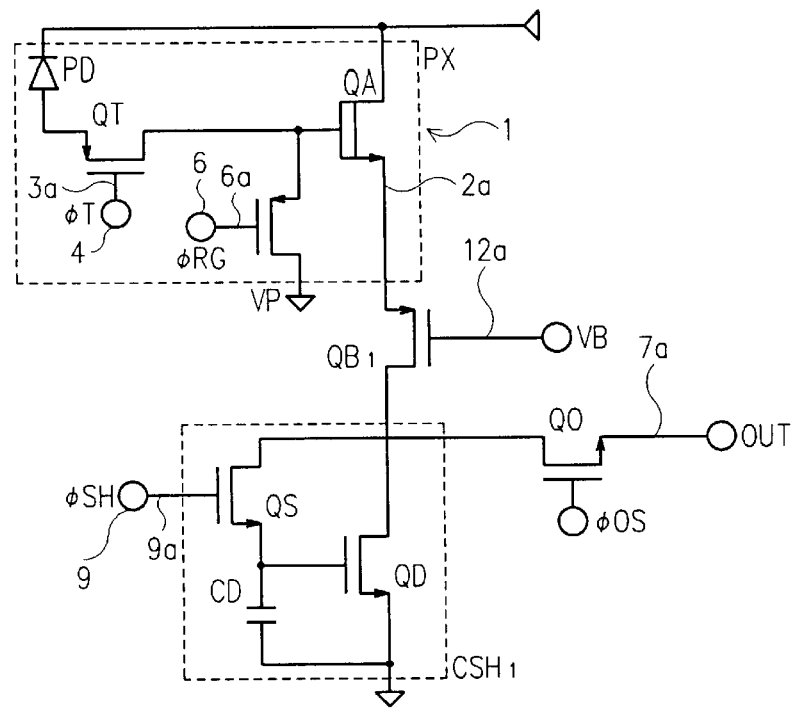
FIG. 7 is a schematic circuit diagram which shows the general of a current-stabilizing means for the purpose of illustrating the operation thereof.

FIG. 7 is a schematic circuit diagram which shows the general configuration of the current-stabilizing element, which will be used to describe the operation thereof. In FIG. 7, to simplify the description that follows, all that is shown in FIG. 7 is a single pixel of the four shown in FIG. 6, and the manner in which it is connected to the current sample-and-hold circuit $CSH_1$ and to the current-stabilizing element $QB_1$. In FIG. 7, elements which are the same as shown in FIG. 4 have been assigned the same reference symbols, and will not be explicitly described herein.

As shown in FIG. 7, the current-stabilizing element $QB_1$ uses p-channel element, which is complimentary to the n-channel amplifying transistor QA and n-channel current-establishing MOS transistor QD.

That is, the source of the current-stabilizing element $QB_1$ is connected via the vertical source line 2a to the amplifying transistor QA of the pixel 1, the drain of this current-stabilizing element $QB_1$ being connected to the drain of the current-establishing MOS transistor QD of the current sample-and-hold circuit $CSH_1$.

Therefore, the dark current ID or combined current (ID+IS) which is output from the pixel 1 (amplifying transistor QA) is input from the source of the current-stabilizing element $QB_1$, and output to the current sample-and-hold circuit $CSH_1$ from the drain of this current-stabilizing element $QB_1$.

In this manner, by outputting from the drain of the current-stabilizing element $QB_1$ the current which is output from the pixel 1, this current is given an immunity to the influence of variations in variations of the drain voltage, enabling a large reduction in fixed-pattern noise.

In general, the drain current flowing in the drain of a field-effect transistor (FET) is established by the gate-to-source voltage, the influence of drain voltage variations being small. Therefore, by holding the gate-to-source voltage of the current-stabilizing element $QB_1$ fixed to the bias voltage VB to hold it at a pre-established fixed value, the value of the combined current (ID+IS) output from the drain of the current-stabilizing element $QB_1$ is prevented from varying.

As a result, even if the value of the source voltage of the amplifying transistor QA when the dark current ID is stored by the current sample-and-hold circuits $CSH_1$ and $CSH_2$ is different from the value of this source voltage when the light signal current IS is read out, variation in the combined current (ID+IS) which passes through the current-stabilizing element $QB_1$ is prevented, thereby enabling a great reduction in fixed-pattern noise.

In reality, because the signal current flowing from the pixel 1 is slightly influenced by the drain voltages of the current-stabilizing elements $QB_1$ and $QB_2$, there is a small amount of remaining fixed-pattern noise. This is because of the difference in drain voltages between the current-stabilizing elements $QB_1$ and $QB_2$ and also because, when the light signal current IS is read out by the scanning of the horizontal scan circuit 6, the drains of the current-stabilizing elements $QB_1$ and $QB_2$ are electrically connected to the output terminal VO, placing them at a level equal to the bias voltage VR of the output amplifying circuit 8.

In this case, as shown in FIG. 6, the gate bias voltage VB, which is connected via the horizontal line 12a to the gate electrodes of the current-stabilizing elements $QB_1$ and $QB_2$, is adjusted so that the average of the drain voltages of the current-stabilizing elements $QB_1$ and $QB_2$ is equal to the bias voltage VR of the output amplifying circuit 8, thereby further reducing this slight remaining fixed-pattern noise.

Third Embodiment

Figure 8:
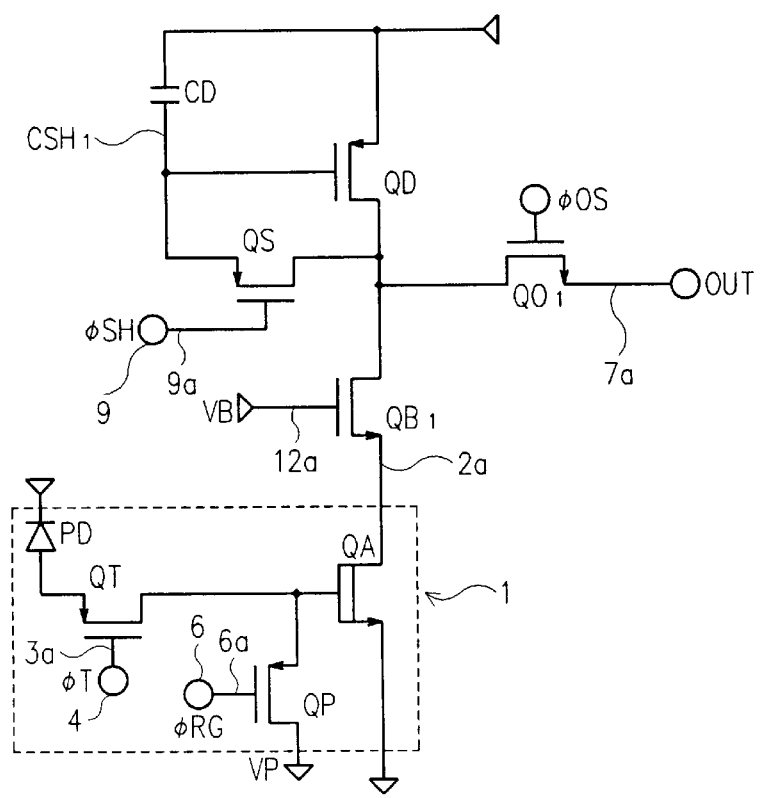
FIG. 8 is a schematic circuit diagram which shows the general configuration of a pixel in the third embodiment of a solid-state image pickup device according to the present invention.

FIG. 8 is a schematic circuit diagram which shows the general configuration of the third embodiment of a solid-state image pickup device according to the present invention. In the same manner as the case of FIG. 7, to simplify the description that follows, all that is shown in FIG. 8 is a single pixel of the plurality of pixels, and the manner in which it is connected to the current sample-and-hold circuit $CSH_1$ and to the current-stabilizing element $QB_1$. Additionally, elements in FIG. 8 which are the same as shown in FIG. 7 have been assigned the same reference symbols, and will not be explicitly described herein.

The difference in this third embodiment of a solid-state image pickup device with respect to the first and second embodiments of solid-state image pickup devices, is that the dark current ID and combined current (ID+IS) are output from the drain of the amplifying transistor of the pixel 1. That is, as shown in FIG. 8, the current sample-and-hold circuit $CSH_1$ is connected via the current-stabilizing element $QB_1$ to the drain of the amplifying transistor QA.

As shown in FIG. 8, by outputting the dark current ID and the combined current (ID+IS) from the drain of the pixel 1 amplifying transistor QA, the drain current flowing in the drain of the field-effect transistor (FET) is established by the gate-to-source voltage, so that the influence of variations in the drain voltage is small, thereby enabling a further reduction in the fixed-pattern noise. Additionally, because the dark current ID and the combined current (ID+IS) which are output from the amplifying transistor QA are of a polarity that is the opposite of the polarity in the case shown in FIG. 7, a p-channel transistor is used as the current-establishing MOS transistor QD.

Therefore, when the dark current ID and the combined current (ID+IS) are output from the pixel 1 amplifying transistor QA as shown in FIG. 8, because the above-described influence of voltage variation on the output current is small, the current-stabilizing element $QB_1$ is not absolutely necessary.

However, in a general solid-state image pickup device, to make the pixel size small, transistors having the smallest dimensions the design will allow are used, so that the drain current tends to be influenced by the drain voltage, by virtue of what is known as the narrow-channel effect.

Because of this phenomenon, in such cases a current-stabilizing element $QB_1$ is provided, one current-stabilizing element $QB_1$ being provided at each of the vertical source lines 2a and 2b, enabling a pixel to be made with large dimensions, thereby reducing the influence of the narrow-channel effect.

Although in the first to the third embodiments, a pixel 1 is used which does not have a gate electrode for the purpose of controlling the control region of the amplifying transistor by means of a coupling capacitance, it is of course possible to apply this to a pixel which has a gate electrode.

Furthermore, whereas in the first to the third embodiments the description was of the case of using a JFET as the amplifying section (amplifying transistor QA) of the pixel 1, the present invention is not limited in this manner, and can be applied even if the case of a MOS transistor or a bipolar transistor, and in general can be applied in the case of an element in which a voltage on a control electrode such as a gate or base can be used to control the output current at a drain or collector, or a source or an emitter, and also in the case in which a combination thereof is used. It is also possible to apply the present invention in the case of a CMD, AMI or other amplifying-type solid-state image pickup device.

Fourth Embodiment

Figure 9:
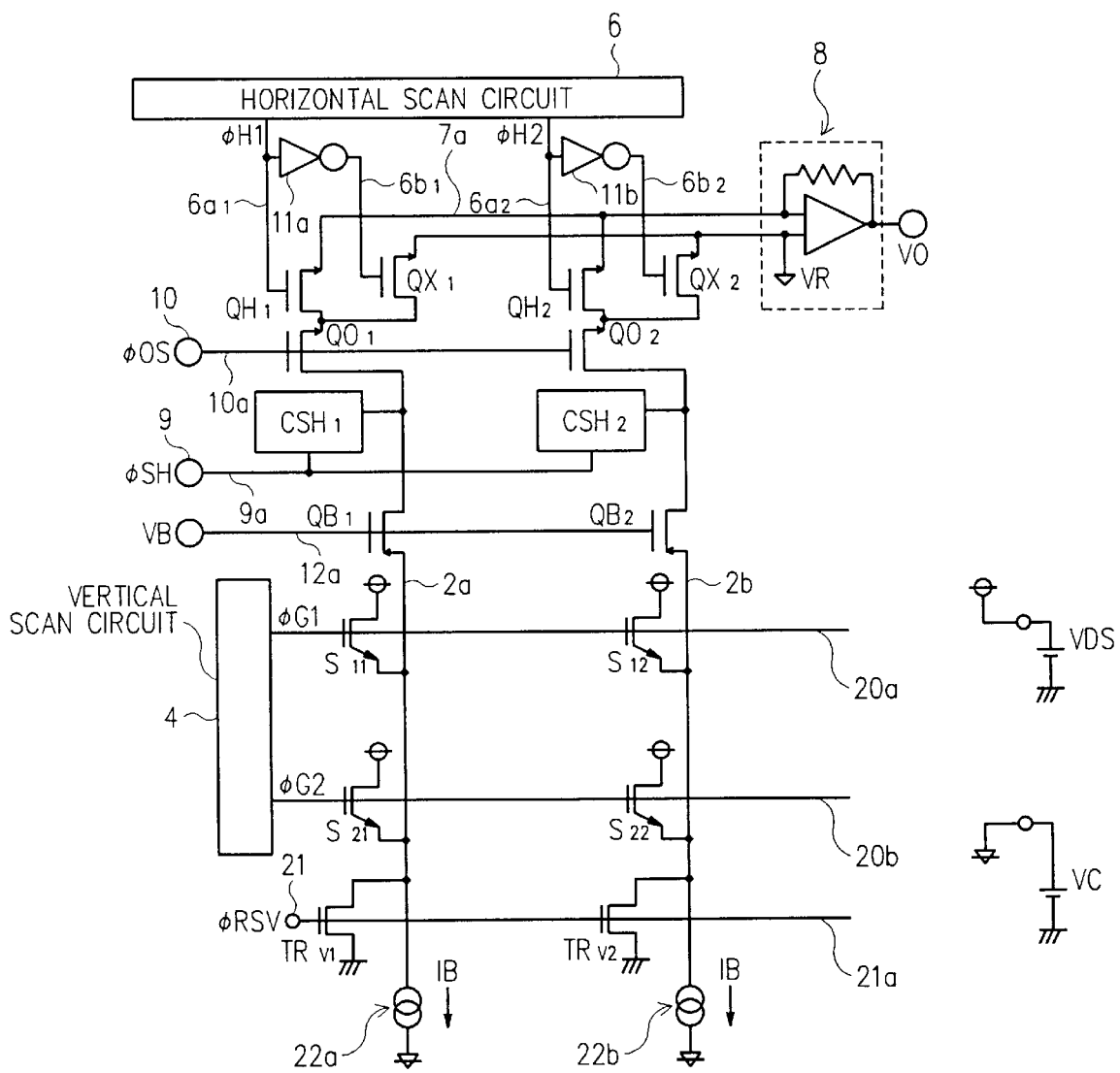
FIG. 9 is a schematic circuit diagram which shows the general configuration of the fourth embodiment of a solid-state image pickup device according to the present invention.

FIG. 9 is a schematic circuit diagram which shows the general configuration of the fourth embodiment of a solid-state image pickup device according to the present invention. It differs with respect to the first through the third embodiments with regard to the use of the MOS static induction transistors (MOSSITs) $S_{11}$, $S_{12}$, $S_{21}$, and $S_{22}$ which are provided in the photoelectric conversion section of each pixel. Elements in this embodiment which are the same as those in the first through the third embodiments have been assigned the same reference symbols and will not be explicitly described herein.

The solid-state image pickup device which is shown FIG. 9 is a device formed by adding to the solid-state image pickup device of FIG. 1 the current sample-and-hold circuits $CSH_1$ and $CSH_2$ and the current-stabilizing elements $QB_1$ and $QB_2$, which are the main parts of the present invention. Therefore, elements which are the same as elements in FIG.

1 have been assigned the same reference symbols and will not be explicitly described herein. Whereas in the solid-state image pickup device which is shown in FIG. 1, because of the use of a voltage signal-processing method, a voltage signal is output from the SIT transistors $S_{101}$, $S_{102}$, $S_{201}$, and $S_{202}$, these SIT transistors naturally operate also as current (current signal) amplifying elements.

In the solid-state image pickup device which is shown in FIG. 9, because the pixels $S_{11}$, $S_{12}$, $S_{21}$, and $S_{22}$ are SIT transistors, it is difficult after outputting the dark current ID to output the combined current (ID+IS). For this reason, in the case in which SIT transistors are used as pixels, in the same manner as in the case of the solid-state image pickup device shown in FIG. 1, first the drive pulse ΦG having a read out level $VG_2$ is applied to a pixel of a row which is selected by the vertical scan circuit 4, thereby outputting the combined current signal (ID+IS), which is formed by the light signal IS from the pixel and the dark signal ID, to the vertical source lines 2a and 2b, this being stored in the current sample-and-hold circuits $CSH_1$ and $CSH_2$.

Next, the drive pulse ΦAG having a resetting level $VG_3$ is applied to a pixel of a row which is selected by the vertical scan circuit, and the drive pulse ΦRV is set to the high level, thus placing the resetting MOS transistors $TR_{V1}$ and $TR_{V2}$ in the conducting (on) condition, thereby grounding the source lines 2a and 2b to reset the pixel.

Next, the resetting MOS transistors $TR_{V1}$ and $TR_{V2}$ are placed in the non-conducting (off) condition, the drive pulse Φαγ is again set to the readout level $VG_2$, and the dark current ID after the resetting of the pixel is output.

As a result, the dark current ID is output from the pixels $S_{11}$, $S_{12}$, $S_{21}$, and $S_{22}$, and because the current sample-and-hold circuits $CSH_1$ and $CSH_2$ are holding the combined current (IS+ID), the dark current ID flows to the current sample-and-hold circuits $CSH_1$ and $CSH_2$ along with the light signal current IS which flows toward the current sample-and-hold circuits $CSH_1$ and $CSH_2$ from the load side.

Therefore, although the polarity of the light signal current IS is the opposite of the polarity in the first and second embodiments, it is possible to read out just the signal component. That is, seen from the load side, the amount of current flowing toward the current sample-and-hold circuits $CSH_1$ and $CSH_2$ is the light signal current IS.

As described above, in the present invention because the amplified electrical charge (video signal) is treated as a current (current signal), fixed-pattern noise is reduced and it is also possible to obtain a good video signal S/N ratio.

In addition, with the present invention because the amplified electrical charge (video signal) is converted to a current and read out, it is possible to perform high-speed reading of the video signal.

Furthermore, in the present invention because the amplified electrical charge (video signal) is converted to a current (current signal) and read out, it is possible to use an amplifier circuit for amplification of the output which has a low input impedance, thereby simplifying the reduction of induced noise.

In the present invention, by providing a current sample-and-hold means and outputting a video signal (current signal) from which the video noise component has been removed, it is sufficient to provide only one low-impedance amplifying circuit, thereby eliminating the need to provide two amplifiers as existed in the past, and enabling a reduction in the cost of manufacturing the device.

In the present invention, because a current sample-and-hold means is provided, it is easy to eliminate the video signal (current signal) noise component.

In a photoelectric conversion device according to the present invention, for example, the output of a photoelectric current amplifying means immediate after resetting of the stored electrical charge in a photoelectric conversion means, that is, the dark current is caused to flow in a current-establishing means via a current-adjusting means. By doing this, the current which flows via the current-adjusting means from the current-establishing means is regulated by the current-establishing means, so that it becomes a prescribed bias current. In this condition, a prescribed bias current, which is regulated by the current-establishing means also flows in a amplifying element which is inserted between the photoelectric current amplifying means in the current-adjusting means and the current-establishing means, the result being that the bias condition of the amplifying element is automatically set to a condition under which a prescribed bias current flows in the amplifying element. Because the current-adjusting means has a function which holds the bias condition of the amplifying element under this condition, the bias condition of the amplifying element, for example the gate voltage in the case of an FET amplifying element, is held.

Next, the electrical charge which is obtained by photoelectric conversion of the incident light by the photoelectric conversion means is stored, amplified, and output as a current. The output current at this time is the combination of signal current according to the electrical charge stored in response to the incident light and the dark current. This combined output current flows via the amplifying element of the current-adjusting means into the current-establishing means, the current-establishing means allowing, as described above, the flow of only a prescribed bias current. This prescribed bias current is equal to dark current immediately after the resetting of the stored electrical charge of the photoelectric conversion means. Therefore, the signal current extracted at the connection point between the current-adjusting means and the current-establishing means is a current obtained by subtracting the dark current from the combined output current, this being a signal current corresponding to the incident light, with the dark current removed. That is, by virtue of the above-described configuration, a signal current is obtained which is completely free of the influence of the dark current.

By reading the signal current stored in response to the incident light, which is stored beforehand by the photoelectric conversion means, and holding the bias condition of the amplifying element of the current-adjusting means so that this read out current is equal to a prescribed bias current of the current-establishing means, it is possible thereafter to read out the dark current immediately after the resetting of the electrical charge stored in the photoelectric conversion means and to extract the signal current from the connection point between the current-adjusting means and the current-establishing means. In this case, although the polarity of the signal current is the opposite of the polarity in the above-described case, it is possible in the same manner as described above to obtain a signal current from which the influence of the dark current has been removed.

It is possible for the photoelectric conversion means to be configured from a photoelectric conversion element such as a photodiode, an amplifying element such as an FET, a transferring element which transfers the electrical charge detected and stored by the photoelectric conversion element to a control region of the amplifying element, and a switching element which resets the electrical charge in the control region of the amplifying element. In this case, it is possible to reset the electrical charge in the control region of the amplifying element by means of the switching element, and the output of the amplifying element immediately after the resetting can be read as the dark current. The electrical charge detected by the photoelectric conversion element can be transferred to the control region of the amplifying element by means of a transferring element which is set to on by a sampling pulse or the like, in which case the output of the amplifying element can be extracted as the signal current. By doing this, it is possible to implement the photoelectric conversion means with a relatively simple configuration and also without using special elements.

In addition, the current-adjusting means can be configured from a current-adjusting/amplification means which is inserted between the photoelectric conversion means and the current-establishing means, a capacitance which has one end connected to the control electrode of the current-adjusting/amplification element and other end grounded, and a sampling switching element which is connected between the current output electrode and the control electrode of the current-adjusting/amplification element. In this case, when the sampling switching element is on, the sampling operation, that is, the operation of sampling the output current of the photoelectric conversion means and setting the bias condition of the current-adjusting amplifying element so that the output current is equal to a prescribed bias current of the current-establishing means, is performed, and when the sampling switching element is off, holding operation is performed, whereby the potential of the control electrode of the current-adjusting/amplification element is held by means of the capacitance. By doing this, the on/off switching of the sampling switching element can be controlling with the prescribing timing, enabling extremely simple and effective detection and canceling out of the dark current of the photoelectric conversion means.

In a solid-state image pickup device according to the present invention, the dark current immediately after the resetting of the electrical charge of the pixels of each individual row or of all the rows is scanned sequentially in the column direction in common for each row, and the dark current from each pixel is read to a plurality of vertical read lines. This dark current passes through a current-adjusting circuit for each individual column and flows into the corresponding current-establishing circuit. By doing this, the bias condition of the current-adjusting amplifying element is set and held so that the dark current of the pixels of each column of the row selected by the current-adjusting circuit corresponding to each of the vertical read lines is equal to the prescribed bias current the corresponding current-establishing circuit.

Next, a current signal obtained by storing and amplifying an electrical charge responsive to the incident light of each pixel in the select row is output from each photoelectric conversion means, that is from each pixel, to the corresponding vertical read lines. Because the output current from each vertical read line is a current that is the combination of the signal current responsive the incident light and the dark current, and the dark current is equal to the prescribed bias current of the current-establishing circuit of the corresponding column, the current signal at the connection between the current-adjusting circuit of each column and the current-establishing means is sequentially output to the horizontal read line by the horizontal read switching circuit. By doing this, a signal current is output from the horizontal read line which is sequentially compensated for the dark current of the pixels of each column.

By virtue of the above-described configuration and operation, a high-quality video signal is obtained which is properly compensated for the dark current component of each pixel. Because it is sufficient to connect only one amplifying circuit to the horizontal read line, compared to the arrangement of the past, in which two circuits were used, the noise generated by the amplifying circuits can be reduced, and there is a simplification of the configuration of the device. Because current operation, in which the output signal is extracted as an electric power signal, is possible resetting of the horizontal read line is unnecessary, thereby improving the speed of operation. In addition, because in the case of current operation it is possible to use an output amplifying circuit with a low impedance, it is possible to reduce induced noise and the like.

In the above-noted solid-state image pickup device, it is desirable that each of the above-noted horizontal read switching circuits be provided with a second switching element which is on in complimentary fashion with the horizontal read switching element, for the purpose of causing current to flow in the horizontal read line when reading is not being performed. In this case, the current from pixels other than those selected by the horizontal head switching element is allowed to escape to some sort of bias power supply via the second switching element, thereby preventing the saturation of the output of the amplifying element of a pixel when reading is not being performed, and enabling proper readout operation.

By setting a read switch which is provided between each vertical read line and horizontal read switching circuit to off when the current-adjusting circuit is performing sampling, it is possible to prevent the output current of the vertical read line from flowing out into the horizontal read line. By doing this, it is possible to properly lead the vertical read line current to the horizontal switching circuit during the period in which it is possible to perform readout, that is, during the time period in which the current-adjusting circuit is performing a holding operation, making it possible to reliably read out the signal current which has been compensated for the dark current.

Each of the pixels, similar to the above-described case of the photoelectric conversion device, can be configured by a photoelectric conversion element, an amplifying element, a transferring element, and a switching element, enabling implementation of a high-performance pixel without using special elements.

In addition, it is possible to for the current-adjusting means to be configured, similar to the above-described photoelectric conversion device, by a current-adjusting amplifying element, a capacitance, and a sampling switching element, thereby enabling proper sampling operation and holding operations by means of on/off control of the sampling switching element.

Fifth Embodiment

Figure 10:
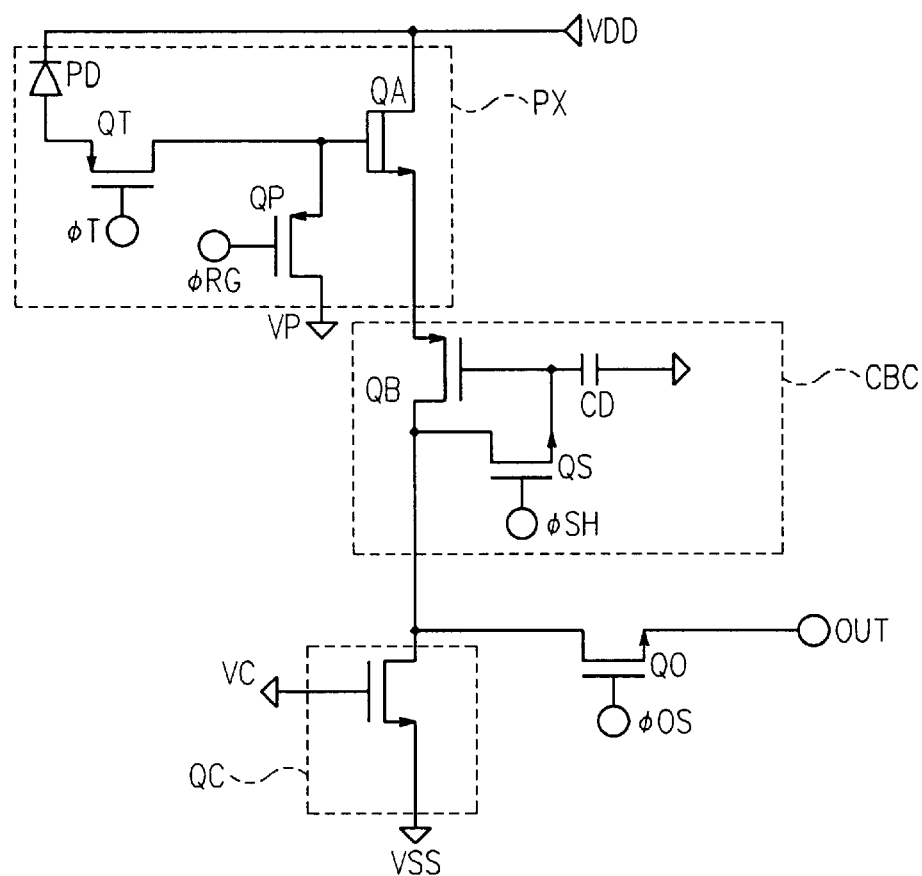
FIG. 10 is an electrical circuit diagram which shows the general configuration of a photoelectric conversion device of the fifth embodiment of the present invention.

The fifth embodiment of the present invention will be described next, making reference to the relevant drawings. FIG. 10 shows the general configuration of the fifth embodiment of a photoelectric conversion device according to the present invention. When used in a solid-state image pickup device, for example, the photoelectric conversion device shown in this drawing has a photoelectric current amplifying section PX which serves as a pixel, a current-establishing circuit QC, a current-adjusting circuit CBC, which is connected between the current-establishing circuit QC and the photoelectric current amplifying section PX, and an output switching element QO, to which is connected a main current circuit between the connection point of the current-adjusting circuit CBC and the current-establishing circuit QC and the output terminal OUT.

The photoelectric conversion section PX is configured by a photodiode PD, an amplifying element QA which is, for example, an n-channel field-effect transistor (FET), a transferring element QT, and a pre-charging element QP.

The photodiode PD has a power supply VDD connected to its cathode so as to apply to it a reverse bias voltage, and has a function of performing photoelectric conversion and a function of storing a converted electrical charge. The anode of the photodiode PD is connected to the source electrode of a PMOS transistor which forms the transferring element QT.

The drain of the PMOS transistor which forms the transferring element QT is connected to the gate of the amplifying element QA, and is also connected to the source of the pre-charging element QP. The gate of the transferring element QT receives a transfer pulse DT. The transferring element QT operates as an element which transfers the electrical charge of the photodiode PD to the gate of the amplifying element QA. The drain of the pre-charging element QP is connected to a prescribed pre-charging voltage VP. The pre-charging element QP is formed by a PMOS transistor, a drive pulse ΦRG applied to the base thereof acting to turn this element on, thereby pre-charging the gate of the amplifying element QA. The amplifying element shown here is an n-channel FET which operates as a source follower in which a source current flows in response to the gate voltage. The drain of the amplifying element QA is connected to the power supply VDD, the source of this amplifying element QA being connected to the current-adjusting circuit CBC.

The current-adjusting circuit CBC has a current-adjusting amplifying element QB, a sample-and-hold switching element QS, and a capacitance CD. The source of the current-adjusting amplifying element QB is connected to the source of the amplifying element QA of the photoelectric conversion section. The gate of the current-adjusting amplifying element QB is grounded via the capacitance CD. The current-adjusting amplifying element QB in this case is a PMOS transistor.

The sample-and-hold switching element QS is formed by an NMOS transistor, the drain of which is connected to the drain of the current-adjusting amplifying element QB, and the source of which is connected to the gate of the current-adjusting amplifying element QB. The gate of the sample-and-hold switching element QS has supplied to it a sample-and-hold pulse ΦSH, which will be described later.

The current-establishing circuit QC is formed in this case by an NMOS transistor, the drain of which is connected to the drain of the current-adjusting transistor QB of the current-adjusting circuit CBC, and also to the drain of the output switching element QO. The source of the NMOS transistor of the current-establishing circuit QC is connected to the fixed-potential side power supply VSS, and the gate of this transistor is connected to a prescribed bias power supply VC, so that a fixed current flows in the current-establishing circuit QC.

The output switching element QO is in this case an NMOS transistor, the drain of which is connected to the drain of the current-adjusting amplification element QB of the current-adjusting circuit CBC, the source of which is connected to the output terminal OUT, and the gate of which receives the read pulse ΦOS.

In the photoelectric conversion device of FIG. 10, first when the drive pulse ΦRG is set to the low level to set the pre-charging element QP to on, the gate of the amplifying element QA is biased to the pre-charging voltage VP. Then, even if the drive pulse ΦRG is set to the high level, thereby turning the gate of the amplifying element QA off, the gate of the amplifying element QA is held at VP by the effect of the gate parasitic capacitance. This is referred to as pixel resetting, at which time the thermal noise of the pre-charging element QP is added to the gate of the amplifying element QA as reset noise, this being referred to as KTC noise. That is, the gate voltage VGD of the amplifying element QA is given as follows in Equation (2).

$$VGD=VP+VN \qquad (4)$$

In the above, $VN=(KT/C)^{1/2}$

In the above relationship, K is Boltzmann's constant, T is the absolute temperature, and C is the gate capacitance. The current which flows in the source of the amplifying element QA immediately after the pixel is reset in this manner is called the dark current, which is denoted ID.

With the sample-and-hold switching element QS of the current-adjusting circuit CBC in the on condition, when the dark current ID is caused to flow from the amplifying element QA of the photoelectric current amplifying section PX, this dark current ID flows via the current-adjusting amplifying element QB to the current-establishing circuit QC. In this case, by the action of negative feedback, the gate voltage of the current-adjusting amplifying element QB is automatically adjusted and brought to a state of equilibrium in such as manner that the bias current IB established by the current-establishing circuit CBC flows in the drain thereof, that is, so that the dark current ID is equal to this bias current IB. The gate voltage of the current-adjusting amplifying element QB in this state of equilibrium is stored in the capacitance CD.

The action of the above-noted negative feedback will now been specifically described. In the case in which the output switching element QO is off, when the dark current flowing from the amplifying element QA attempts to exceed the prescribed bias current established by the current-establishing circuit QC, the drain voltage of the current-establishing circuit QC rises. The amount of this rise in voltage is transmitted via the sampling switching element QS to the gate voltage of the current-adjusting transistor QB, causing the gate voltage of that transistor to rise. As a result, the impedance of the current-adjusting amplifying element QB rises, thereby controlling it to a condition closer to cutoff, and causing the dark current flowing from the amplifying element QA to decrease. If on the other hand the dark current from the amplifying element QA is smaller than the prescribed bias current established by the current-establishing circuit QC, the drain voltage of the current-establishing circuit QC transistor decreases, so that the gate voltage of the current-adjusting amplifying element QB decreases. As a result, the internal impedance of the current-adjusting amplifying element QB is controlled in the direction of decreasing impedance, that is, in the direction closer to the on condition, resulting in an increase in the dark current ID. In addition to the dark current ID being automatically controlled so that it is equal to the bias current IB, the gate voltage of the current-adjusting amplifying element QB at that time is held in the capacitance CD. In this condition, even if the switching element QS is turned off, the held gate voltage of the current-adjusting amplifying element QB does not change, so that a constant current IB flows in the amplifying element QB.

By doing the above, and setting the current-adjusting circuit into the hold condition, followed by turning the transferring element QT on by means of the transfer pulse ΦT, the electrical charge stored in the photodiode PD is transferred to the gate of the amplifying element QA. By doing this, the gate voltage VGS of the amplifying element QA is given as follows.

$$VGS=VGD+VSIG, \quad VSIG=QSIG/CG \qquad (5)$$

In the above, QSIG is the amount of signal charge, and CG is the gate capacitance of the amplifying element QA. As is clear from the Equation (5), the gate voltage of the amplifying element QA is the dark voltage VGD with the signal voltage VSIG added to it.

When this is done, the amplifying element QA operates as a source follower and, because the gate of the current-adjusting amplification element QB is held at a constant voltage by the above-described action of the capacitance CD, the current-adjusting amplifying element QB operates as a grounded-gate amplification circuit. For this reason, the drain current of the current-adjusting amplifying element QB is the bias current IB of the current-establishing circuit QC with the signal current IS added to it. If this signal is applied to the current-establishing circuit QC, that is, if it is applied to the bias current generating circuit, and the output current is extracted from the connection point between the current-adjusting circuit CBC and the current-establishing circuit QC, a dark current which is equal to the bias current IB is absorbed by the current-establishing circuit QC, leaving only the remaining current component to be output. That is, with the output switching element QO on by means of the pulse ΦOS and the current extracted at the connection point between the current-adjusting circuit CBC and the current-establishing circuit QC, a current signal is output at the output terminal OUT, this signal being responsive to only the size of the incident light, the component due to the dark current having been removed from this output signal.

Figure 11:
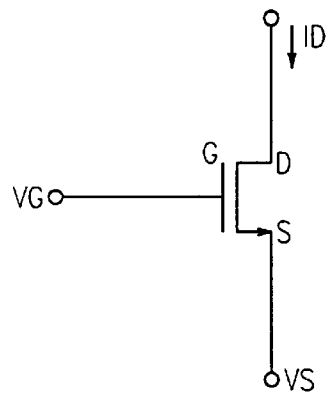
FIG. 11 and FIG. 12 are equivalent circuit diagrams for the purpose of illustrating the operation of canceling out the dark current in the photoelectric conversion device which is shown in FIG. 10.

Next, referring to FIG. 11 and FIG. 12, the operation of canceling out the dark current in a photoelectric conversion device such as described above will be described in more detail. As shown in FIG. 11, in general in a MOS transistor, if the gate voltage is VG, the source voltage is VS, and the gate-to-source threshold voltage is VT, the drain current ID is expressed by the following equation.

$$ID=\beta(VG-VS-VT)^2 \qquad (6)$$

In the above equation, β is a prescribed coefficient of proportionality.

Figure 12:
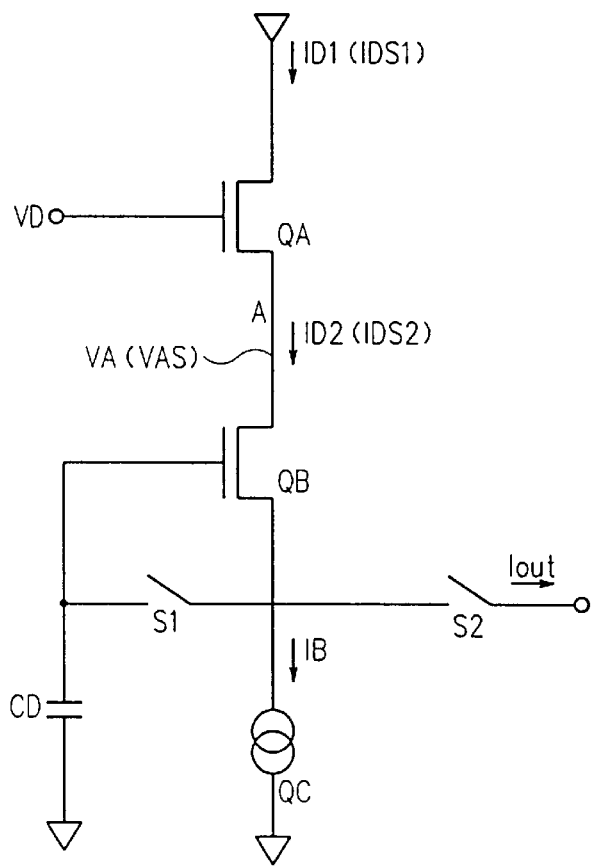

FIG. 12 is an equivalent circuit diagram of the main part of the photoelectric conversion device of FIG. 10. In FIG. 12, the transistor QA is the amplifying element QA of FIG. 10, the transistor QB is the current-adjusting amplifying element QB of the current-adjusting circuit CBC, both of these being assigned the same reference symbols as previously. The current-establishing circuit QC of FIG. 10 is indicated as the fixed-current source QC in FIG. 12. The sample-and-hold switching element QS of FIG. 10 is indicated as the switch S1, and the output switching element QO is indicated as the switch S2. The capacitance CD which is connected between reference voltages such as the gate of the transistor QB and ground is the same as the capacitance CD of the current-adjusting circuit CBC of FIG. 10.

Additionally in FIG. 12, the current flowing in the drain of transistor QA is denoted ID1, the current flowing in the drain of transistor QB is denoted ID2, and the current flowing in the fixed-current source QC is denoted IB. The potential at the connection point between the source of the transistor QA and the source of the transistor QB is denoted VA, and the gate voltage of the transistor QB is denoted VB. Based on the above-noted nomenclature, the drain current ID1 of the transistor QA and the drain current ID2 of the transistor QB are given by the following equations.

$$ID1=\beta1\ (VD-VA-VT1)^2 \qquad (7)$$

$$ID2=\beta2\ (VA-VB-VT2)^2 \qquad (8)$$

In the above, VT1 and VT2 are the threshold voltages of transistor QA and transistor QB, respectively, and β1 and β2 are prescribed coefficients of proportionality of transistor QA and transistor QB, respectively.

Because ID1=ID2, the following equation can be derived from Equation (7) and Equation (8).

$$\beta1\ (VD-VA-VT1)^2=\beta2\ (VA-VB-VT2)^2 \qquad (9)$$

The above can be solved for VB, resulting in the following equation.

$$VB=(\beta1^{1/2}/\beta2^{1/2})\ (VD-VA-VT1)\ -(VA+VT2) \qquad (10)$$

When performing readout of the dark current, because ID1=ID2, the following equation obtained by using Equation (7).

$$\beta1\ (VD-VA-VT1)^2=IB \qquad (11)$$

This equation can be re-arranged as follows.

$$VA=VD-VT1-(IB/\beta1)^{1/2} \qquad (12)$$

The following equation is obtained by substituting Equation (12) into Equation (10).

$$VB = (\beta1^{1/2}/\beta2^{1/2})[VD-\{VD-VT1-(IB/\beta1)^{1/2}\} - \qquad (13)$$
$$VT1] - [\{VD-VT1-(IB/\beta1)^{1/2}\}+VT2]$$
$$= \{1/(\beta1)^{1/2}+1/(\beta2)^{1/2}\}IB^{1/2} - VD + VT1 - VT2$$

The voltage VB as expressed in the thus-obtained Equation (13) is the voltage that is stored in the capacitance CD.

Next, in the case in which the transferring element QT (refer to FIG. 10) is switched on to transfer the electrical charge which is stored in the photodiode PD (refer to FIG. 10) to the gate of the transistor QA, the drain currents IDS1 and IDS2 of transistors QA and QB, respectively, are expressed as follows.

$$IDS1=\beta1\ (VP+VD-VAS-VT1)^2 \qquad (14)$$

$$IDS2=\beta2\ (VAS-VB+VT2)^2 \qquad (15)$$

In this case, while the gate voltage of the transistor QA is a value of VP+VD, which is the gate voltage VD when reading out the dark current added to the signal component VP responsive to the incident light, the gate voltage VB of the transistor QB is does not change, because the capacitance CD is held at the voltage to which it is charged when the dark current is read out. In the above relationships, VAS is the voltage at the connection point A between the source of the transistor QA and the source of the transistor QB.

In this case as well, because the drain currents of transistors QA and QB are equal, if IDS1=IDS2, Equation (14) and Equation (15) enabling the following equation to be derived.

$$\beta1^{1/2}(VP+VD-VAS-VT1)=\beta2^{1/2}(VAS-VB+VT2) \qquad (16)$$

From this equation, the voltage VAS at node A can be expressed as follows.

$$VAS=\{\beta1^{1/2}(VP+VD-VT1)+\beta2^{1/2}(VB-VT2)\}/(\beta1^{1/2}+\beta2^{1/2}) \qquad (17)$$

If Equation (17) is substituted into Equation (14), the drain current IDS1 of the transistor QA is expressed as follows.

$$IDS1 = \beta1[VD + VP - \{\beta1^{\frac{1}{2}}(VD + VP - VT1) + \qquad (18)$$
$$\beta2^{\frac{1}{2}}(VB - VT2)\} / (\beta1^{\frac{1}{2}} + \beta2^{\frac{1}{2}}) - VT1]^2$$
$$= [\beta1 \cdot \beta2 / (\beta1^{\frac{1}{2}} + \beta2^{\frac{1}{2}})^2] \cdot$$
$$\{VP + (VD - VB - VT1 + VT2)\}^2$$

If VB of Equation (13) is substituted into the thus-obtained Equation (18), the following equation results.

$$IDS1 = [\beta1 \cdot \beta2 / (\beta1^{\frac{1}{2}} + \beta2^{\frac{1}{2}})^2] [VP + VD - VT1 + VT2 - \qquad (19)$$
$$\{(1/\beta1^{\frac{1}{2}} + 1/\beta2^{\frac{1}{2}})IB^{\frac{1}{2}} - VD + VT1 - VT2\}]^2$$
$$= [\beta1 \cdot \beta2 / (\beta1^{\frac{1}{2}} + \beta2^{\frac{1}{2}})^2] \cdot$$
$$([VP + (1/\beta1^{\frac{1}{2}} + 1/\beta2^{\frac{1}{2}})IB^{\frac{1}{2}}])^2$$
$$= B\{VP + IB \cdot 1/B^{\frac{1}{2}}\}^2$$

In the above, $B = \beta1 \cdot \beta2/(\beta1^{1/2} + \beta2^{1/2})^2$, and $1/\beta1^{1/2} + 1/\beta2^{1/2} = 1/B^{1/2}$.

Because the output current Iout is extracted from the connection point between the transistor QB and the fixed-current source QC by turning the switch S2 on, it can be expressed as follows.

$$I_{out} = IDS1 - IB = B \cdot VP^2 + 2VP \cdot (B \cdot IB)^{1/2} \qquad (20)$$

As is clear from this Equation (20), the output current Iout has had the transistor QA gate voltage VD component when the dark current is read out removed from it, so that complete compensation has been performed for the dark current. The threshold voltage VT1 and VT2 components, which represent a major cause of fixed-pattern noise, are also removed, so that there is complete elimination of the influence of variation in threshold voltage values between the transistors QA and QB.

Sixth Embodiment

Figure 13:
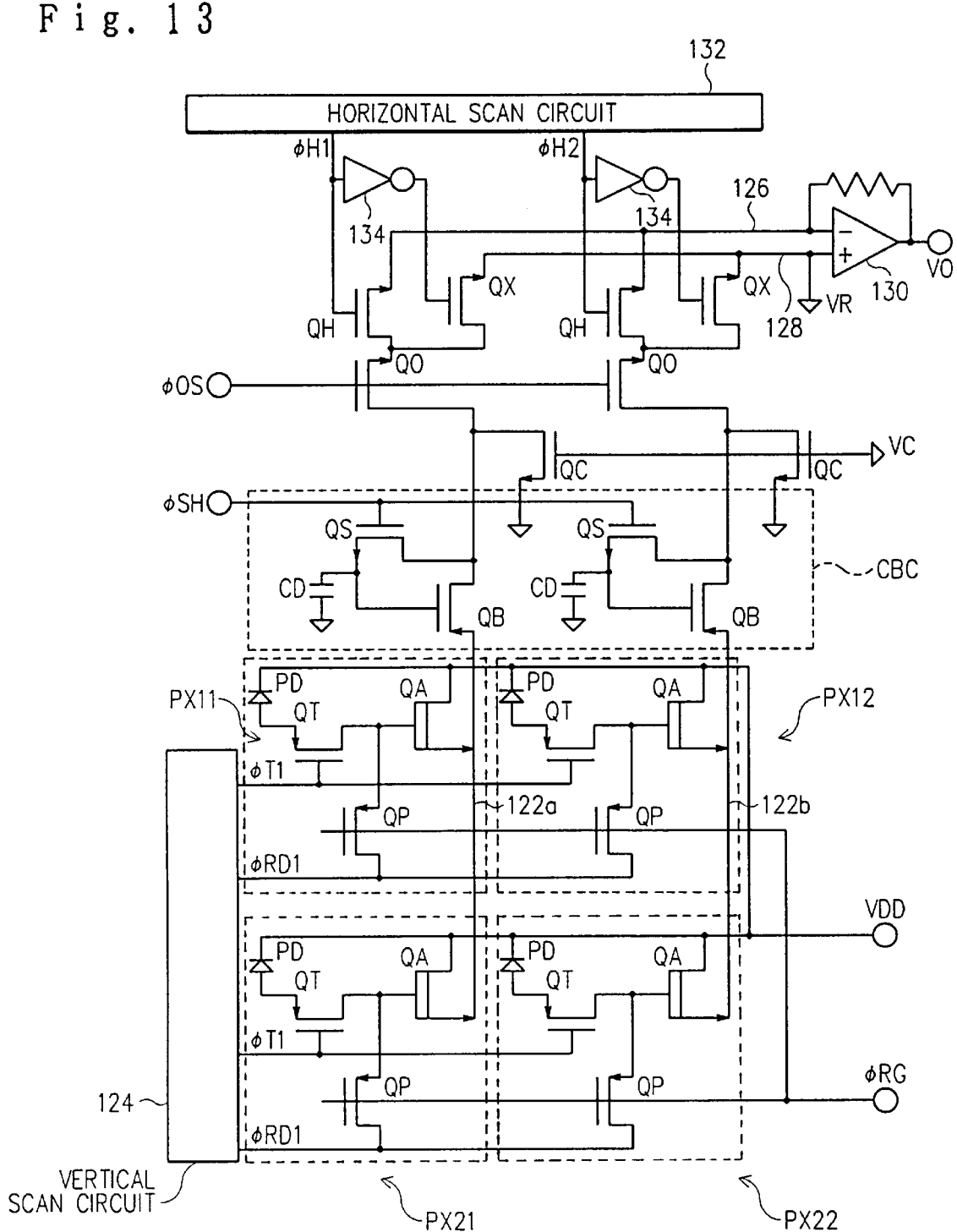
FIG. 13 is an electrical circuit diagram which shows the general configuration of the sixth embodiment of a solid-state image pickup device according to the present invention.

FIG. 13 shows the circuit configuration of a solid-state image pickup device which uses the photoelectric conversion device of FIG. 10. In FIG. 13, to simplify the description, the example of a two-pixel-by-two-pixel solid-state image pickup device is used. In FIG. 13, constitution elements that are the same as shown in FIG. 10 have been assigned the same reference symbols.

Each of pixels PX11, PX12, PX21, and PX22 are formed from the same constitutional elements and have the same internal connections as the photoelectric current amplifying section PX in FIG. 10. The sources of the amplifying elements QA of pixels PX11 and PX21 are connected to the vertical read line 122a, and the sources of the amplifying elements QA of pixels PX21 and PX22 are connected to the vertical read line 122b. The drains of the amplifying elements QA of pixels PX11, PX12, PX21, and PX22 are connected in common to the power supply voltage VDD. The gates of transferring elements QT of pixels of the same row are connected together to the transfer pulse (ΦT) output of the vertical scan circuit 124 which corresponds to that row. In addition, the gates of the pre-charging elements QP of the pixels PX11, PX12, PX21, and PX22 are connected in common and receive the pre-charging control signal ΦRG.

Each of the vertical read lines 122a and 122b has connected to it a current-adjusting circuit CBC which has the same configuration as in FIG. 10. The constitutional elements and internal connection of the current-adjusting circuits CBC which is connected to each of the vertical read lines 122a and 122b are the same as the current-adjusting circuit CBC shown in FIG. 10. The gate of the sample-and-hold switching element QS of each current-adjusting circuit CBC is connected so as to commonly receive the sample-and-hold pulse ΦSH.

The drains of each of the current-adjusting amplifying elements QB of the each current-adjusting circuit CBC is connected to the drain of an MOS transistor of a current-establishing circuit QC, which is provide for each column, and further is connected to the drain of the output switching element QO which is provided for each column. The gates of each output switching element QO are connected so as to receive in common the read pulse ΦOS.

The sources of each of the output switching elements QO is connected to the drain of a shunting switching element QX and further the sources of each of the switching elements QH and QX are connected respectively to the horizontal read line 126 and to a bias power supply line 128 which is connected to a bias power supply VR such as ground. The horizontal read line 126 and the bias power supply line 128 are each connected to, for example, the inverting and non-inverting inputs of the output amplifier 130.

The gate of the horizontal read switching element QH and the gate of the shunting switching element QX are supplied by, respectively, the horizontal scan pulse ΦH from the horizontal scan circuit 132 and the inverted horizontal scan pulse output from the inverter 134. Therefore, the switching elements QH and QX operating in complimentary fashion.

Figure 14:
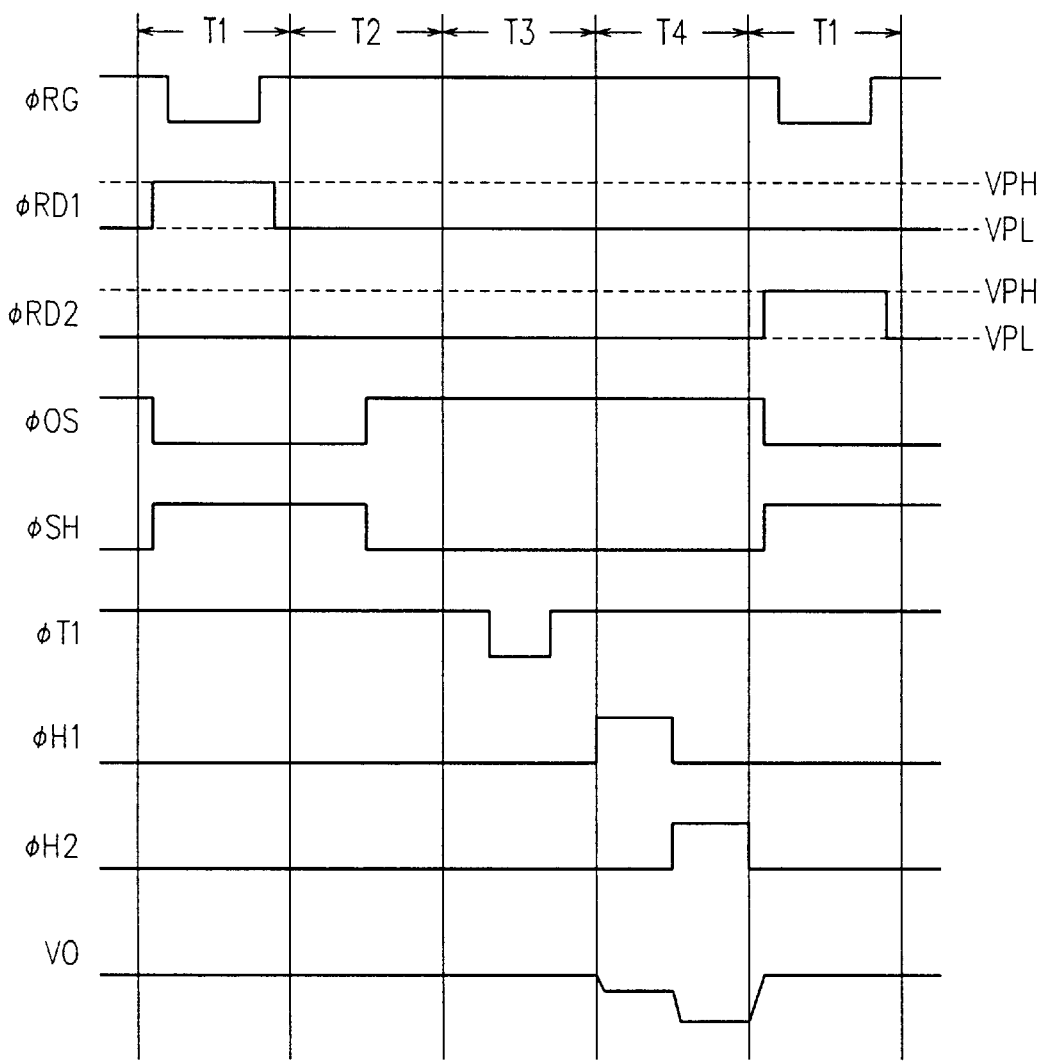
FIG. 14 is a timing diagram for the purpose of illustrating the operation of the device which is shown in FIG. 13.

Next, the operation of the solid-state image pickup device of FIG. 13 will be described, with reference being made to the timing diagram of FIG. 14.

(1) The time period T1 is a pixel reset period, during which the control pulse signal ΦRG turns the pre-charging element QP of all pixels on. When doing this, the vertical scan circuit 124 sets the drive signal ΦRD1 of the pixels of a selected row to, for example, a high-voltage of VPH, and sets the drive signal ΦRD2 of the pixels for non-selected rows to, for example, a low-level voltage of VPL. Therefore, the drains of the pre-charging elements QP of selected pixels, such as for example PX11 and PX12, are at VPH, so that therefore the gate of the amplifying element QA is at this level of VPH, the gate of the amplifying element QA of the other pixels, PX21 and PX22 in this case, being biased to a level of VPL.

Then, even if the drive signal ΦRG is set to the high level, thereby turning off each pre-charging element QP, because of the effect of parasitic capacitance (not shown in the drawing), the gate voltage for selected pixels is VPH, and the gate voltage for non-selected pixels remains biased to VPL. At this bias voltage is set so that while the dark current flows in the amplifying elements QA of selected pixels, which are turned on, the amplifying elements QA of non-selected pixels are deeply biased so that they are in the cutoff condition.

Therefore, this dark current for the pixels of a selected row is applied to the current-adjusting circuits CBC for each column. As described above, this dark current includes reset noise. If this dark current is applied to the current-adjusting circuit thereby turning on the sample-and-hold switching element QS, automatic biasing is done so that the dark current ID of pixels in the selected row of each column is made equal to the bias current IB of the current-establishing circuit of each of the rows. It is acceptable to have a slight variation in the dark current and bias current IB between the rows.

(2) The time period T2 is a hold time period, during which the sample-and-hold pulse ΦSH sets the sample-and-hold switching element QS of the current-adjusting circuit of each row off from the on condition, thereby causing the holding of the bias current IB in each of the current-adjusting circuits CBC. When doing this, the read pulse ΦOS operates in compliment to the sample-and-hold pulse ΦSH, the read MOS transistor QO being turned on so as to connect it to the output when the current-adjusting circuit CBC is holding.

(3) The time period T3 is a transfer time period, during which a transfer pulse ΦT1 is applied from the vertical scan circuit 124 with respect to the selected pixels, for example PX11 and PX12, thereby transferring the signal electrical charge of the photodiode PD to the gate of the corresponding amplifying element QA. When the output of the amplifying element of the pixels of the selected row is applied to the current-adjusting circuit CBC of each corresponding row, as described above, the output current of the current-adjusting circuit CBC has the signal component only amplified, the dark current component being absorbed by the transistor QC of the current-establishing circuits of each column. Therefore, the current that appears at the output is the video signal component only.

(4) The time period T4 is a horizontal read time period, during which the horizontal read switching elements QH for each column are scanned from the horizontal scan circuit 132 to read out the video signal current. For example, when the horizontal read pulse ΦH1 is set to a high level, the horizontal read switching element QH which corresponds to the vertical read line 122a is set to on, the above-described video signal current thereby flowing in the horizontal read line 126, this being amplified by the amplifier 130 and output as the output voltage VO. For pixels other than those selected by the horizontal read switching element QH, the shunting switching element QX is turned on, so that the output current from each column is allowed to escape to the bias powers supply VR, thereby preventing saturation of the output of the amplifiers of non-selected pixels. By doing this, the pixels of each column and row are sequentially selected and the video signal corresponding to the light incident thereto is output from the amplifier 130.

In the reading method of the present invention as described above, the potential on the horizontal read line is maintained at a constant voltage VR by means of imaginary shorting (grounding) of by the amplifier 130. As a result, there is no variation in horizontal read line potential. That is, there is no electrical charge on the horizontal read line to be charged and discharged. For this reason, whereas in the prior art it was necessary to reset the parasitic capacitance on the horizontal read line each time the output current was read from each vertical read line, this requirement is eliminated.

It should be noted that there is no limitation of the amplifying element of each pixel to a field-effect transistor such as MOS which is used in the fifth and sixth embodiments of the present invention, it also being possible to apply the present invention in the case of an element in which a voltage on a control electrode such as a gate or base can be used to control the output current at a drain or collector, or a source or an emitter, and also in the case in which a combination thereof is used.

Seventh Embodiment

Figure 15:
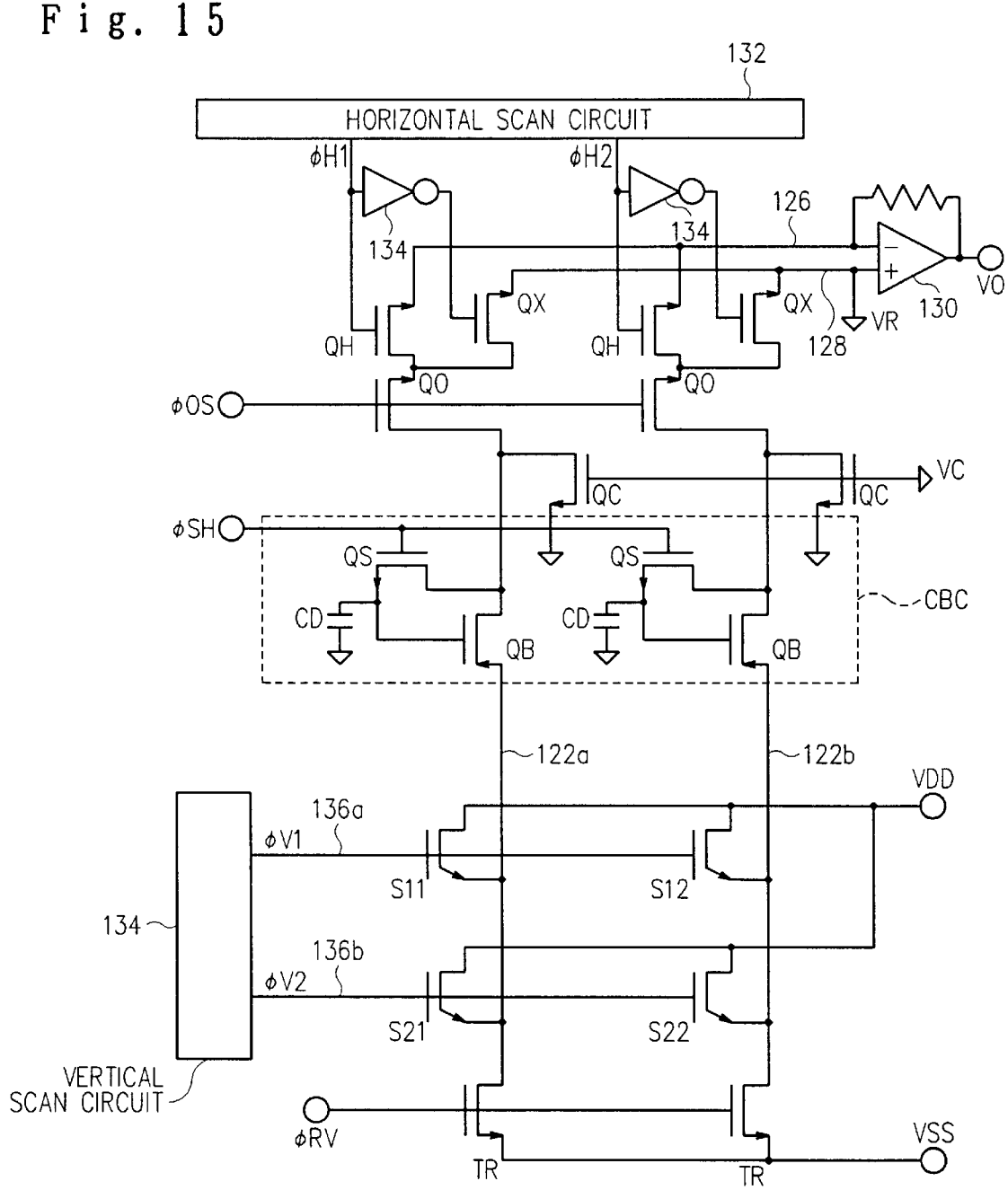
FIG. 15 is an electrical circuit diagram which shows the general configuration of the seventh embodiment of a solid-state image pickup device according to the present invention.

FIG. 15 shows the seventh embodiment of a solid-state image pickup device according to the present invention, in which an SIT is used as a pixel. In the device shown in FIG. 15, in place of the pixels PX11, PX12, PX21, and PX22, the SITS S11, S12, S21, and S22 are used. In the device of FIG. 15, the vertical scan circuit 134 and the current-adjusting circuit CBC, current-establishing circuit QC, horizontal scan circuit 132 shown above the pixel matrix part of this drawing and other parts are the same as shown in FIG. 13.

The sources of each of SIT transistors S11, S12, S21, and S22 are connected in common for each column to the corresponding vertical read lines 122a and 122b, the drains thereof being connected in common to the power supply voltage VDD. The gates of the SIT transistors S11, S12, S21, and S22 are connected in common for each row to the corresponding clock lines 136a and 136b, which are scanned by means of the vertical scan circuit 134, drive being applied in units of rows by means of the voltage drive pulses ΦV1 and ΦV 2 supplied by the vertical scan circuit 134.

One end of the vertical read lines 122a and 122b, as described above, is connected to the source of the current-adjusting amplification element QB of the corresponding current-adjusting circuit CBC.

The other end of the vertical read lines 122a and 122b is connected to the power supply VSS via the resetting MOS transistor TR for each corresponding column. The gate of each of the resetting MOS transistors TR is controlled by the resetting pulse ΦRV.

In the solid-state image pickup device shown in FIG. 15 as well, in the same manner as for the solid-state image pickup device shown in FIG. 13, a row line, such as line 136a, which is selected by the vertical scan circuit 134, has the drive pulse, for example ΦV1, applied to it, thereby turning on the SITs, for example S11 and S12, for the selected row, so that a video signal is output to the vertical read lines 122a and 122b from the sources of each SIT.

Note, however, that in the case of an SIT since the electrical charge storage section and amplification section are not separated, it is difficult to first read out the dark current, and then immediately afterwards transfer the signal electrical charge to the amplifying element to read out the signal current, as is done in the case of the solid-state image pickup device of FIG. 13. For this reason, in the image pickup device shown in FIG. 15, the readout sequence is the same as in the prior art, a combined signal current being first read and stored in the current-adjusting circuit CBC, followed by readout of the dark current after resetting of the pixel.

That is, in each current-adjusting circuit CBC, a capacitance holds the gate voltage of the current-adjusting amplifying element QB, so that the combined signal current is equal to the bias current IB of the current-establishing circuit QC. In this condition, if a pixel is reset and the current is read out, while the polarity of the output current is reversed, it is possible to read the signal component in the same manner, with fixed-pattern noise removed therefrom. The resetting of each SIT, as is widely known, can be performed by first turning on a resetting transistor TR by means of a drive pulse ΦRV, and then applying a prescribed resetting level voltage to the gate of the SIT. Other aspects of the operation of the device shown in FIG. 15 are the same as described with regard to FIG. 13.

In a solid-state image pickup device according to the present invention, it is possible to use as pixels, in addition to the above-described types of FETs, MOS transistors, and SITs, the amplification section of an AMI, CMD, or BASIS solid-state image pickup device. However, when using a pixel in which the electrical charge storing section and amplifying section are not separated, because, as noted above, it is difficult to first read out the dark current, and then immediately afterwards transfer the signal electrical charge to the amplifying element to read out the signal current, a combined signal current is first read and stored in the current-adjusting circuit CBC, followed by readout of the dark current after resetting of the pixel.

While the descriptions of the fifth through the seventh embodiments used the example of a solid-state image pickup device having a single photoelectric conversion device and a two-dimensional pixel matrix, the present invention is not limited to such and arrangement, it being obvious that even when applied to, for example, a one-dimensional line sensor, it is possible to achieve in the same manner a reduction of both fixed-pattern noise and random noise.

According to the present invention as described above, it is not only possible to almost completely eliminate fixed-pattern noise by means of a simple circuit configuration, but also to achieve a photoelectrically converted signal or video signal of extremely high quality.

Furthermore, whereas in the prior art it was necessary to have two output amplifying circuits in a solid-state image pickup device, using the present invention it is sufficient to have just one amplifying circuit for readout, thereby not only reducing the noise generated by the amplifier to $\frac{1}{2}^{1/2}$ of that in the prior art, but also achieving both a hardware simplification and cost reduction.

In addition, whereas in the case of a prior art solid-state image pickup device which used voltage processing it was necessary to reset the horizontal read line, thereby leading to a reduction in operating speed, with the present invention, in which readout is done using current processing, there is no need to perform a resetting operation of the horizontal read line, thereby resulting in improved operating speed.

Another advantage of the present invention is that, whereas with a device of the prior art which performed voltage processing it was necessary to have an amplifier circuit having a high input impedance for use as a readout amplifier, thereby causing susceptibility to induced noise, with the present invention, because current processing is performed, it is possible to use an amplifier circuit having a low input impedance for readout, thereby reducing induced noise, known as crosstalk, and providing a output signal of improved quality.

A solid-state image pickup device according to the present invention has a constitution which is chiefly formed by a plurality of pixels, a plurality of vertical read lines, a horizontal read line, a storage means, a first switching means, a voltage-to-current conversion means, and a second switching means.

The above-noted plurality of pixels are arranged in a two-dimensional matrix, and convert an electrical charge responsive to light incident thereto to a voltage, and output this. The plurality of vertical read lines scan the pixels sequentially in the column direction for each row in the matrix arrangement, and extract for each column a voltage signal for each pixel. The horizontal read lines scan the plurality of vertical read lines in the row direction, and sequentially output a current signal as a time series for each row.

The storage means is provided on each of the vertical read lines, and stores the voltage signal which is output from a pixel when the pixel, which is connected to the vertical read line is scanned. The first switching means is connected to each storage means, and controls the storage and resetting operations of all the storage means.

The voltage-to-current converting means, by performing sequential control of the first switching means and each pixel of each row, outputs at different times a voltage signal consisting of a first component, which is responsive to the sum of the amount of light incident to a pixel and the dark output, and a voltage signal consisting of a second component which is responsive to the dark output. Next, the voltage-to-current converting means stores one of the first-component voltage signal and the second-component voltage signal in the storage means, then performs a subtraction between the other of the first-component voltage signal and the second-component voltage signal and the voltage signal which has already stored in the storage means, thereby outputting a current signal corresponding to a voltage signal having only a component which is responsive to the amount of incident light.

The second switching means is provided between each of the voltage-to-current conversion means and the horizontal read line and sequentially reads out to the horizontal read line the current signal which is output from the voltage-to-current conversion means of each vertical read line.

That is, in the present invention, one of either a voltage signal consisting of a fist component which is responsive to the sum of the amount of incident light and the dark output from the plurality of pixels and a voltage signal consisting of a second component which is responsive to the dark output is output, the thus-output voltage signal being stored by the storage means, which is controlled by the first switching means.

Then, when from the plurality of pixels, the other current of the voltage signal consisting of a first component responsive to the sum of light incident to a pixel and the dark output and a voltage signal consisting of a second component responsive to the dark output is output, this output and the voltage signal which has already been stored in the current sample-and-hold means are combined so as to perform a subtraction between these two voltage signals. By doing this, a voltage signal consisting of a component which is responsive only to the incident light is read out to the horizontal read line in accordance with the controlling operation of the first switching means.

That is, if we hypothesize that the current signal stored in the current sample-and-hold means is a voltage signal (VS+VD) consisting of a first component which is responsive to the sum of the incident light(S) and the dark output (D) and further hypothesize that the voltage signal output from the pixel thereafter is a voltage signal (VD) consisting of a second component which is responsive to the dark output (D), the subtraction (VS+VD)−(VD)=(VS) is performed, a voltage signal (VS) consisting of a component (S) which is responsive to only the incident light is read out to a horizontal read line in accordance with the control operation of the first switching means.

The voltage signal (VS) which is applied to the voltage-to-current conversion means is converted to a current signal (IS) corresponding to this voltage signal (VS), the operation of the second switching means resulting in the readout to the horizontal read line of only a current signal (IS) consisting of component which is responsive to the amount of incident light.

Therefore, because the video signal read out to the horizontal read line is read as a current signal, the charge distribution caused by the parasitic capacitance existing on the horizontal read line is eliminated, thereby enabling an improvement in the video signal S/N ratio.

In the present invention, because the video signal read out to the horizontal read line is a current signal, it is possible to perform high-speed reading of the video signal.

That is, in a solid-state image pickup device in the prior art, because the video signal read out to the horizontal read line is read as a voltage, it is not possible to ignore the parasitic capacitance that exists on the horizontal read line. For example, in reading the video signal to the horizontal read line, after the parasitic capacitance is charged, because it is necessary to reset the electric charge stored in the parasitic capacitance, a problem arises in that the speed of the reading operation decreases to the extent that time is required for this resetting operation. With the present invention, because the video signal read out to the horizontal read line is a current signal, even if the above-noted parasitic capacitance exists, there is no need to perform a charging and resetting operation of this parasitic capacitance, thereby enabling high-speed reading of the video signal.

In addition, because a voltage signal obtained by performing a subtraction between a voltage signal consisting of a first component which is responsive to the sum of the incident light and the dark current output from the pixel and a voltage signal consisting of a second component which is responsive to the dark output is converted to a current signal, it is not necessary to have the two horizontal read lines as in the past, it being possible to have just one such line.

As a result, it is not necessary to have two buffer amplifiers such as in solid-state image pickup devices of the past, this enabling a reduction in cost. Also, because the video signal output from the horizontal read line is treated as a current signal, it becomes possible to use an output circuit having a low input impedance, thereby eliminating the influence on the output video signal of externally induced noise.

In another solid-state image pickup device according to the present invention, the pixel is configured from, for example, a photoelectric conversion element, an amplifying element, a transfer control element, and a reset control element.

The above-noted photoelectric conversion element stores an electrical charge responsive to the incident light. The amplifying element generates a signal output in response to an electrical charge which is received in a control region. The transfer control element selectively transfers an electrical charge which is generated and stored by the photoelectric conversion element to the control region of the amplifying element. The resetting element selectively resets the electrical charge of the control region of the amplifying element.

That is, in the past, when using a MOS static induction transistor (MOSSIT), because due to the construction of the pixel it is necessary to perform a reset (initialization) operation of the pixel between the output of the combined voltage signal (VD+VS) and the output of the dark voltage signal (VD), the operation of reading the video signal is slowed the extent of the time required for performing this resetting operation. However, in a pixel configuration such as in present invention, even if a pixel reset (initialization) operation is not performed between the output of a current signal consisting of a first component which is responsive to the sum of the amount of incident light and the dark output and a current signal consisting of a second component which is responsive to the dark output, it is still possible to output two current signal, thereby enabling a further increase in the speed of reading the video signal.

Eighth Embodiment

Figure 16:
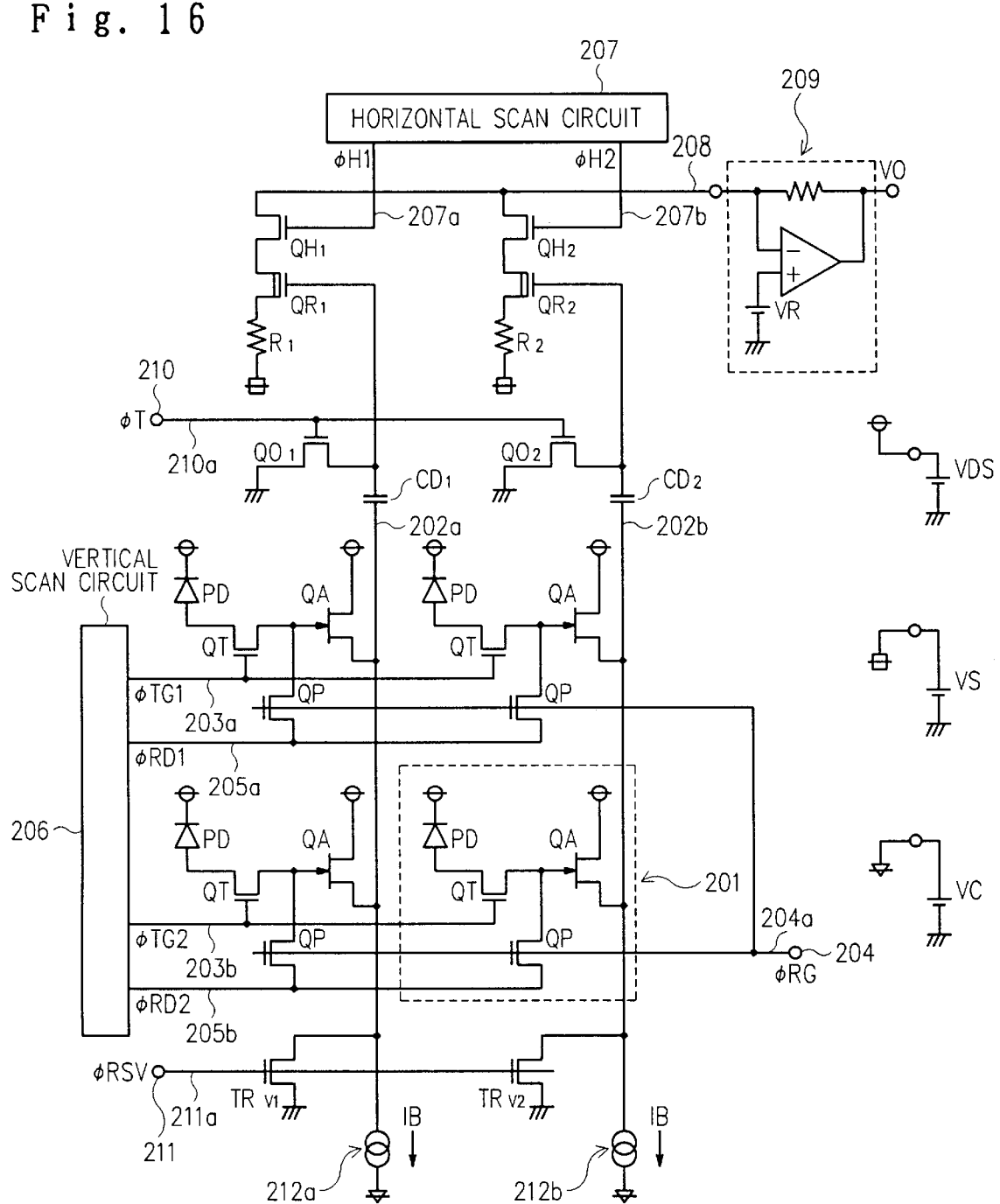
FIG. 16 is a schematic circuit diagram which shows the general configuration of the eighth embodiment of a solid-state image pickup device according to the present invention.

FIG. 16 is a schematic circuit diagram which shows the general configuration of the eight embodiment of a solid-state image pickup device according to the present invention. In the solid-state image pickup device shown in FIG. 16, to simplify the description to follow, the example shown is that of a two-column-by-two-row matrix arrangement of pixels 201. Each pixel 201 is configured by a photodiode PD which generates and stores an electrical charge in response to incident light, an amplifying transistor QA (an n-channel JFET in this embodiment) which outputs a current signal in response to an electrical charge which is received in a control region, a transferring transistor QT (p-channel type) which selectively transfers the electrical charge which is generated and stored by the photodiode PD to the control region of the amplifying transistor QA, and a resetting MOS transistor QP (p-channel type) for the purpose of selectively resetting the electrical charge of the control region of the amplifying transistor QA, the signal being read out by means of the source follower operation of the amplifying transistor QA.

The sources of each of the amplifying transistors QA for each column of the matrix arrangement are connected in common to the vertical source lines 202a and 220b, and the drains of each amplifying transistor QA and cathode terminals of the photodiodes are connected in common for all pixels to the power supply voltage VDD. The anode terminals of each photodiode and the gate electrodes of each amplifying transistor QA are connected, respectively, to the source and drain of the associated transferring MOS transistor QT.

The gate electrodes of the transferring MOS transistors QT are connected in common for each row in the matrix arrange to the clock lines 203a and 203b, which are connected to the vertical scan circuit 206, the transferring MOS transistors QT of each row being sequentially operated by means of the drive pulses ΦTG1 and ΦTG2 sent from the vertical scan circuit 206.

The drains of the resetting MOS transistors QP are connected in common for each row to the clock lines 205a and 205b, which are connected to the vertical scan circuit 206. The gate electrodes of the resetting MOS transistors QP are connected, via the row line 204a, in common for all pixels, to the drive pulse generating circuit 204. The sources of the resetting MOS transistors QP are shared with the sources of the transferring MOS transistors QT. When the drive pulse ΦRG which is sent from the drive pulse generating circuit 204 is applied to the gate electrodes of these resetting MOS transistors QP, the resetting MOS transistors operate.

The vertical source lines 202a and 202b are connected at one end respectively to the output signal storage capacitors $CD_1$ and $CD_2$ for each column, these output signal storage capacitors $CD_1$ and $CD_2$ being further connected to the drains of the switching MOS transistor (n-channel) $QO_1$ and $QO_2$ which are for the purpose of controlling the operation of the capacitors $CD_1$ and $CD_2$, and also to the gates of the voltage-to-current conversion MOS transistors (n-channel depletion type) $QR_1$ and $QR_2$.

The gate electrodes of the switching MOS transistors $QO_1$ and $QO_2$ are connected, via the clock line 210a, to the drive pulse generating circuit 210, and when a drive pulse ΦT which is sent from this drive pulse generating circuit 210 is applied to the gate electrodes of the switching MOS transistors $QO_1$ and $QO_2$, these switching MOS transistors $QO_1$ and $QO_2$ operate. The sources of these switching MOS transistors $QO_1$ and $QO_2$ are grounded.

The sources of each voltage-to-current conversion MOS transistor $QR_1$ and $QR_2$ are connected via the resistances $R_1$ and $R_2$, respectively, to the fixed-voltage source VS, the drains thereof being connected via the switching MOS transistors (n-channel) $QH_1$ and $QH_2$, respectively, to the horizontal read line 208.

Each of the gate electrodes of the horizontal read switching MOS transistors $QH_1$ and $QH_2$ is connected to the horizontal read lines 207a and 207b, which are connected to the horizontal scan circuit 207, the horizontal readout being controlled by the drive pulses ΦH1 and ΦH2 which are sent from the horizontal scan circuit 207.

A current-to-voltage conversion/amplification circuit 209, the input of which is at virtually grounded to the fixed-voltage source VR, is provided on the horizontal read line 208. The video signal current which is read out to this horizontal read line 208 is converted to a video signal voltage by the current-to-voltage conversion/amplification circuit 209, after which it is sequentially output from the output terminal VO.

The other end of the vertical read lines 202a and 202b are connected to the drains of the resetting switching MOS transistors (n-channel) $TR_{V1}$ and $TR_{V2}$ for each column, and also connected to the fixed-current sources 212a and 212b, the sources of each of these resetting switching MOS transistors $TR_{V1}$ and $TR_{V2}$ being grounded, and a power supply voltage VC (negative) being supplied to each of the fixed-current sources 212a and 212b.

The gate electrodes of the resetting switching MOS transistors $TR_{V1}$ and $TR_{V2}$ are connected via the clock line 211a to the drive pulse generating circuit 211, so that when a drive pulse ΦRSV, which is sent from the drive pulse generating circuit 211, is applied to the gate electrodes of the resetting switching MOS transistors $TR_{V1}$ and $TR_{V2}$, these resetting switching MOS transistors $TR_{V1}$ and $TR_{V2}$ operate.

Figure 17:
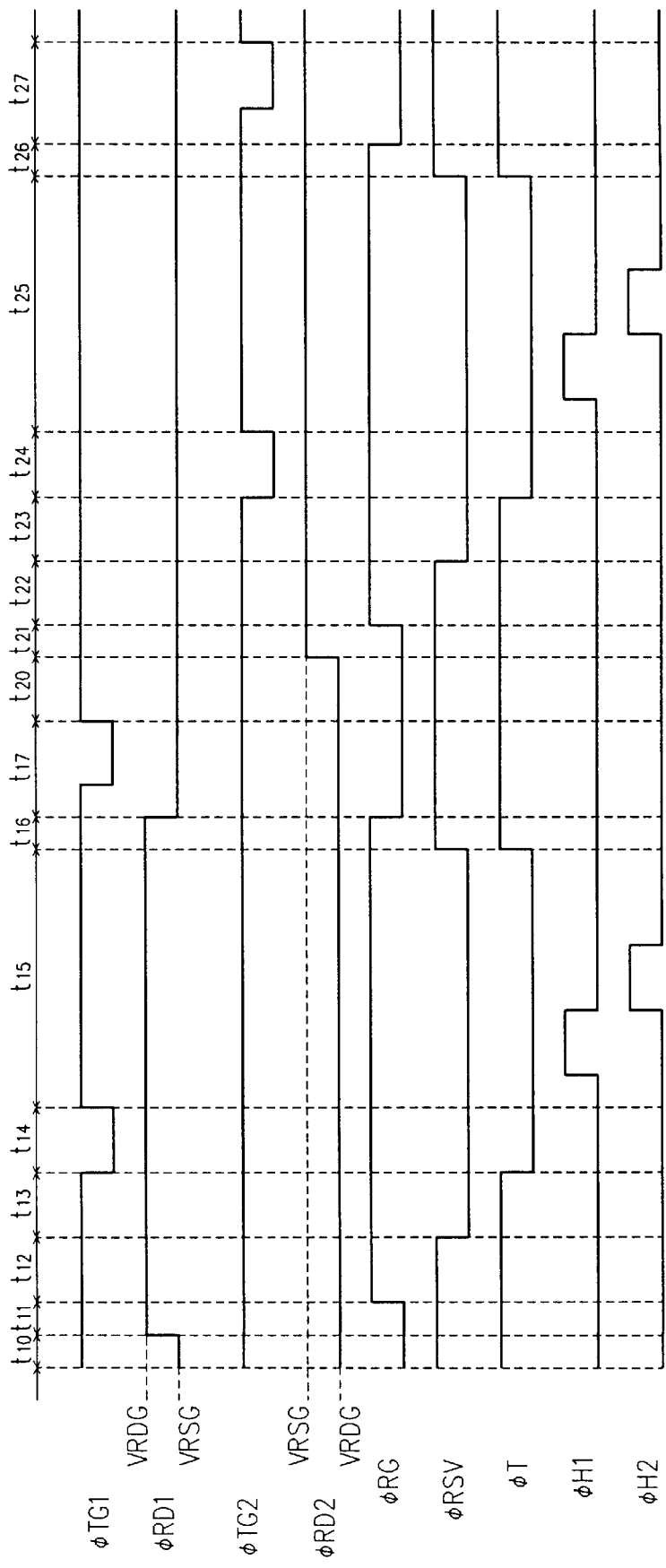
FIG. 17 is a pulse timing diagram for the purpose of illustrating the operation of the eighth embodiment of a solid-state image pickup device according to the present invention which is shown in FIG. 16.

Next, the operation of the solid-state image pickup device which is shown in FIG. 16 will be described, with reference being made to the timing diagram of FIG. 17. In FIG. 17, time periods $t_{10}$ to $t_{17}$ show the readout operation for pixels 1 of the first row, and time periods $t_{20}$ to $t_{27}$ show the readout operation for pixels 1 of the second row.

As shown in FIG. 17, in the time period $t_{10}$, because the drive pulses ΦTG1 and ΦTG2 are at a high level, each of the transferring MOS transistors QT are in the non-conducting (off) condition. Because the drive pulse ΦRG is at the low level, the resetting MOS transistors QP are in the conducting (on) condition. Because the drive pulse ΦRSV is at the high level, the resetting switching MOS transistors $TR_{V1}$ and $TR_{V2}$ are in the conducting (on) condition. Because the drive pulse ΦT is at the high level, the switching MOS transistors $QO_1$ and $QO_2$ are in the conducting (on) condition.

Furthermore, as shown in FIG. 17, the drive pulses ΦRD1 and ΦRD2 are at the low level (the voltage level being the setting level VRSG). Because the drive pulse ΦRG is at the low level, a voltage which is the setting level VRSG is transmitted via each of the conducting resetting MOS transistors QP to the gates (control regions) of each of the amplifying transistors QA, the gates (control regions) of these amplifying transistors QA being biased to the setting level VRSG.

In this time period $t_{10}$, because the resetting switching MOS transistors $TR_{V1}$ and $TR_{V2}$ are in the conducting condition, the source of each of the amplifying transistors QA is grounded. Additionally, because the switching MOS transistors $QO_1$ and $QO_2$ are in the conducting condition, not only is the signal electrical charge remaining on each of the output signal storage capacitors $CD_1$ and $CD_2$ removed, but also the gates of each of the voltage-to-current conversion MOS transistors $QR_1$ and $QR_2$ are grounded. In this time period $t_{10}$, the electrical charge (signal electrical charge) responsive to the incident light is generated and stored by each of the photodiodes PD.

Next, in the time period $t_{11}$, when the drive pulse ΦRD1 is changed to the high level (the voltage being the readout level VRDG), a voltage (the readout level VRDG) is transmitted via each of the already-conducting resetting switching MOS transistors QP of the first row, to the gates (control regions) of the amplifying transistor QA of each of the pixels in the first row, this selecting (turning on) the amplifying transistors QA of each of the pixels in the first row and biasing the gate (control region) of these amplifying transistors QA to the readout level VRDG. Because the drive pulse ΦRD2 is at the low level (the setting level VRSG), the gates of the amplifying transistors QA of the second row are biased to this setting level VRSG, placing these transistors in the non-conducting (off) condition.

Next, in the time period $t_{12}$, when the drive pulse ΦRG is set to the high level, thereby placing the resetting MOS transistors QP into the non-conducting (off) condition, although each of the amplifying transistors QA of the first row go into the floating condition, because of the effect of parasitic capacitance, the gates (control regions) of each of the amplifying transistors QA of the first row remain in a condition of biasing to the readout level of VRDG.

In this manner, by biasing the gate (control region) of the amplifying transistor QA to the readout level VRDG, even if the resetting MOS transistor QP is placed in the non-conducting condition, the gate (control region) of the amplifying transistor QA remains biased at the readout level VRGD, this condition being generally know as the resetting of the pixel 201. When the resetting MOS transistor QP is placed in the non-conducting condition, the thermal noise of the resetting MOS transistor QP is added to the gate (control region) of the amplifying transistor QA as reset noise (so-called KTC noise).

That is, when the gate (control region) of the amplifying transistor QA is reset, the gate voltage $V_{GD}$ of the amplifying transistor QA is given as follows in Equation (21).

$$V_{GD} = VRDG + VN \tag{21}$$

In the above, $VN = (KT/C)^{1/2}$

K: Boltzmann's constant

T: Absolute temperature

C: Gate capacitance

Next, in the time period $t_{13}$, when the drive pulse ΦRSV is changed to the low level, thereby placing the resetting switching MOS transistors $TR_{V1}$ and $TR_{V2}$ in the non-conducting (off) condition, each amplifying transistor QA of the selected first row operates as a source follower, the potential on the sources of these amplifying transistors QA rising until the current (drain current) flowing between the source and the drain thereof reaches the current IB (the value of the current flowing in the fixed-current sources 212a and 212b).

By means of the above-noted source follower operation, the source potential $V_{SD}$ of each of the amplifying transistors QA at the time that the current flowing between the source and the drain reaches IB is given by the following Equation (22).

$$V_{SD} = V_{GD} - VT \tag{22}$$

In the above, $V_{GD}$ is the gate voltage when the gate (control region) of each amplifying transistor QA of the first row is biased to the readout level VRDG (refer to Equation (1)), and VT is the gate-to-source voltage when the drain current of each amplifying transistor QA is IB.

Therefore, by using Equation (21), Equation (22) can be expresses as the following Equation (23).

$$V_{SD} = V_{GD} - VT = VRGD + VN - VT \quad (23)$$

(∵ $V_{GD}$=VRDG+VN Refer to Equation (21))

As a result, a voltage which is responsive to the source potential $V_{SD}$ of the amplifying transistors QA is output to the vertical source lines 202a and 202b as the voltage signal. This output voltage signal is stored in the output signal storage capacitors $CD_1$ and $CD_2$ from which the residual charge has already been discharged.

In general, the value of the gate-to-source voltage VT (refer to Equations (22) and (23)) is known to vary between individual amplifying transistors QA. Therefore, because the voltage signal which is stored in the output signal storage capacitors $CD_1$ and $CD_2$ has a varying VT component and a dark component (D; the second component) such as the reset noise (the so-called KTC noise), this voltage signal is generally called the dark voltage signal, this being known to be a major cause of fixed-pattern noise (FPN). As a convenience in presenting the explanation which follows, this dark voltage signal will be referred to as the dark voltage signal (VD).

Next, in the time period $t_{14}$, when the drive pulse ΦT is changed to the low level, the switching MOS transistors $QO_1$ and $QO_2$ are placed in the non-conducting (off) condition. As a result, the output signal storage capacitors $CD_1$ and $CD_2$ are placed in the floating condition, and the dark voltage signal (VD) is stored (held) in the output signal storage capacitors $CD_1$ and $CD_2$.

In this time period $t_{14}$, the drive pulse ΦTG1 is changed to the low level, so that the transferring MOS transistors QT of each pixel 201 of the first row is placed in the conducting (on) condition. As a result, the electrical charge which is generated and stored in the photodiode of each pixel 201 of the first row and which is responsive to the light incident thereto is transferred to the gate (control region) of the corresponding amplifying transistor QA of the first row, these amplifying transistors QA of the first row operating as source followers, so that a voltage signal responsive to the electrical charge (signal electrical charge) received from the gate (control region) is output to the vertical source lines 202a and 202b.

When the electrical charge (which is responsive to the incident light) is transferred to the gate (control region) of each of the amplifying transistors QA, the gate potential of each of these amplifying transistors QA rises by the amount of the transferred electrical charge. That is, when the electrical charge is transferred to the gate (control region) of each of the amplifying transistors QA, the gate potential $V_{GS}$ of each amplifying transistor QA is expressed by Equation (24) which follows.

$$V_{GS} = V_{GD} + V_S \quad (24)$$

In the above equation, $V_{GD}$ is the gate voltage before the electrical charge is transferred to the control region of the amplifying transistor QA (refer to Equation (21)).

$V_S$=(Electrical charge responsive to incident light)/(gate capacitance)

As a result of the source follower operation of each of the amplifying transistors QA of the first row, the source potential of each amplifying transistor QA rises the same as amount as the gate potential $V_{GS}$. That is, the source potential of the amplifying transistors QA is expressed by Equation (25) which follows.

$$V_{SS} = V_{GS} - VT \quad (25)$$

In the above equation, $V_{GS}$ is the gate potential of the amplifying transistors QA after the electrical charge responsive to the incident light is transferred to the control region of the amplifying transistors QA of the first row (refer to Equation (24)), and VT is the gate-to-source voltage when the drain current of each amplifying transistor QA is IB.

Therefore, Equation (25) can be further expressed as the following Equation (26).

$$\begin{aligned} V_{SS} &= V_{GS} - VT \quad (26) \\ &= V_{GD} + V_S - VT \\ &\quad (\because V_{GS} = V_{GD} + V_S \text{ Refer to equation (24)}) \\ &= VRDG + VN + V_S - VT \\ &\quad (\because V_{GD} = VRDG + VN \text{ Refer to equation (21)}) \end{aligned}$$

As a result, a voltage signal which is responsive to the source potential $V_{SS}$ of the amplifying transistors QA is output to the vertical source lines 202a and 202b as the voltage signal.

As described above, the value of the gate-to-source voltage VT (refer to Equation (26)) is known to vary between individual amplifying transistors QA. Therefore, because the voltage signal which is output to the vertical source lines 202a and 202b consists of a component (D+S, the first component) which is responsive to the sum of the dark component (D) caused by the varying voltage VT and reset noise (so-called KTC noise) and the like, and a signal component (S) caused by the transferred charge, this voltage signal is generally referred to as the combined voltage signal. As a convenience in presenting the explanation which follows, this combined voltage signal will be referred to as the combined voltage signal (VD+VS).

Therefore, the dark voltage signal (VD) is stored in the output signal storage capacitors $CD_1$ and $CD_2$, and in this time period $t_{14}$ the combined voltage signal (VD+VS) is output to the vertical source lines 202a and 202b by the source follower operation of the amplifying transistors QA of the first row. For this reason, only a light voltage signal (VS) responsive to the signal component (S), which is obtained by subtracting the dark voltage signal (VD) from the combined voltage signal (VD+VS), is applied to the gates of each of the voltage-to-current conversion MOS transistors $QR_1$ and $QR_2$. That is, by simply superimposing these signals, the subtraction of [combined voltage signal (VD+VS)–dark voltage signal (VD)]=light voltage signal (VS) is performed.

That is, the dark voltage signal (VD) is the source potential ($V_{SD}$) before the transfer of the electrical charge which is responsive to the incident light to the control region of each amplifying transistor QA of the first row.

The combined voltage signal (VD+VS) is the source potential ($V_{SS}$) after the transfer of the electrical charge which is responsive to the incident light to the control region of each amplifying transistor QA of the first row.

Therefore, the subtraction performed between the dark voltage signal (VD) and the combined voltage signal (VD+VS) is expressed by Equation (27).

$$\begin{aligned}
\text{Combined voltage signal } (VD + VS) &- \text{Dark voltage} \quad (27)\\
\text{signal } (VD) &= \text{equation (26)} - \text{equation (23)}\\
&= (VRDG + VN + V_S - VT) -\\
&\quad (VRDG + VN - VT)\\
&= V_s \ ( = \text{(Electrical charge responsive to}\\
&\quad \text{incident light)} / \text{(gate capacitance )})
\end{aligned}$$

As a result, the gate electrodes of voltage-to-current conversion MOS transistors $QR_1$ and $QR_2$ have applied to them only a photoelectric voltage signal (VS) affected by an electrical charge (signal component (S)) which is responsive to the incident light, this having had removed from it the reset noise VN and the voltage VT (dark component (D)) which varies between different amplifying transistors QA.

In the time period $t_{14}$, the drive pulse $\Phi TG1$ is changed to the high level, this causing the transferring MOS transistors QT of the first row to go into the non-conducting (off) condition.

Next, in the time period $t_{15}$, the drive pulses $\Phi H1$ and $\Phi H2$ which are sent from the horizontal scan circuit 207, are changed the high level, so that the read switching MOS transistors $QH_1$ and $QH_2$ are placed sequentially in (on) condition.

As a result, the gate voltage signal (VS) of the voltage-to-current conversion MOS transistors $QR_1$ and QR2 is converted to the current signal (IS), this being sequentially read out to the horizontal read line 208 from the drains of the voltage-to-current conversion MOS transistors $QR_1$ and $QR_2$.

In this manner, because the video signal output to the horizontal read line 208 is the light current signal (IS), since it is not necessary as with solid-state image pickup devices of the past, which had parasitic capacitance on the horizontal read line, to charge the parasitic capacitance, and then reset the parasitic capacitance, thereby enabling high-speed readout of the video signal.

Even if a parasitic capacitance does exist on the horizontal read line, because the video signal which is output is a current, there is no charge distribution due to this parasitic capacitance, thereby eliminating the worsening of the S/N ratio.

In addition, because the dark voltage signal (VD) output from pixel 201 is subtracted from the combined voltage signal (VD+VS) and the resulting voltage signal (VS) is then converted to the light current signal (IS), the need to have two horizontal read lines, as in the past, is also eliminated, one line being sufficient, this eliminating the need to provide two buffer amplifiers, thereby enabling a reduction in cost.

The light current signal (IS) is output as the drain current of the voltage-to-current conversion MOS transistors $QR_1$ and $QR_2$, and in general when converting the light voltage signal VS to the light current signal IS, it is known that voltage-current characteristics of the MOS transistors (voltage-to-current conversion MOS transistors $QR_1$ and $QR_2$), which operate in the saturated region, are a second order characteristic.

For this reason, the drain currents of the voltage-to-current conversion MOS transistors $QR_1$ and $QR_2$ increase in proportion to the square of the gate-to-source voltage of these voltage-to-current conversion MOS transistors $QR_1$ and $QR_2$. Because the sources of the voltage-to-current conversion MOS transistors $QR_1$ and $QR_2$ are AC grounded via the resistances $R_1$ and $R_2$, respectively, even if the gate voltages of the voltage-to-current conversion MOS transistors $QR_1$ and $QR_2$ rise, because of the voltage drops across the resistances $R_1$ and $R_2$ there is a limiting of the rise in the gate-to-source voltage of these voltage-to-current conversion MOS transistors $QR_1$ and $QR_2$. That is, this results in a negative feedback effect.

As a result, the relationship between the drain current (light current signal IS) and the gate voltage (light voltage signal VS) of the voltage-to-current conversion MOS transistors $QR_1$ and $QR_2$ is approximately linear, enabling the achievement of a light current signal (IS) which is proportional to the light voltage signal VS. That is, if gate voltages of the voltage-to-current MOS transistors $QR_1$ and $QR_2$ remains constant, the drain currents (light current signal IS) are also constant.

The light current signal IS which is sequentially read out to the horizontal read line 208, is amplified as it is converted by the voltage-to-current conversion circuit 209, the input of this voltage-to-current conversion circuit 209 being virtually grounded to the fixed-voltage source VR, so that when the video signal is output from the output terminal V, there is no variation in the potential on the horizontal read line.

In this embodiment, because the video signal read out to the horizontal read line is treated as a current, it is possible to use a low-impedance circuit as the current-to-voltage conversion/amplification circuit 209, thereby enabling a reduction in influence of externally induced noise on the video signal that is output.

Next, in the time period $t_{16}$, when the drive pulse $\Phi RSV$ is changed to the high level, the reset switching MOS transistors $TR_{V1}$ and $TR_{V2}$ are placed in the conducting (on) condition. As a result, the source lines 202a and 202b of each amplifying transistor QA is grounded via the reset switching MOS transistors $TR_{V1}$ and $TR_{V2}$.

In this time period $t_{16}$, the drive pulse $\Phi T$ is changed to the high level, thereby placing the switching MOS transistors $QO_1$ and $QO_2$ to the conducting (on) condition. As a result, the charge is removed from the signal storage capacitors $CD_1$ and $CD_2$ via these switching MOS transistors $QO_1$ and $QO_2$, and the gates (control regions) of the voltage-to-current conversion MOS transistors $QR_1$ and $QR_2$ are grounded.

Next, in the time period $t_{17}$, the drive pulses $\Phi RD1$, $\Phi RG$, and $\Phi TG1$ are sequentially set to the low level, thereby placing each resetting MOS transistor QP, and each transferring MOS transistor QT to the conducting (on) condition. As a result, the photodiodes PD are reset via the resetting MOS transistors QP and the transferring MOS transistors QT.

At the end of the time period $t_{17}$, the drive pulse $\Phi TG1$ is returned to the high level once again, each of the photodiodes again generating and storing an electrical charge which is responsive to the incident light, this completing the scan of the pixels 201 of the first row.

The readout operations for pixels of the first row described above with regard to the time periods $t_{11}$ through $t_{17}$ are repeated in the same manner in time period $t_{21}$ through $t_{27}$, this time for the pixels 201 of the second row. In the eighth embodiment of the present invention, the description presented was that of the case of a pixel which does not have a gate electrode for the purpose of controlling the control region of the amplifying transistor by means of a coupling capacitance, it is of course possible to apply this to a pixel which has a gate electrode.

Furthermore, whereas in the eighth embodiment the description was of the case of using a JFET as the amplifying section (amplifying transistor QA) of the pixel 1, the present invention is not limited in this manner, and can be applied even if the case of a MOS transistor or a bipolar transistor, and in general can be applied in the case of an element in which a voltage on a control electrode such as a gate or base can be used to control the output current at a drain or collector, or a source or an emitter, and also in the case in which a combination thereof is used.

Therefore, it is possible to apply the present invention to the case in which an MOS static induction transistor (SIT) is used as a pixel, such as in the past, and also to the case of a CMD, AMI or other amplifying-type solid-state image pickup device. In applying the eighth embodiment of the present invention to the case in which an MOS static induction transistor (SIT) is used as a pixel or to the case of a CMD, AMI or other amplifying-type solid-state image pickup device, because it is not possible to use a pixel construction in which the photoelectric conversion element and amplifying element are separated, it is not possible to employ the method noted in the description of the eighth embodiment, that is, the method of first reading out the dark voltage, and then causing output of the combined voltage signal VD+VS, subtracting the dark voltage from the combined voltage signal.

Because of this, in the case of using an MOS static induction transistor (SIT) as a pixel and in the case of a CMD, AMI or other amplifying-type solid-state image pickup device, the method used is that which was described with regard to the solid-state image pickup devices in the prior art. Specifically, the combined voltage signal VD+VS is first output, this combined voltage signal VD+VS being then stored in a storage capacitor, after which the dark voltage signal VD is output, these two signals then being superimposed so that a subtraction is performed therebetween, the result being that it is possible to perform a high-speed readout of a video signal from which fixed-pattern noise has been removed.

Ninth Embodiment

Figure 18:
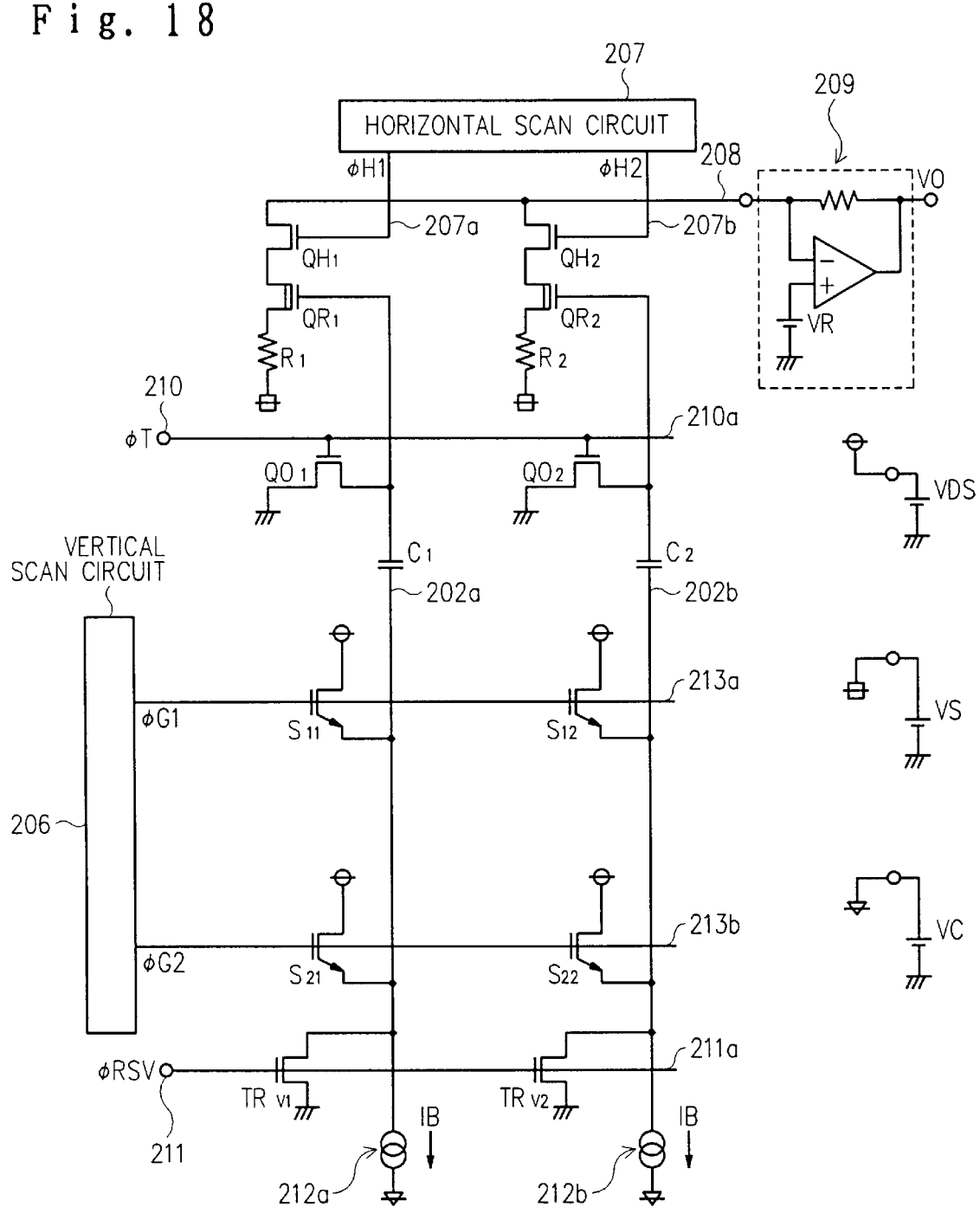
FIG. 18 is a schematic circuit diagram which shows the general configuration of the ninth embodiment of a solid-state image pickup device according to the present invention.

FIG. 18 is a schematic circuit diagram which shows the general configuration of the ninth embodiment of a solid-state image pickup device according to the present invention. It differs with respect to the eighth embodiment with regard to the use of the MOS static induction transistors (MOSSITs) $S_{11}$, $S_{12}$, $S_{21}$, and $S_{22}$ which are provided in the photoelectric conversion section of each pixel, as was indicated with regard to the prior art. Elements in this embodiment which are the same as those in the eighth embodiment (refer to FIG. 16) have been assigned the same reference symbols and will not be explicitly described herein.

In the solid-state image pickup device which is shown in FIG. 18, because the pixels $S_{11}$, $S_{12}$, $S_{21}$, and $S_{22}$ are SIT transistors, it is difficult after outputting the dark voltage VD to output the combined voltage signal (VD+VS). For this reason, in the case in which SIT transistors are used as pixels, in the same manner as in the case of the prior art solid-state image pickup device shown in FIG. 1, first the drive pulse $\Phi\alpha\gamma$ having a readout level $VG_2$ is applied to a pixel of a row which is selected by the vertical scan circuit 206, thereby outputting the combined voltage signal (VD+VS), to the vertical source lines 202a and 202b, this being stored in the output storage capacitors $C_1$ and $C_2$.

Next, the drive pulse $\Phi\alpha\gamma$ having a resetting level $VG_3$ is applied to a pixel of a row which is selected by the vertical scan circuit 206, and the drive pulse $\Phi RV$ is set to the high level, thus placing the resetting MOS transistors $TR_{V1}$ and $TR_{V2}$ in the conducting (on) condition, thereby grounding the source lines 202a and 202b to reset the pixel. When this is done, because the gates of the voltage-to-current conversion MOS transistors $QR_1$ and $QR_2$ are floating, the combined voltage signal (VD+VS) remains stored in the output storage capacitors $C_1$ and $C_2$.

Next, the resetting MOS transistors $TR_{V1}$ and $TR_{V2}$ are placed in the non-conducting (off) condition, the drive pulse $\Phi\alpha\gamma$ is again set to the readout level $VG_2$, and the dark voltage VD after the resetting of the pixel is output. As a result, the dark voltage VD is output from the pixels $S_{11}$, $S_{12}$, $S_{21}$, and $S_{22}$.

Therefore, because the output storage capacitors $C_1$ and $C_2$ still hold the combined voltage signal VD+VS, by a simple superimposition of the signals, the subtraction of (dark voltage signal)(VD)−(combined voltage signal)(VD+VS)=(light voltage signal)(−VS) is performed, to that the light voltage signal (−VS) is applied to the gate electrodes of the voltage-to-current conversion MOS transistors $QR_1$ and $QR_2$.

As a result, because the light current signal (IS), which is responsive to the light voltage signal (−VS) is output from the drains of the voltage-to-current conversion MOS transistors $QR_1$ and $QR_2$, although the relationship of proportionality between the light voltage signal and the light current signal is opposite of that in the eighth embodiment, it is still possible to readout only a video signal from which fixed-pattern noise (FPN) has been removed.

As a result, similar to the case of the eighth embodiment, even if there is a parasitic capacitance existing on the horizontal read line 208, since the video signal output to this horizontal read line 208 is the light current signal IS, the need to charge this parasitic capacitance and then to discharge this parasitic capacitance is eliminated, thereby enabling high-speed readout of the video signal.

Also, because the video signal is a current signal, the charge distribution causes by the parasitic capacitance is eliminated, thereby eliminating the accompanying lowering of the video signal output level and worsening of the video signal S/N ratio.

In addition, because the combined voltage signal VD+VS w is output form the pixel 201 is subtracted from the dark voltage signal VD, the result being then converted to the light current signal IS, the need to have two horizontal read lines such as in the past is eliminated, it being sufficient to have a single line, thereby both eliminating the need to provide two output amplifiers as used in the past, and enabling a reduction in cost.

In the ninth embodiment of the present invention as well, because a current-to-voltage conversion circuit 209, the input of which is virtually grounded to the fixed voltage source VR, is provided on the horizontal read line 208, when the video signal is output at the output terminal VO, there is no variation in the potential on the horizontal read line 208.

Additionally in the ninth embodiment of the present invention as well, because the video signal that is output to the horizontal read line 208 is treated as a current signal, it is possible to use a low-impedance current-to-voltage conversion circuit 209, thereby enabling a limitation in the influence of externally induced noise on the video signal which is output.

While the eighth and ninth embodiment of the present invention were described for the case of using depletion-type MOS transistors as the voltage-to-current conversion MOS transistors, it is of course possible to use instead enhancement-type MOS transistors or junction field-effect transistors.

In the present invention as described above, one of a first signal component and a second signal component output from a plurality of pixels is stored, after which a subtraction is performed between the other of the first signal component and a second signal component output from a plurality of pixels and the signal component that had already been stored, the resulting voltage signal (video signal) consisting of a component which is responsive to the incident light being converted to a current signal and output. By doing this, even if there is a parasitic capacitance existing on a horizontal read line, the effect is that it is still possible to perform high-speed readout of the video signal, because the time required to charge and to discharge this parasitic capacitance can be eliminated.

In the present invention, because the video signal which is read out to the horizontal read line is a current signal, there is no charge distribution caused by parasitic capacitance, providing the effect that it is possible to improve the S/N ratio of the video signal.

Furthermore, in the present invention because the horizontal read line is not influenced by parasitic capacitance, the effect provided is that of facilitating an increase in the number of pixels, because doing so does not cause a deterioration in performance.

In the present invention, because it is possible to use an output circuit having a low input impedance, the effect provided is that it is possible to reduce induced noise.

In the present invention, because it is possible to use a single horizontal read line, thereby eliminating the need to have two output amplifiers for the video signal, the effect provided is that of enabling a reduction in cost.

A solid-state image pickup device according to the present invention has a constitution which is chiefly formed by a plurality of pixels, a plurality of vertical read lines, a horizontal read line, a first storage means, a first switching means, a voltage-to-current conversion means, and a second switching means.

The above-noted plurality of pixels are arranged in a two-dimensional matrix, and convert an electrical charge responsive to light incident thereto to a voltage, and output this signal. The plurality of vertical read lines scan the pixels sequentially in the column direction for each row in the matrix arrangement, and extract for each column a voltage signal for each pixel. The horizontal read line scans the plurality of vertical read lines in the row direction, and sequentially outputs a voltage signal as a time series for each row.

The first storage means is provided for each vertical read line, this first storage means storing the voltage signal which is output from a pixel to which it is connected when the pixel is scanned. The first switching means is connected to each first storage means, and performs control of the storing and resetting operation of all the first storage means.

With this voltage-to-current conversion means, by means of the first switching means and by performing sequential control of each pixel of each row, a voltage signal consisting of a first component, which is responsive to the sum of the amount of light incident to a pixel and the dark output, and a voltage signal which is responsive to the dark output are output separately at different times, one of the first-component voltage signal and the second-component voltage signal being stored in the first storage means, after which a subtraction is performed between the other of the first-component voltage signal and the second-component voltage signal and the voltage signal which had already stored in the first storage means, thereby obtaining a current signal output having only a component which is responsive to the amount of incident light.

A current storage means is provided at the output side of each voltage-to-current conversion means, and stores a characteristic offset current of the voltage-to-current conversion means. Between each of the voltage-to-current conversion means and the horizontal read line is provided a second switching means for the purpose of sequentially reading out to the horizontal read line a current signal derived by a subtraction performed between a current signal which is the sum of the current signal and the offset current and the offset current which is stored in the storage means.

That is, in the present invention, one of a voltage signal consisting of a component which is responsive to the sum of the incident light and the dark output from the plurality of pixels and a voltage signal consisting of a second component which is responsive to the dark output is output, the thus-output voltage signal being stored in the first storage means, which is controlled by the first switching means.

Then, when the other of the voltage signal consisting of a component which is responsive to the sum of the incident light and the dark output from the plurality of pixels and a voltage signal consisting of a second component which is responsive to the dark output is output, this output voltage signal is combined with the voltage signal that had been stored in the first storage means so as to perform a subtraction between the two signals, so that only a voltage signal consisting of a component which is responsive only to the incident light is applied to the voltage-to-current conversion means.

That is, if we hypothesize that the voltage signal stored in the first storage means is a voltage signal (VS+VD) which consists of a first component which is responsive to the sum of amount of incident light (S) and the dark output (D), and further hypothesize that the voltage signal output from the pixel thereafter is a voltage signal (VD) which consists of a second component which is responsive to the dark output (D), the subtraction (VS+VD)−(VD)=(VS) is performed, and a voltage signal (VS) consisting of a component (S) which is responsive to only the incident light is read out to a horizontal read line in accordance with the control operation of the first switching means.

The voltage signal (VS) which is applied to the voltage-to-current conversion means is converted to a current signal (IS) corresponding to this voltage signal (VS). When this is done, it can be envisioned that the offset current ($I_{off}$) which flows in the voltage-to-current conversion means itself could be superimposed on the current signal (IS). That is, the current signal which is output from the voltage-to-current conversion means could possibly be (IS+$I_{off}$).

Therefore, to provide for this case, in the present invention a current storage means is provided at the output side of each voltage-to-current conversion means, this current storage means storing the characteristic offset current ($I_{off}$) which flows in the voltage-to-current conversion means itself.

By causing the second switching means to operate, the characteristic offset current ($I_{off}$) which flows in the voltage-to-current conversion means and which is stored in the current storage means, and the current signal (IS+$I_{off}$) which is output from the voltage-to-current conversion means are read out to the horizontal read line. In doing this, the offset current ($I_{off}$) stored in the current storage means and the current signal (IS+$I_{off}$) output from the voltage-to-current conversion means are combined in such a manner that a subtraction is performed therebetween, so that only the current signal (IS) consisting of the component (S) which is shown to the incident light only is read out to the horizontal read line. That is, the subtraction (IS+$I_{off}$)−($I_{off}$)=IS is performed.

Therefore, by virtue of the operation of the second switching means, only the current signal (IS) consisting of the component which is responsive to the incident light is read out.

Therefore, because the video signal read out the horizontal read line is a current signal, the charge distribution caused by the existence of a parasitic capacitance on the horizontal read line is eliminated, this not only enabling an improvement in the S/N ratio of the video signal, but also enabling the use of an output circuit with a low input impedance, thereby eliminating the influence of externally induced noise on the output video signal.

Furthermore, in the present invention, because the video signal read out to the horizontal read line is a current signal, it is possible to perform high-speed readout of the video signal.

That is, whereas in a solid-state image pickup device of the past, because the video signal read out to the horizontal read line was a voltage signal, it was not possible to ignore the parasitic capacitance on the horizontal read line, so that it was necessary, for example, when reading the video signal to the horizontal read line, to charge the parasitic capacitance and then reset the electrical charge stored in the parasitic capacitance, thereby causing the problem of slowed down readout operation, with the present invention, because the video signal to be read out to the horizontal read line is converted to a current signal and then read to the horizontal read line, even if there exists a parasitic capacitance there is no need to charge and reset this parasitic capacitance, thereby enabling high-speed readout of the video signal.

In another solid-state image pickup device according to the present invention, a pixel is formed, for example, by a photoelectric conversion element, an amplifying element, a transferring element, and a resetting element.

In the above-noted pixel, the photoelectric conversion element generates an electrical charge responsive to incident light. The amplifying element generates a voltage signal which is responsive to the electrical charge received in a control region. The transferring element transfers the electrical charge generated and stored by the photoelectric conversion element to the control region of the amplifying element. The resetting element selectively resets the electrical charge of the control region of the amplifying element.

That is, in the past, when using a MOS static induction transistor (MOSSIT), because due to the construction of the pixel it is necessary to perform a reset (initialization) operation of the pixel between the output of the combined voltage signal (VD+VS) and the output of the dark voltage signal (VD), the operation of reading the video signal is slowed the extent of the time required for performing this resetting operation. However, with the pixel of the present invention, even if a pixel reset (initialization) operation is not performed between the output of a voltage signal consisting of a first component which is responsive to the sum of the amount of incident light and the dark output and a voltage signal consisting of a second component which is responsive to the dark output, it is still possible to output two current signals, thereby enabling a further increase in the speed of reading the video signal.

Tenth Embodiment

Figure 19:
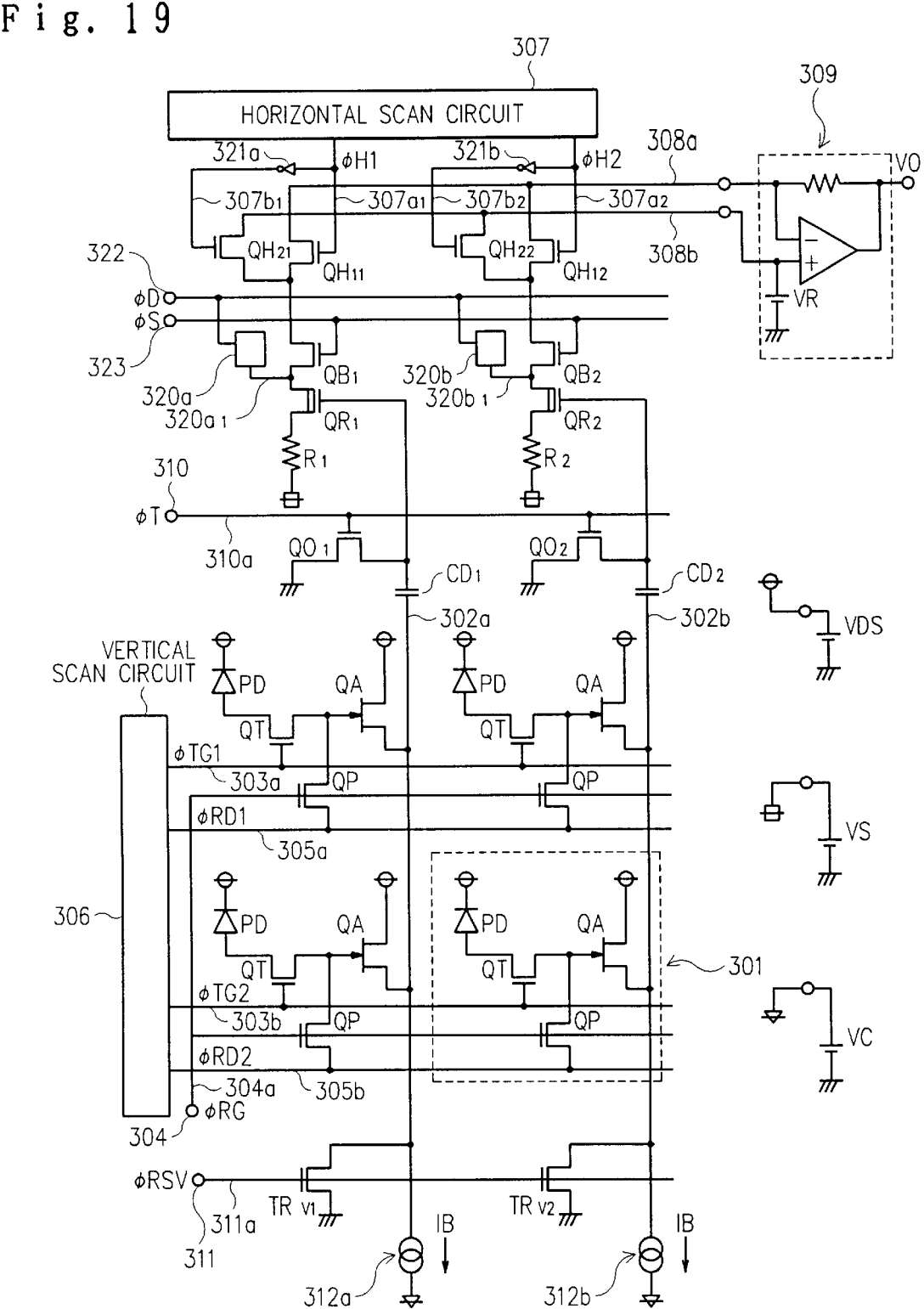
FIG. 19 is a schematic circuit diagram which shows the general configuration of the tenth embodiment of a solid-state image pickup device according to the present invention.

FIG. 19 is a schematic circuit diagram which shows the general configuration of the tenth embodiment of a solid-state image pickup device according to the present invention. This circuit has parts that are the same as shown in FIG. 16, and these parts will not be described herein.

The drain of each of the voltage-to-current conversion MOS transistor $QR_1$ and $QR_2$ are connected to the sources of the separating switching MOS transistors (n-channel) $QB_1$ and $QB_2$, and are also connected, via the horizontal read switching MOS transistors $QH_{11}$ and $QH_{12}$ (n-channel) and shunting MOS transistors $QH_{21}$ and $QH_{22}$ (n-channel), respectively, to the horizontal read line 308a and the bias line 308b.

The horizontal read line 308a and the bias line 308b are provided with a current-to-voltage conversion/amplification circuit 309, the input of which is virtually grounded to the fixed-voltage source VR. The video signal current which is read out to the horizontal read line 308a is converted to a video signal voltage by the current-to-voltage conversion circuit 309, after which it is sequentially output to the output terminal VO.

The gate electrodes of the separating switching MOS transistors $QB_1$ and $QB_2$ are connected in common, via the clock line 323a, to the drive pulse generating circuit 323, and when a drive pulse ΦD, sent from this drive pulse generating circuit 323 is applied, each of the separating switching MOS transistors $QB_1$ and $QB_2$ operate (open and close).

The separating switching MOS transistors $QB_1$ and $QB_2$ are provided for the purpose of separating (isolating) the load side from the voltage-to-current conversion MOS transistors $QR_1$ and $QR_2$.

Each of the gate electrodes of the horizontal read switching MOS transistors $QH_{11}$ and $QH_{12}$ are connected to the horizontal selection signal lines 307a1 and 307a2, which are connected to the horizontal scan circuit 307, horizontal reading being controlled by the drive pulses ΦH1 and ΦH2, which are sent from this horizontal scan circuit 307.

The horizontal selection signal lines 307a1 and 307a2 have connected to them the inverters 321a and 321b, which are connected to the gate electrodes of the shunting MOS transistors $QH_{12}$ and $QH_{22}$. When the drive pulse signals ΦH1 and ΦH2 are not being sent, the inverters 321a and 321b applied a voltage to the gate electrodes of the shunting MOS transistors $QH_{12}$ and $QH_{22}$, causing these shunting MOS transistors $QH_{12}$ and $QH_{22}$ to operate. That is, the horizontal read switching MOS transistors $QH_{11}$ and $QH_{12}$ and the shunting MOS transistors $QH_{12}$ and $QH_{22}$ operate in mutually complimentary fashion.

The drains of the voltage-to-current conversion MOS transistors $QR_1$ and $QR_2$ are connected to the current-storage circuits (current storage means) 320a and 320b, which store, via the connecting lines 320a and 320b, the characteristics offset current $I_{off}$ of the voltage-to-current conversion MOS transistors $QR_1$ and $QR_2$ and output this offset current $I_{off}$.

The current-storage circuits 320a and 320b are connected, via the connecting line 322a, to the drive pulse generating circuit 322. When the drive pulse ΦD, which is sent from the drive pulse generating circuit 322, is applied, the current-storage circuits 320a and 320b operate.

Figure 20:
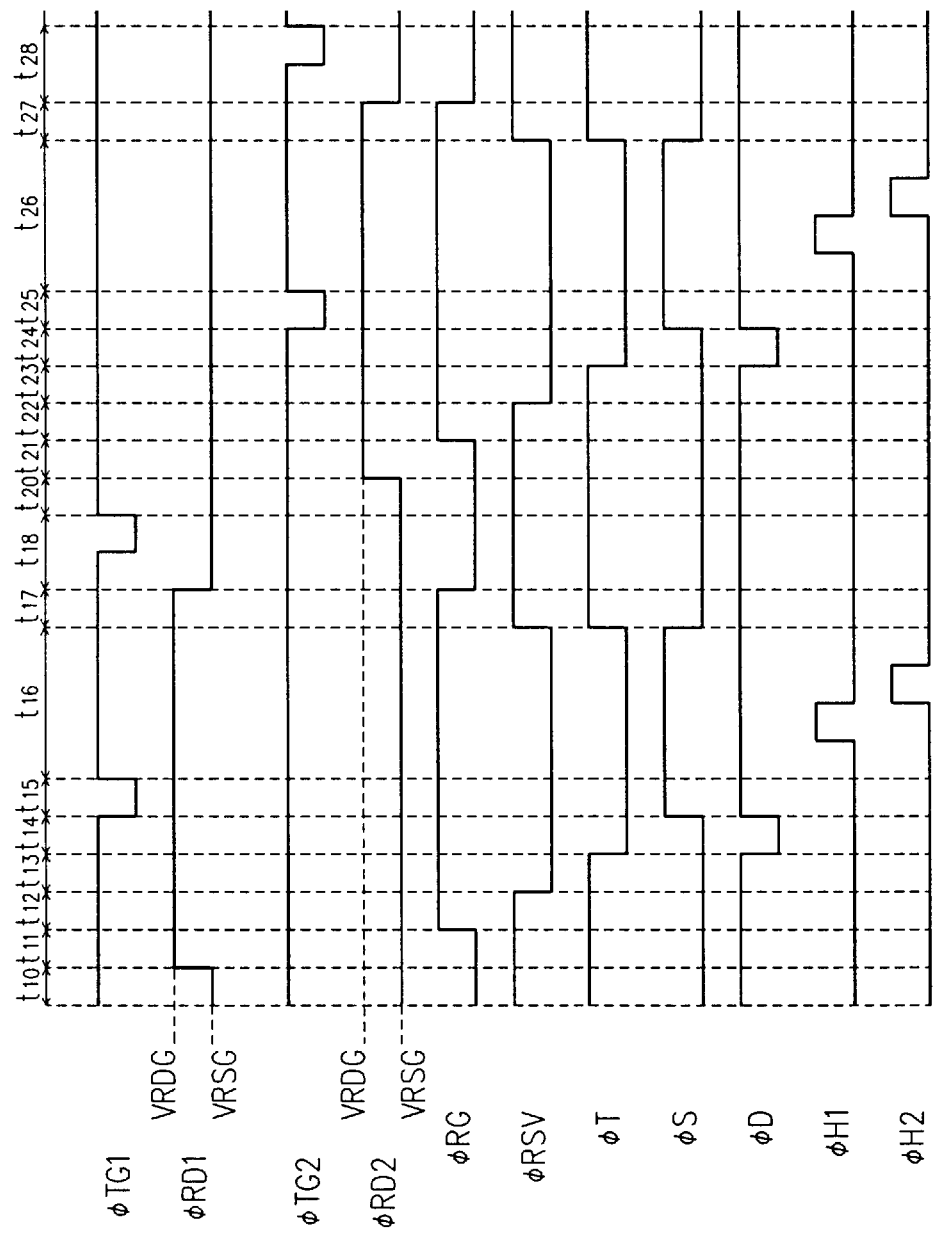
FIG. 20 is a pulse timing diagram for the purpose of illustrating the operation of the tenth embodiment of a solid-state image pickup device according to the present invention which is shown in FIG. 19.

Next, the operation of the solid-state image pickup device shown in FIG. 19 will be described, with reference being made to the pulse timing diagram of FIG. 20. In FIG. 20, the time periods $t_{10}$ through $t_{18}$ indicate the readout operation of the pixel 301 of the first row, and the time periods $t_{20}$ through $t_{28}$ indicate the readout operation of the pixel 301 of the second row.

As shown in FIG. 20, in the time period $t_{10}$, because the drive pulse ΦS is at the low level, the separating switching MOS transistors $QB_1$ and $QB_2$ are in the non-conducting (open) condition, and because the drive pulse ΦD is at the high level, the current-storage circuits 320a and 320b are in the non-conducting (off) condition.

The operation in the time periods $t_{11}$ through $t_{13}$ is the same as that described with regard to FIG. 17, and will therefore not be described herein.

Next, in the time period $t_{14}$, when the drive pulse ΦT is changed to the low level, the switching MOS transistors $QO_1$ and $QO_2$ go into the non-conducting (off) condition. Because the gates (control regions) of each of the voltage-to-current conversion MOS transistors $QR_1$ and $QR_2$ are held at the ground level, the characteristic offset current $I_{off}$ of these voltage-to-current conversion MOS transistors $QR_1$ and $QR_2$ flows into the connecting lines 320a1 and 320a2 from the drains of the voltage-to-current conversion MOS transistors $QR_1$ and $QR_2$.

This is because, with the drive pulse ΦS at the high level, the separating switching MOS transistors $QB_1$ and $QB_2$ are in the non-conducting (open) condition, so that the characteristic offset current $I_{off}$ of these voltage-to-current conversion MOS transistors $QR_1$ and $QR_2$ flows into the connecting lines 320a1 and 320a2.

In the time period $t_{14}$, the drive pulse ΦD is changed to the low level, causing each of the current-storage circuits 320a and 320b to operate, so that the characteristic offset current $I_{off}$ of the voltage-to-current conversion MOS transistors $QR_1$ and $QR_2$ which flows into the connecting lines 320a1 and 320a2 is captured by each of the current-storage circuits 320a and 320b.

Next, in time period $t_{15}$, when the drive pulse ΦD is changed to the high level, the offset current $I_{off}$ which was captured in each of the current-storage circuits 320a and 320b, is stored in the current-storage circuits 320a and 320b. Then the offset current $I_{off}$ which was stored flows into the connecting lines 320a1 and 320b1 from the current-storage circuits 320a and 320b. The specific configuration and operation of the current-storage circuits 320a and 320b will be described later.

The light voltage signal (VS) which is applied to the gate electrode of each of voltage-to-current conversion MOS transistors $QR_1$ and $QR_2$ is converted to the light current signal (IS), and output from the drain of the voltage-to-current conversion MOS transistors $QR_1$ and $QR_2$. When this is done, the converted light current signal (IS) has superimposed on it the characteristic offset current $I_{off}$ of the voltage-to-current conversion MOS transistors $QR_1$ and $QR_2$, and is thus output as the combined current signal ($IS+I_{off}$).

The offset current ($I_{off}$) is stored in each of the current-storage circuits 320a and 320b, and the stored offset current ($I_{off}$) flows into each of the connecting lines 320a1 and 320b1.

Therefore, the offset current ($I_{off}$) which flow from the current-storage circuits 320a and 320b, via the connecting lines 320a1 and 320b1, to the drains of the voltage-to-current conversion MOS transistors $QR_1$ and $QR_2$ is subtracted from the combined current ($IS+I_{off}$) which is output from the drains of the voltage-to-current conversion MOS transistors $QR_1$ and $QR_2$ (combined current signal ($IS+I_{off}$)– offset current ($I_{off}$)=light current signal (IS)), this light current signal (IS) only being output to the separating switching MOS transistors $QB_1$ and $QB_2$.

That is, the superimposition of the light current signal (IS) and the offset current ($I_{off}$) flows from the drains of the voltage-to-current conversion MOS transistors $QR_1$ and $QR_2$ and is output as the combined current signal ($IS+I_{off}$).

The offset current ($I_{off}$) is output from the current-storage circuits 320a and 320b.

Therefore, by simply superimposing these two signals, the subtraction (combined current signal ($IS+I_{off}$)–offset current ($I_{off}$)=light current signal (IS)) is performed, so that a light current signal (IS) (video signal) which is responsive to the signal component (S) in accordance with the electrical charge after the removal of the offset current is output to the separating switching MOS transistors $QB_1$ and $QB_2$.

In this time period $t_{15}$, the drive pulse ΦS is changed to the high level, so that the separating switching MOS transistors $QB_1$ and $QB_2$ are placed into the conducting (closed) condition, this causing output of the light current signal (IS) from the horizontal read switching MOS transistors $QH_{21}$ and $QH_{22}$.

Next, in the time period $t_{16}$, the high-level drive pulses ΦH1 and ΦH2 are sequentially sent from the horizontal scan circuit 307, this causing the horizontal read switching MOS transistors $QH_{11}$ and $QH_{12}$ to be sequentially placed in the conducting (on) condition, so that the light current signal (IS) (video signal) is sequentially read out to the horizontal read line 308a.

When the horizontal read switching MOS transistor $QH_{11}$ is scanned by the drive pulse ΦH1, the inverter 321b operates, and the shunting MOS transistor $QH_{22}$ conducts to the bias power supply VR, thereby preventing saturation of the voltage-to-current conversion MOS transistor $QR_2$ which outputs the light current signal (video signal) from which the offset current ($I_{off}$) has been removed, via the separating switching MOS transistor $QB_2$.

Naturally, in the same manner, when the horizontal read switching MOS transistor $QH_{12}$ is scanned by the drive pulse ΦH2, the inverter 321a operates, and the shunting MOS transistor $QH_{21}$ conducts to the bias power supply VR, thereby preventing saturation of the voltage-to-current conversion MOS transistor $QR_1$ which outputs the light current signal (video signal) from which the offset current ($I_{off}$) has been removed, via the separating switching MOS transistor $QB_1$.

Operation after this point is the same as was described with regard to FIG. 17, and will not be repeated herein.

Figure 21:
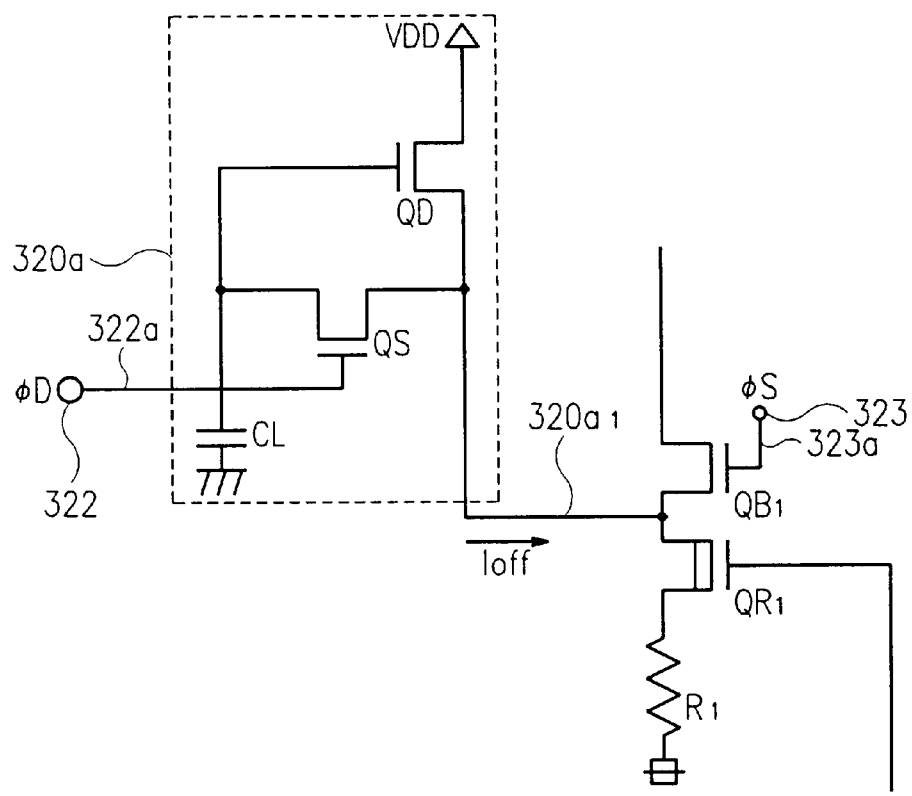
FIG. 21 is general schematic circuit diagram which shows an example of the inside of the current storage means of the tenth embodiment of a solid-state image pickup device according to the present invention which is shown in FIG. 19.

FIG. 21 is a simplified schematic circuit diagram which shows an example of the inside of the current-storage circuits 320a and 320b which are shown in FIG. 19. In FIG. 21, to simplify the description thereof, of the two current-storage circuits 320a and 320b which are shown in FIG. 19, only the current-storage circuit 320a is shown. Also, elements that are the same as in FIG. 19 have been assigned the same reference symbols and will not be explicitly described herein.

As shown in FIG. 21, the current-storage circuit 320a is formed by a current-establishing MOS transistor QH (p-channel), a current-storage switching MOS transistor QS (p-channel), and a voltage-storage capacitor CL.

The gate electrode of the current-storage switching MOS transistor QS is connected via the clock line 322a to the drive pulse generating circuit 322, the drain thereof being connected to the drain of the current-establishing MOS transistor QD, and the source thereof being connected to the gate of the current-establishing MOS transistor QD and to one end of the voltage-storage capacitor CL.

The source of the current-establishing MOS transistor QD is connected to the power supply voltage VDD (positive), the other end of the voltage-storage capacitor CL being grounded.

Next, referring to FIG. 21, the operation of the current-storage circuit 320a will be described. For the sake of simplifying the description, the description will be from the point after which the characteristic offset current ($I_{off}$) flows into the connecting line 320a1 from the voltage-to-current conversion circuit $QR_1$. That is, in the time period $t_{14}$ in FIG. 20, the drive pulse ΦT is set to the low level, this placing the switching MOS transistors $QO_1$ and $QO_2$ into the non-conducting (off) condition, the gates (control regions) of each of the voltage-to-current conversion MOS transistors $QR_1$ and $QR_2$ being maintained at the ground level, and the characteristics offset current ($I_{off}$) of the voltage-to-current conversion MOS transistors $QR_1$ and $QR_2$ flows from the drains of the voltage-to-current conversion MOS transistors $QR_1$ and $QR_2$ into the connecting lines 320a1 and 320b1, at which point the description of operation will commence.

In FIG. 20, during the time period $t_{14}$, the drive pulse ΦD is set to the low level. This is the state in which, in FIG. 21, the drive pulse ΦD is sent from the drive pulse generating circuit 322, and the drive pulse ΦD is applied to the gate electrode of the current-storage switching MOS transistor QS.

When the drive pulse ΦD is applied to the gate electrode of the current-storage switching MOS transistor, the current-storage switching MOS transistor goes into the conducting (closed) condition, the offset current ($I_{off}$) flowing from the voltage-to-current conversion circuit $QR_1$ toward the drains of the current-storage switching MOS transistor QS and the current-establishing MOS transistor QD (flows into the drains thereof).

The offset current ($I_{off}$) which flows toward the drain of the current-storage switching MOS transistor QS flows toward the source. This is because the current-storage switching MOS transistor QS is in the conducting (closed) condition.

Therefore, the offset current ($I_{off}$) as a result flows to both the current-establishing MOS transistor QD an the current-storage switching MOS transistor QS. However, the source of the current-storage MOS transistor QS is connected to the gate electrode of the current-establishing MOS transistor QD and also to the voltage-storage capacitor CL. For this reason, in the steady-state condition, current does not flow in the current-storage switching MOS transistor QS, the offset current ($I_{off}$) flowing only in the current-establishing MOS transistor QD, this automatically biasing the gate (control region) of the current-establishing MOS transistor QD, holding it at equilibrium. In this condition, the gate voltage of the current-establishing MOS transistor QD is stored in the voltage-storage capacitor CL.

Therefore, even if the application of the drive pulse ΦD to the gate electrode of the current-storage switching MOS transistor QS is stopped, thereby placing the current-storage switching MOS transistor QS in the non-conductive (open) condition (time period $t_{15}$ in FIG. 20), because there is no change in the gate voltage of the current-establishing MOS transistor QD, the offset current ($I_{off}$) continues to flow from the drain of the current-establishing MOS transistor QD to the connecting line 320a1.

That is, in general, as long at the gate-to-source voltage of field-effect transistor (FET) is constant, there is no change in the rain current value. Thus, because the gate voltage of the current-establishing MOS transistor QD is held constant by the voltage-storage capacitor CL, and the source is voltage of the current-establishing MOS transistor QD is held constant by the power supply voltage VDD (positive), the gate-to-source voltage of the current-establishing MOS transistor QD is constant.

Therefore, there is no change in the value of the drain current of the current-establishing MOS transistor QD. In this case, the drain current of the current-establishing MOS transistor QD is the offset current ($I_{off}$) which flowed via the connecting line 320a1.

Also, because the source of the current-establishing MOS transistor QD is connected to the power supply voltage VDD (positive), the source side of the current-establishing MOS transistor QD is at a higher potential than the drain side of the current-establishing MOS transistor QD.

As a result, the offset current ($I_{off}$) which flowed from the drain of the voltage-to-current conversion circuit $QR_1$ via the connecting line 320a1 flows as the drain current of the from the drain of the transistor QD current-establishing MOS transistor QD to the connecting line 320a1 and then on to the drain of the voltage-to-current conversion circuit $QR_1$. That is, the offset current ($I_{off}$) is stored in the current-storage circuit 320a as the drain current of the current-establishing MOS transistor QD.

Next, in the time period $t_{15}$, of FIG. 20, the drive pulse ΦTG1 is changed to the high level, so that the electrical charge which is responsive to the incident light and which is generated and stored in the photodiode is transferred to the gate (control region) of the amplifying transistor QA, the source follower operation thereof outputting a combined voltage signal of VD+VS to the vertical source lines 302a and 302b. Then, the dark voltage signal (VD) which is stored in the output signal storage capacitors $CD_1$ and $CD_2$ is subtracted from this combined voltage signal, so that only a light voltage signal (VS) which is responsive to an electrical charge (signal component) in accordance with the incident light is applied to the gate electrodes of the voltage-to-current conversion MOS transistors $QR_1$ and $QR_2$, this signal being converted to the light current signal (IS). This light current signal (IS) has superimposed onto it the offset current ($I_{off}$), so that the combined current signal (IS+$I_{off}$) is output from the drains of the voltage-to-current conversion MOS transistors $QR_1$ and $QR_2$.

As shown in FIG. 21, the offset current ($I_{off}$) which was stored and which flowed to the drain of the voltage-to-current conversion MOS transistor $QR_1$ from the current-storage circuit 302a via the connecting line 320a1 is subtracted from the combined current signal (IS+$I_{off}$) ((IS+$I_{off}$)−($I_{off}$)=(IS)). Then, in the time period $t_{16}$ in FIG. 20, when the drive pulses ΦH1 and ΦH2 are sequentially sent from the horizontal scan circuit 307, this causing the horizontal read switching MOS transistors $QH_{11}$ and $QH_{12}$ to be sequentially scanned (turned on), only the light current signal (IS) resulting from the above-noted subtraction, is output, via the separation switching transistors $QB_1$ and $QB_2$ and via the horizontal read switching MOS transistors $QH_{11}$ and $QH_{12}$, to the horizontal read line 308a.

While in the tenth embodiment of the present invention, the description was of the case of using a JFET as the amplifying section (amplifying transistor QA) of the pixel 301, the present invention is not limited in this manner, and can be applied even if the case of a MOS transistor or a bipolar transistor, and in general can be applied in the case of an element in which a voltage on a control electrode such as a gate or base can be used to control the output current at a drain or collector, or a source or an emitter, and also in the case in which a combination thereof is used.

Therefore, it is possible to apply the present invention to the case in which an MOS static induction transistor (SIT) is used as a pixel, such as in the past, and also to the case of a CMD, AMI or other amplifying-type solid-state image pickup device. In applying the tenth embodiment of the present invention to the case in which an MOS static induction transistor (SIT) is used as a pixel or to the case of a CMD, AMI or other amplifying-type solid-state image pickup device, because it is not possible to use a pixel construction in which the photoelectric conversion element and amplifying element are separated, it is not possible to employ the method noted in the description of the eighth embodiment, that is, the method of first reading out the dark voltage, and then causing output of the combined voltage signal VD+VS, subtracting the dark voltage from the combined voltage signal.

Because of this, in the case of using an MOS static induction transistor (SIT) as a pixel and in the case of a CMD, AMI or other amplifying-type solid-state image pickup device, the method used is that which was described with regard to the solid-state image pickup devices in the prior art. Specifically, the combined voltage signal VD+VS is first output, this combined voltage signal VD+VS being then stored in a storage capacitor, after which the dark voltage signal VD is output, these two signals then being superimposed so that a subtraction is performed therebetween, the result being that it is possible to perform a high-speed readout of a video signal from which fixed-pattern noise has been removed.

Eleventh Embodiment

Figure 22:
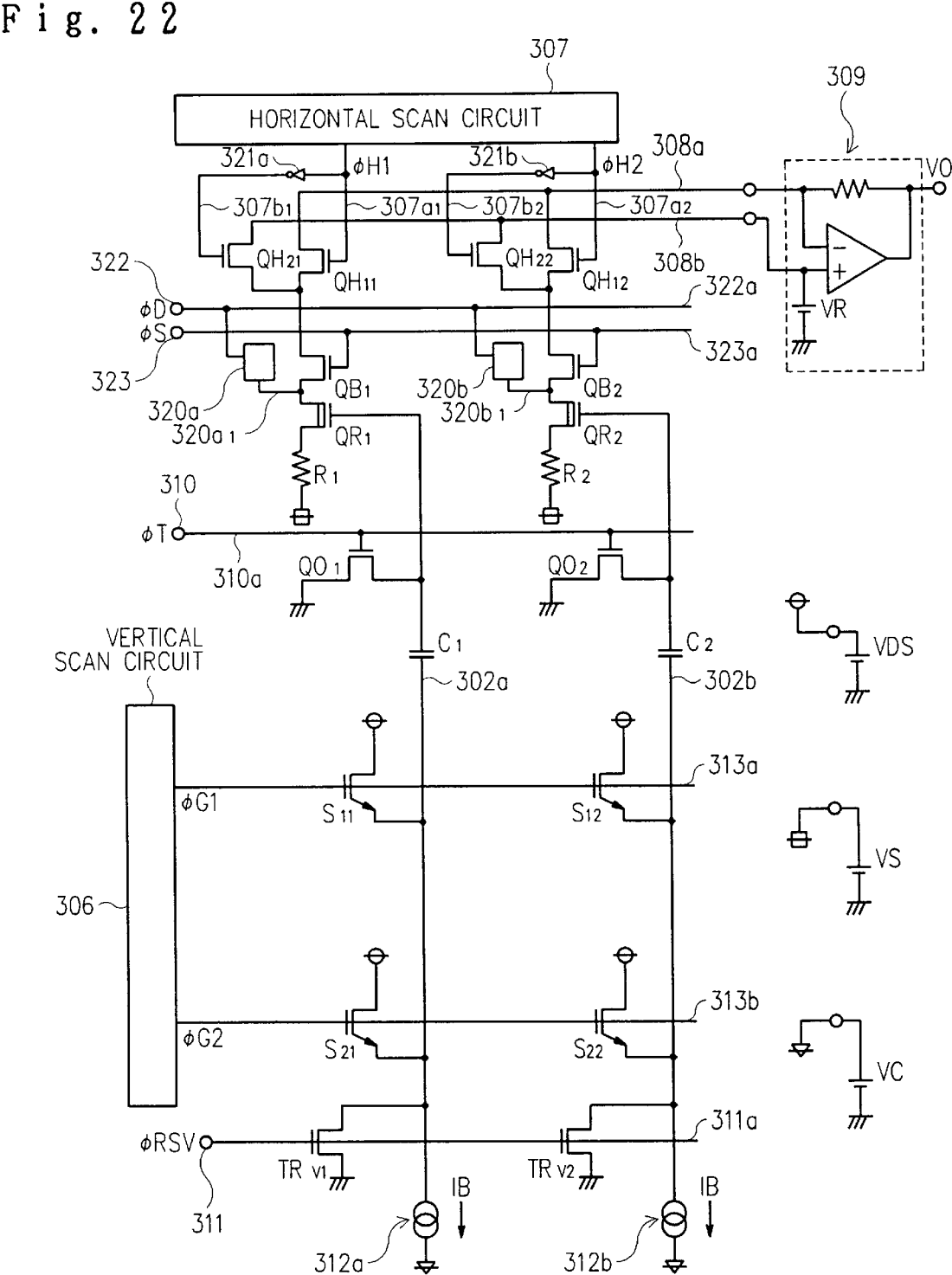
FIG. 22 is a schematic circuit diagram which shows the general configuration of the eleventh embodiment of a solid-state image pickup device according to the present invention.

FIG. 22 is a schematic circuit diagram which shows the general configuration of the eleventh embodiment of a solid-state image pickup device according to the present invention. This circuit has parts that are the same as shown in FIG. 18, and these parts will not be described herein.

In the same manner as in the tenth embodiment, in converting the light voltage signal VS by the voltage-to-current conversion MOS transistors $QR_1$ and $QR_2$ to the light current signal (IS), because the case in which an offset current ($I_{off}$) is superimposed thereon can be envisioned, the offset current ($I_{off}$) is stored in the current-storage circuits 320a and 320b beforehand and, when outputting the current signal to the horizontal read line 308a, the superimposed offset current ($I_{off}$) is subtracted, thereby enabling a further improvement in the S/N ratio of the video signal.

While the light voltage signal (−VS) which is applied to the gate electrodes of the voltage-to-current conversion MOS transistors $QR_1$ and $QR_2$ is converted to the light current signal (IS), this light current signal (IS) has superimposed on it the offset current ($I_{off}$), so that the combined current signal (IS+$I_{off}$) is output.

However, because the offset current ($I_{off}$) is stored in the current-storage circuits 320a and 320b, the offset current ($I_{off}$) is subtracted from the combined current signal (IS+$I_{off}$) (IS+$I_{off}$) ((IS+$I_{off}$)−($I_{off}$)=(IS)), so that only the light current signal (IS) resulting from this subtraction is output to the horizontal read line 308a via the separating switching MOS transistors $QB_1$ and $QB_2$, and the horizontal switching MOS transistors $QH_{11}$ and $QH_{12}$, which are sequentially scanned (turned on) by the drive pulses ΦH1 and ΦH2 that are sequentially output from the horizontal scan circuit 307.

Twelfth Embodiment

Figure 23:
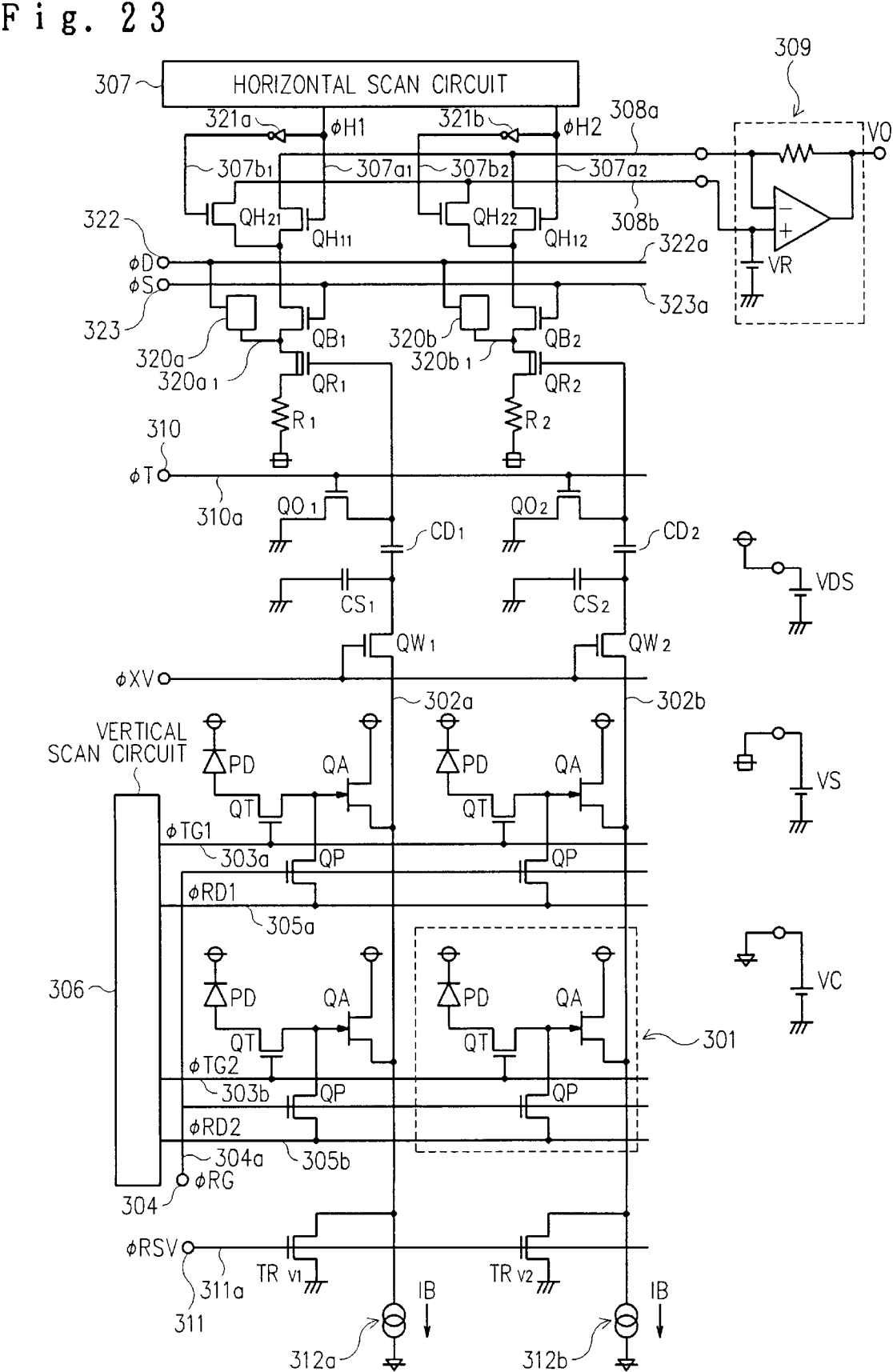
FIG. 23 is a schematic circuit diagram which shows the general configuration of the twelfth embodiment of a solid-state image pickup device according to the present invention.

FIG. 23 is a schematic circuit diagram which show the general configuration of the twelfth embodiment of a solid-state image pickup device according to the present invention. The difference with this embodiment with respect to the tenth embodiment which was described with regard to FIG. 19, is the provision on the vertical source lines 302a and 302b of the combined voltage signal storage capacitors $CS_1$ and $CS_2$, one end of which is grounded, and the switching MOS transistors $QW_1$ and $QW_2$ for the purpose of controlling the charging and discharging of these combined voltage signal storage capacitors $CS_1$ and $CS_2$. Elements which are the same as in FIG. 19 have been assigned the same reference symbols, and will not be described herein.

In this manner, the combined voltage signal storage capacitors $CS_1$ and $CS_2$ and switching MOS transistors $QW_1$ and $QW_2$ are provided. In the solid-state image pickup device described in relation to FIG. 19, the description was presented with the premise that after the electrical charge is transferred from the photodiode PD to the gate (control region) of the voltage amplifying transistor QA, the electrical charge held at the gate (control region) of each voltage amplifying transistor QA is simultaneously output as the combined voltage signal (VD+VS). In reality, however, when the video signal is output (time periods $t_{16}$ through $t_{26}$, in FIG. 20), output is performed sequentially, starting from pixels that are close to the vertical scan circuit 306.

Therefore, in the case of an electrical charge which is transferred to that gate (control region) of a voltage amplifying transistor QA of a pixel that is located at the greatest distance from the vertical scan circuit 306, the time until this electrical charge is output as the combined voltage signal (VD+VS), during which it is held at the gate (control region) of this voltage amplifying transistor QA is the longest.

For this reason, it can be envisioned that there is a difference between the value of the combined voltage signal (VD+VS) output from the voltage amplifying transistor QA of the closest pixel to the vertical scan circuit 306 is different from the value of the combined voltage signal (VD+VS) output from the voltage amplifying transistor QA of the pixel most distance from the vertical scan circuit 306.

That is, a dark current can flow in each of the voltage amplifying transistors QA themselves, these dark currents causing differences in the gate voltages of the voltage amplifying transistors QA, this leading to possible differences in the values of the combined voltage signals (VD+VS).

If there happens to be a difference between the combined voltage signal (VD+VS) of the voltage amplifying transistor QA of the closest pixel to the vertical scan circuit 306 and the value of the combined voltage signal (VD+VS) output from the voltage amplifying transistor QA of the pixel most distance from the vertical scan circuit 306, even if the dark voltage signal (VD) which is stored in the output signal storage capacitors $CD_1$ and $CD_2$ is subtracted from the combined voltage signal (VD+VS), a deterioration could occur in the S/N ratio of the video signal.

Because of this, the combined voltage signal storage capacitors $CS_1$ and $CS_2$ and the switching MOS transistors $QW_1$ and $QW_2$ are provided on the vertical source lines 302a and 302b, so that immediately after the electrical charge from the photodiode is transferred to the gate (control region) of the voltage amplifying transistor QA, the combined voltage signal (VD+VS) is output from each of the voltage amplifying transistors QA, this being stored in the combined voltage signal storage capacitors $CS_1$ and $CS_2$.

By doing this, when outputting the video signal (time period $t_{16}$ through $t_{26}$ in FIG. 20), even when sequentially reading out the pixels starting from the pixel that is the closest to the vertical scan circuit 306, there is no change in the combined voltage signal (VD+VS), so that deterioration of the S/N ratio of the video signal is prevented.

After the combined voltage signal (VD+VS) is stored in the combined voltage signal storage capacitors $CS_1$ and $CS_2$, if the switching MOS transistors $QW_1$ and $QW_2$ are placed in the cutoff (off) condition, because the combined voltage signal storage capacitors $CS_1$ and $CS_2$ go into the floating condition, it is possible to shut off each fixed-current source 312a and 312b, thereby enabling a reduction in power consumption.

While the tenth through the twelfth embodiments of the present invention were described for the case of using depletion-type MOS transistors as the voltage-to-current conversion MOS transistors, it is of course possible to use instead enhancement-type MOS transistors or junction field-effect transistors.

In the present invention as described above, one of a first signal component and a second signal component output from a plurality of pixels is stored, after which a subtraction is performed between the other of the first signal component and a second signal component output from a plurality of pixels and the signal component that had already been stored, the resulting voltage signal (video signal) consisting of a component which is responsive to the incident light being converted to a current signal and output. By doing this, even if there is a parasitic capacitance existing on a horizontal read line, the effect is that it is still possible to perform high-speed readout of the video signal, because the time required to charge and to discharge this parasitic capacitance can be eliminated.

In the present invention, because the video signal which is read out to the horizontal read line is a current signal, there is no charge distribution caused by parasitic capacitance, providing the effect that it is possible to improve the S/N ratio of the video signal.

Furthermore, in the present invention because the horizontal read line is not influenced by parasitic capacitance, the effect provided is that of facilitating an increase in the number of pixels, because doing so does not cause a deterioration in performance.

In the present invention, because it is possible to use an output circuit having a low input impedance, the effect provided is that it is possible to reduce induced noise.

In the present invention, because a current-storage means is provided, even if the characteristics offset current flowing from the voltage-to-current conversion means superimposed onto the current signal after the subtraction performed between the voltage signal consisting of the first component and the voltage signal consisting of the second component, it is still possible to remove this superimposed offset current, thereby having the effect of enabling a further improvement in the S/N ratio of the video signal.

A solid-state image pickup device according to the present invention has a plurality of pixels which are arranged in a two-dimensional matrix in row and column directions, and each of which converts an electrical charge which is responsive to incident light to a voltage signal and outputs this signal, a plurality of vertical read lines for the purpose of scanning each row of pixels in the matrix arrangement of pixels sequentially in the column direction so as to sequentially extract a voltage signal from each of the pixels, and a horizontal read line which scans the plurality of vertical read lines in the row direction, and sequentially outputs a voltage signal as a time series for each row. Each vertical read line is provided with a voltage-to-current conversion means which outputs current signals which correspond, respectively, voltage signals which are output at different points in time from the pixels when they are scanned, these voltage signals being a voltage signal consisting of a first component which is responsive to the sum of the amount of incident light and the dark output, and a voltage signal consisting of a second component which is responsive to the dark output. At the output side of each voltage-to-current conversion means is provided a current-storage means which stores either a first combined current signal which is responsive to the sum of the characteristic offset current of the voltage-to-current conversion means and the current signal corresponding to the first component voltage signal, or a second combined current signal which is responsive to the sum of the characteristic offset current of the voltage-to-current conversion means and the current signal corresponding to the second component voltage signal. Between each voltage-to-current conversion means and the horizontal read line is provided a switching means for the purpose of sequentially reading out to the horizontal read line a current signal derived by a subtraction performed between either of the first combined current signal and the second combined current signal and the other combined current signal which has already been stored in the current-storage means.

In another solid-state image pickup device according to the present invention, a pixel includes a photoelectric conversion element which stores an electrical charge generated in response to incident light, an amplifying element which generates a voltage signal responsive to an electrical charge received from a control region, a transfer control element which selectively transfers an electrical charge, which is generated and stored in the photoelectric conversion element, to a control region of the amplifying element, and a resetting control element for the purpose of selectively initializing the electrical charge in the control region of the amplifying element.

A solid-state image pickup device according to the present invention is chiefly formed by a plurality of pixels, a plurality of vertical read lines, a horizontal read line, a current sample-and-hold means, and a switching means.

The above-noted plurality of pixels are arranged in a two-dimensional matrix, and convert an electrical charge responsive to light incident thereto to a voltage, and output this signal. The plurality of vertical read lines scan the pixels sequentially in the column direction in common for each row in the matrix arrangement, and extract for each column a signal output for each pixel. The horizontal read line scans the plurality of vertical read lines in the row direction, and sequentially outputs a voltage signal as a time series for each row.

The voltage-to-current means is provided for each of the plurality of vertical read lines, and outputs current signals which correspond, respectively, to a voltage signal consisting of a first component which is responsive to the sum of the incident light voltage signal output from the pixels and the dark output, and a voltage signal consisting of a second component which is responsive to the dark output.

The current storage means is provided at the output side of each of the voltage-to-current means, and stores either the first combined current signal which is responsive to the sum of the characteristic offset current of the voltage-to-current conversion means and the current signal corresponding to the first component voltage signal, or a second combined current signal which is responsive to the sum of the characteristic offset current of the voltage-to-current conversion means and the current signal corresponding to the second component voltage signal.

Each switching means is provided between a voltage-to-current means and the horizontal read line, and sequentially scans the current signal derived by a subtraction performed between either of the first combined current signal and the second combined current signal and the other combined current signal which has already been stored in the current-storage means.

That is, in the present invention, either the voltage signal consisting of the first component which is responsive to the sum of the incident light and dark output from the pixels which is output first, or the voltage signal consisting of the second component which is responsive to the dark output is converted to a current signal by the voltage-to-current means, this current signal being stored in the current-storage means.

In the above arrangement, there are cases in which, when the voltage signal is converted by the voltage-to-current means to a current signal, an offset current which flows in this voltage-to-current means is superimposed on the converted current signal. Therefore, what is stored in the current-storage means is a combined current signal, formed from the combination of the current signal corresponding to the voltage signal and the offset current.

To simplify the description which follows, we will hypothesize that a voltage signal consisting of a first component which is responsive to the sum of the incident light and dark output from the pixels which is output first, in which case the combined current signal which is stored in the current-storage means is first combined current signal.

Thereafter, the other of the voltage signal consisting of the first component which is responsive to the sum of the incident light and dark output from the pixels and the voltage signal consisting of the second component which is responsive to the dark output, that is, in this case the voltage signal consisting of the second component is converted to a current signal corresponding thereto by the voltage-to-current means. In this case as well, the case in which a characteristic offset current flowing in the voltage-to-current means is superimposed onto the converted current signal, so that what is output from the voltage-to-current means is a second combined current signal which is formed from the combination of the current signal corresponding to the voltage signal consisting of the second component which is responsive to the dark output and the offset current.

Next, the first combined current signal which is stored in the current-storage means and the second combined current signal which is output from the voltage-to-current means are read out to the horizontal read line, and in doing this the first combined current signal and the second combined current signal are combined so that a subtraction is performed therebetween, resulting in the readout to the horizontal read line of only a current signal consisting of a component which is responsive to just the amount of incident light.

That is, the first combined current signal is the current signal (IS+IS+$I_{off}$) which is a combination of the current signal (IS+ID) which corresponds to the voltage signal (VS+VD) which consists of a first component which is responsive to the sum of the amount of incident light (S) and the dark output (D), and the offset current ($I_{off}$), and the second combined current signal is the current signal (ID+$I_{off}$), which is a combination of the current signal (ID) which corresponds to the voltage signal (VD) consisting of the second component which is responsive to the dark output (D), and the offset current ($I_{off}$).

Therefore, by means of the operation of the corresponding switching means, the subtraction of (first combined current signal)−(second combined current signal)=(IS+ID+$I_{off}$)−(ID+$I_{off}$)=IS is performed, this resulting in readout to the horizontal read line of only the current (IS) consisting of the component which is responsive to the amount of incident light.

Therefore, because the video signal which is read out to the horizontal read line is a read out as a current signal, there is no charge distribution caused by parasitic capacitance existing on the horizontal read line, not only enabling an improvement in the S/N ratio of the video signal, but also enabling the use of an output circuit on the horizontal read line with a low input impedance, this eliminating the influence of externally induced noise on the video signal which is output.

Furthermore, in the present invention, because the video signal which is read out the horizontal read line is a current signal, it is possible to perform high-speed readout of the video signal to the horizontal read line.

That is, whereas because in the a solid-state image pickup device of the prior art the video signal read out to the horizontal read line was readout as a voltage signal, it was not possible to ignore the parasitic capacitance of the horizontal read line, making it necessary, for example, when reading out the video signal to the horizontal read line, to charge the parasitic capacitance and thereafter to reset the electrical charge stored in the parasitic capacitance, thereby making the speed of the operation of readout to the horizontal read line slow, with the present invention because the video signal to be read out to the horizontal read line is first converted to a current signal and than readout to the horizontal read line, even if parasitic capacitance exists on the horizontal read line, there is no necessity to perform charging and resetting thereof, enabling high-speed readout of the video signal.

In another solid-state image pickup device according to the present invention, a pixel is formed, for example, by a photoelectric conversion element, an amplifying element, a transfer control element, and a resetting control element.

In the above-noted pixel, the photoelectric conversion element generates an electrical charge responsive to incident light. The amplifying element generates a voltage signal which is responsive to the electrical charge received in a control region. The transfer control element transfers the electrical charge generated and stored by the photoelectric conversion element to the control region of the amplifying element. The resetting element selectively resets the electrical charge of the control region of the amplifying element.

That is, in the past, when using a MOS static induction transistor (MOSSIT), because due to the construction of the pixel it is necessary to perform a reset (initialization) operation of the pixel between the output of the combined voltage signal (VD+VS) and the output of the dark voltage signal (VD), the operation of reading the video signal is slowed the extent of the time required for performing this resetting operation. However, with the pixel of the present invention, even if a pixel reset (initialization) operation is not performed between the output of a voltage signal (video signal) consisting of a first component which is responsive to the sum of the amount of incident light and the dark output and a voltage signal (video signal) consisting of a second component which is responsive to the dark output, it is still possible to output both signals, thereby enabling a further increase in the speed of reading the video signal.

Thirteenth Embodiment

Figure 24:
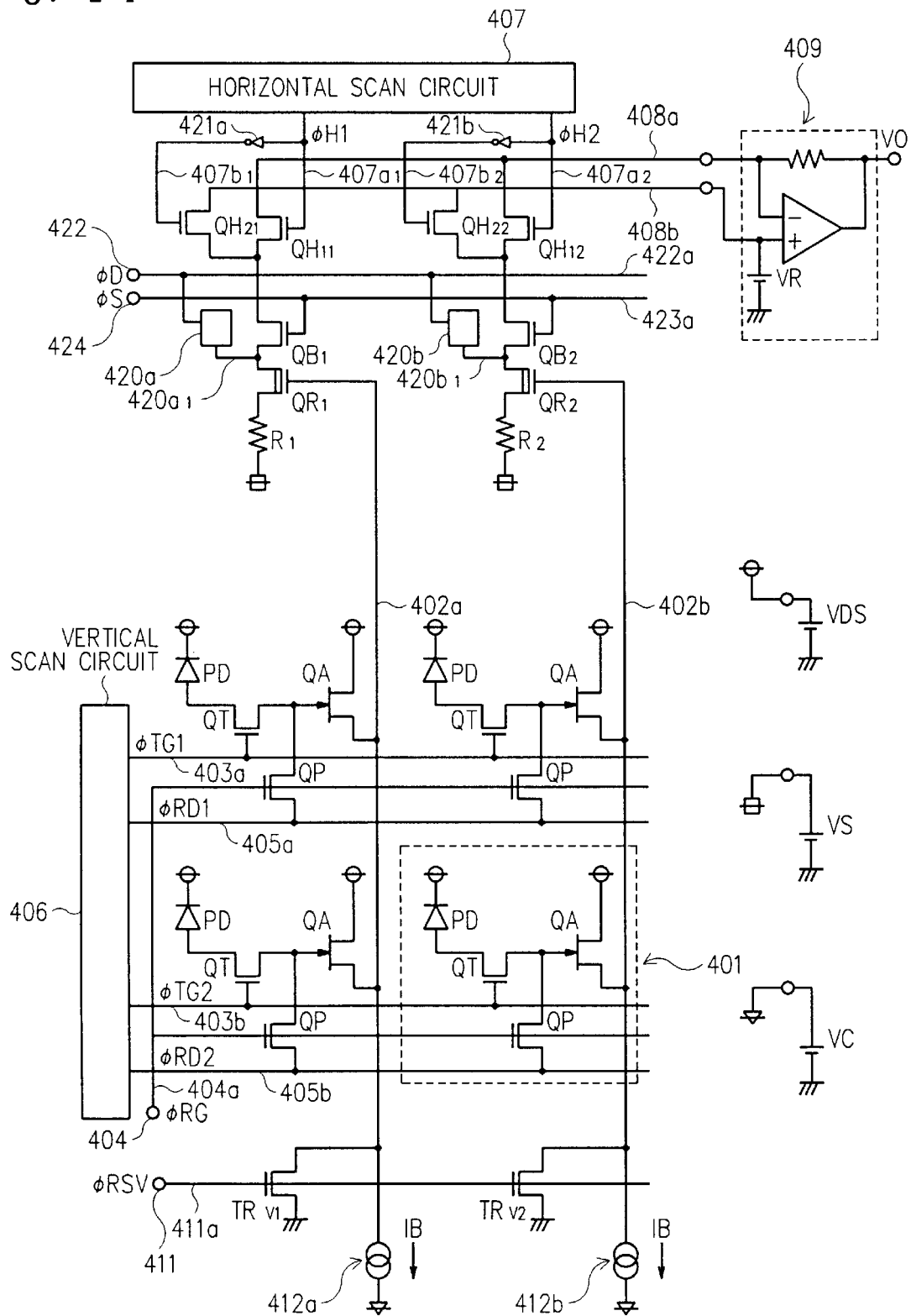
FIG. 24 is a schematic circuit diagram which shows the general configuration of the thirteenth embodiment of a solid-state image pickup device according to the present invention.

FIG. 24 is a schematic circuit diagram which shows the general configuration of the thirteenth embodiment of a solid-state image pickup device according to the present invention. This circuit has parts that are the same as shown in FIG. 19, and these parts will not be described herein.

One end of the vertical source lines 402a and 402b is connected to the gate electrodes of the voltage-to-current conversion MOS transistors $QR_1$ and $QR_2$ for each row, the sources of each of the voltage-to-current conversion MOS transistors $QR_1$ and $QR_2$ being connected to the fixed-voltage source VS, via the respective resistance $R_1$ or $R_2$. The drains are connected to the sources of the separating switching MOS transistors (n-channel) $QB_1$ and $QB_2$, and are also connected, via the horizontal read switching MOS transistors $QH_{11}$ and $QH_{12}$ (n-channel) and shunting MOS transistors $QH_{21}$ and $QH_{22}$ (n-channel), respectively, to the horizontal read line 408a and the bias line 408b.

The drains of each of the voltage-to-current conversion MOS transistors $QR_1$ and $QR_2$ is connected, via the connecting lines 420a1 and 420b, to the current-storage circuit (current-storage means) 420a and 420b into which are stored the currents which are output from these voltage-to-current conversion MOS transistors $QR_1$ and $QR_2$.

Figure 25:
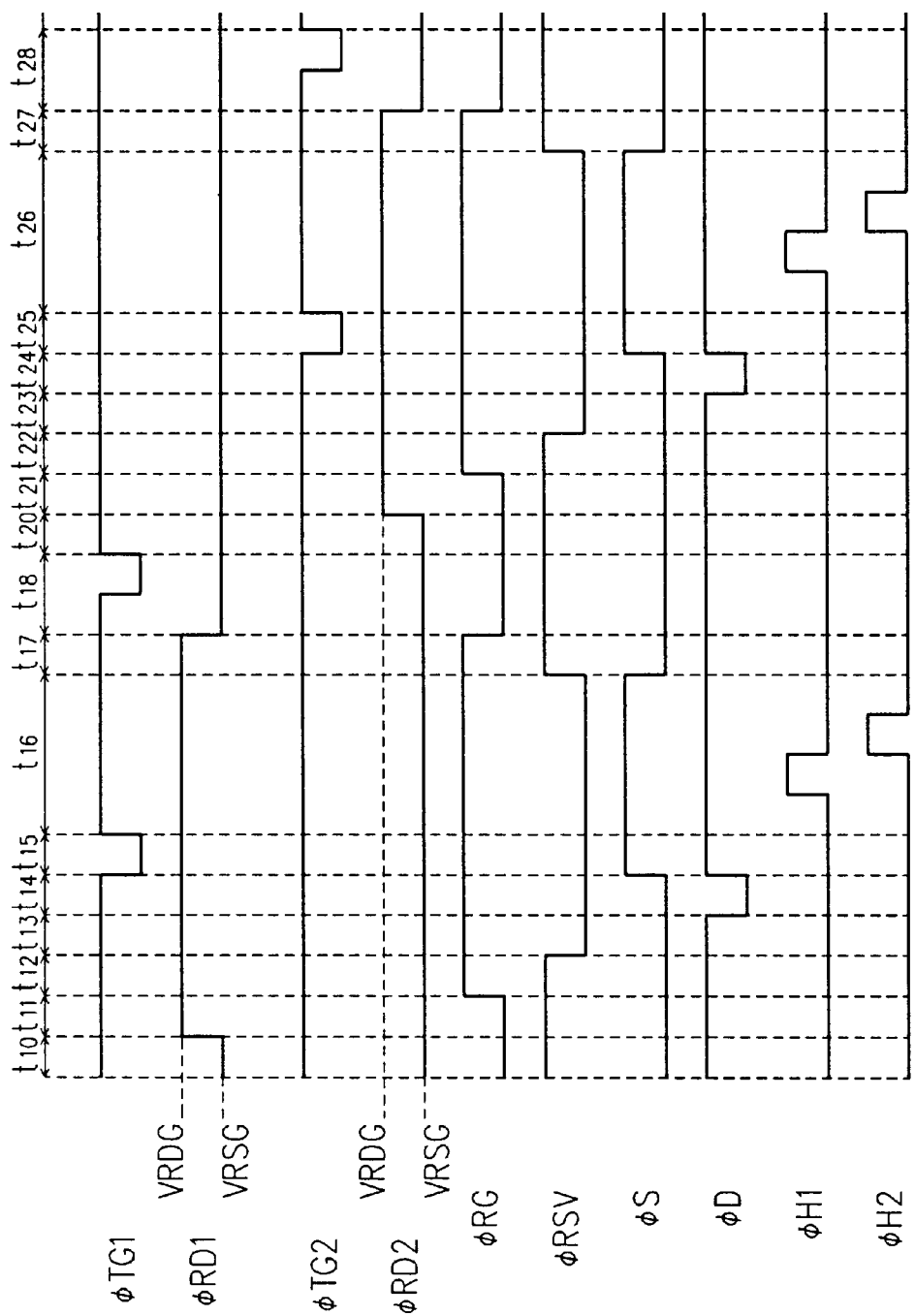
FIG. 25 is a pulse timing diagram for the purpose of illustrating the operation of the thirteenth embodiment of a solid-state image pickup device according to the present invention which is shown in FIG. 24.

Next, the operation of the solid-state image pickup device shown in FIG. 24 will be described, with reference being made to the pulse timing diagram of FIG. 25. In FIG. 25, the time periods $t_{10}$ through $t_{18}$ indicate the readout operation of the pixel 401 of the first row, and the time periods $t_{20}$ through $t_{28}$ indicate the readout operation of the pixel 401 of the second row. Because the operation during the time periods $t_{10}$ to $t_{12}$ is the same as was described with regard to FIG. 20, this operation will not be described herein.

In time period $t_{13}$, a voltage which is responsive to the source potential of each amplifying transistor QA (refer to Equation (23)) is output as a voltage signal. The output voltage signal is sent to the gates of the voltage-to-current conversion MOS transistors $QR_1$ and $QR_2$, the residual charge of which has already been discharged.

In general, the value of the gate-to-source voltage VT (refer to Equations (22) and (23)) is known to vary between individual amplifying transistors QA. Therefore, because the voltage signal which is sent to the gates of the voltage-to-current conversion MOS transistors $QR_1$ and $QR_2$ has a varying VT component and a dark component (D; the second component) such as the reset noise (the so-called KTC noise), this voltage signal is generally called the dark voltage signal, this being known to be a major cause of fixed-pattern noise (FPN). As a convenience in presenting the explanation which follows, this dark voltage signal will be referred to as the dark voltage signal (VD).

When the dark voltage signal (VD) is sent to the gate electrodes of the voltage-to-current conversion MOS transistors $QR_1$ and $QR_2$, a current signal corresponding to this dark voltage signal (VD) (hereinafter referred to as the combined dark current (ID)), is output from the drains of the voltage-to-current conversion MOS transistors $QR_1$ and $QR_2$.

That is, a combined current signal (second combined current signal), which is the combination of the dark current signal (ID) and the offset current ($I_{off}$) is output from the drains of the voltage-to-current conversion MOS transistors $QR_1$ and $QR_2$.

The combined dark current signal (ID+$I_{off}$) which is output from the drains of the voltage-to-current conversion MOS transistors $QR_1$ and $QR_2$ flows into the connecting lines 420a1 and 420b1. This is because, with the drive pulse ΦS at the low level, the separating switching MOS transistors $QB_1$ and $QB_2$ are in the non-conducting (open) condition, so that the dark current signal (IS+$I_{off}$) which is output from the drains of the voltage-to-current conversion MOS transistors $QR_1$ and $QR_2$ flows into the connecting lines 420a1 and 420b1.

Next, in the time period $t_{14}$, the drive pulse ΦD is changed to the low level, so that each of the current-storage circuits 420a and 420b operates, so that the combined dark current (ID+$I_{off}$) which flows into the connecting lines 420a1 and 420a2 is captured by each of the current-storage circuits 420a and 420b.

Next, in time period $t_{15}$, when the drive pulse ΦD is changed to the low level, the combined dark current (ID+$I_{off}$) which was captured in each of the voltage-to-current circuits 420a and 420b are stored in the voltage-to-current circuits 420a and 420b. Then the combined dark current (ID+$I_{off}$) flows from each voltage-to-current circuit 420a and 420b toward the connecting lines 420a1 and 420b1. The specific configuration and operation of the current-storage circuits 420a and 420b will be described later.

The combined voltage signal (VD+VS) is output to the vertical source lines 402a and 402b, and is sent to the gate electrodes of the voltage-to-current conversion MOS transistors $QR_1$ and $QR_2$.

When the combined voltage signal (VD+VS) is sent to the gate electrodes of the voltage-to-current conversion MOS transistors $QR_1$ and $QR_2$, a current signal (ID+IS) (referred to hereinafter as the combined light signal (ID+IS)) which corresponds to the combined voltage signal (VD+VS) is output from the drains of these voltage-to-current conversion MOS transistors $QR_1$ and $QR_2$, this combined light signal (ID+IS) having superimposed on it the characteristic offset current $I_{off}$, which is the current that flows in these voltage-to-current conversion MOS transistors $QR_1$ and $QR_2$ themselves.

That is, a combined current signal (first combined current signal) which is the combination of the combined light signal (ID+IS) and the offset current $I_{off}$ is output from the drains of the voltage-to-current conversion MOS transistors $QR_1$ and $QR_2$. For the purpose of simplifying the description which follows, this combined current signal will be referred to as the combined light current signal (ID+IS+$I_{off}$).

Therefore, in the time period $t_{15}$, the combined dark current (ID+$I_{off}$) which is flowing toward the connecting lines 420a1 and 420b1 from the current-storage circuits 420a and 420b is subtracted from the combined light current signal (ID+IS+$I_{off}$), so that only the light current signal IS is output to the separating switching MOS transistors $QB_1$ and $QB_2$. That is, by simply superimposing the two signals, the subtraction (combined light current signal (ID+IS+$I_{off}$))−(combined dark current signal (ID+$I_{off}$))=light current signal IS is performed.

Because the operation during the time period $t_{16}$ is the same as was described with regard to FIG. 20, this operation will not be described herein.

Next, in the time period $t_{17}$, when the drive pulse ΦRSV is changed to the high level, the resetting MOS transistors $TR_{V1}$ and $TR_{V2}$ are placed in the conducting (on) condition. As a result, the sources of the amplifying transistors QA and the gates (control regions) of the voltage-to-current conversion MOS transistors $QR_1$ and $QR_2$ are connected, via the vertical source lines 402a and 402b, and the resetting MOS transistors $TR_{V1}$ and $TR_{V2}$.

Next, the operation of the current-storage circuit 420a will be described, with reference being made to FIG. 26. For the sake of simplifying the description, the description will be from the point after which the combined dark current signal (ID+$I_{off}$) flows into the connecting line 420a1 from the voltage-to-current conversion circuit $QR_1$. That is, in the time period $t_{14}$ in FIG. 25, the drive pulse ΦRSV is set to the low level, this placing the resetting MOS transistors $TR_{V1}$ and $TR_{V2}$ are placed in the non-conducting (off) condition, causing the amplifying transistors QA of the first row to operate as source followers, a dark voltage signal (VD) which is responsive to the source potential in this condition being sent to the gate electrodes of the voltage-to-current conversion MOS transistors $QR_1$ and $QR_2$, the combined dark current signal $(IS+I_{off})$ flowing from these voltage-to-current conversion MOS transistors $QR_1$ and $QR_2$ toward the connecting lines 420a1 and 420b1, at which point the description of operation will commence.

The combined dark current $(ID+I_{off})$ which flows toward the drain of the current-storage switching MOS transistor QS flows into the source. This is because the current-storage switching MOS transistor QS is in the conducting (closed) condition.

Therefore, the combined dark current signal $(IS+I_{off})$ as a result is caused to flow into both the current-establishing MOS transistor QD and the current-storage switching MOS transistor QS. However, the source of the current-storage switching MOS transistor QS is connected to the gate electrode of the current-establishing MOS transistor QD and to the voltage-storage capacitor CL. For this reason, current does not flow in the current-storage switching MOS transistor QS, this current flowing only in the current-establishing MOS transistor QD, this automatically biasing the gate (control region) of the current-establishing MOS transistor QD, holding it at equilibrium. In this condition, the gate voltage of the current-establishing MOS transistor QD is stored in the voltage-storage capacitor CL.

The combined dark current signal $(ID+I_{off})$ which flows from the drain of the voltage-to-current conversion MOS transistors $QR_1$ via the connecting lines 420a1 flows as the drain current of this current-establishing MOS transistor QD toward the connecting line 420a1, and then into the drain of the voltage-to-current conversion MOS transistors $QR_1$. That is, the combined dark current signal $(ID+I_{off})$ is stored in the current-storage circuit 420a as the drain current of the current-establishing MOS transistor QD.

Next, in the time period $t_{15}$ shown in FIG. 25, the drive pulse $\Phi TG1$ is changed to the low level, an electrical charge is generated and stored by the photodiode PD and transferred to the gate (control region) of the amplifying transistor QA, source follower operation causing the combined dark voltage signal (VD+VS) to be sent to the gate electrodes of the voltage-to-current conversion MOS transistors $QR_1$ and $QR_2$, the output of the combined light current signal $(ID+IS+I_{off})$ being output from the drains of the voltage-to-current conversion MOS transistors $QR_1$ and $QR_2$.

Figure 26:
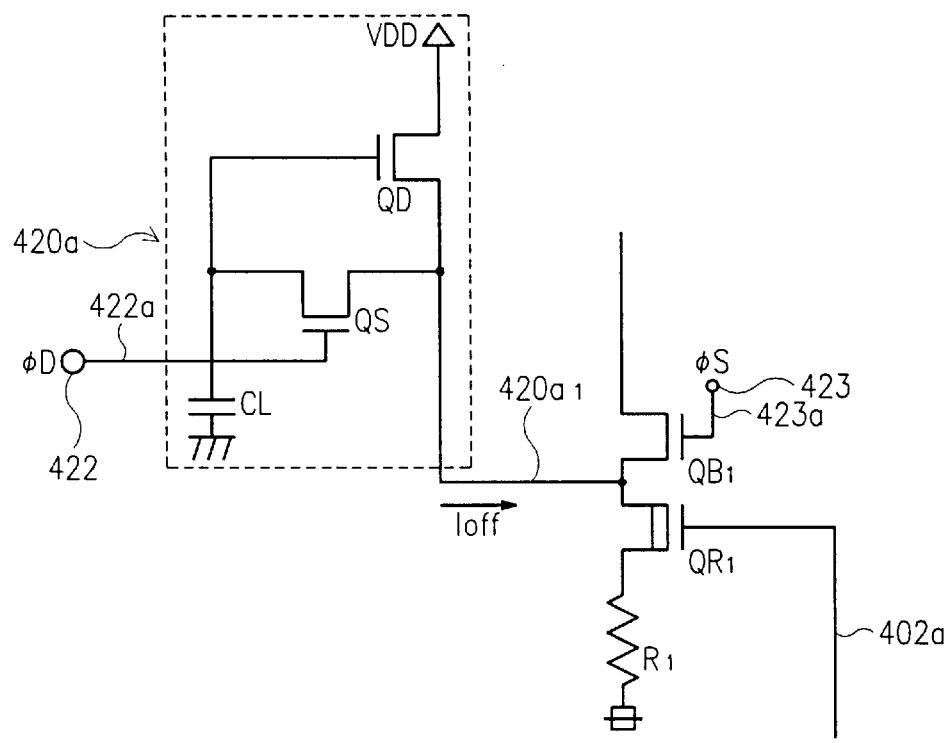
FIG. 26 is a schematic circuit diagram which shows the general configuration of the thirteenth embodiment of a solid-state image pickup device according to the present invention.

As shown in FIG. 26, the stored combined dark current signal $(ID+I_{off})$, which flows toward the drain of the voltage-to-current conversion MOS transistors $QR_1$ via the connecting line 420a1 from the current-storage circuit 420a is subtracted from the combined light current signal $(ID+IS+I_{off})$ which is output from the drain of the voltage-to-current conversion MOS transistors $QR_1$ $((ID+IS+I_{off})-(ID+I_{off})=IS)$, and in the time period $t_{16}$ of FIG. 26, when the drive pulses $\Phi H1$ and $\Phi H2$ are sequentially sent from the horizontal scan circuit 407, so that the horizontal read switching MOS transistors $QH_{11}$ and $QH_{12}$ are sequentially scanned (turned on), only the light current signal IS, from which the above-noted subtraction has been made, is output to the horizontal read line 408 via the separating switching MOS transistors $QB_1$ and $QB_2$ and the horizontal read switching MOS transistors $QH_{11}$ and $QH_{12}$.

While in the thirteenth embodiment of the present invention, the description was of the case of using a JFET as the amplifying section (amplifying transistor QA) of the pixel 401, the present invention is not limited in this manner, and can be applied even if the case of a MOS transistor or a bipolar transistor, and in general can be applied in the case of an element in which a voltage on a control electrode such as a gate or base can be used to control the output current at a drain or collector, or a source or an emitter, and also in the case in which a combination thereof is used.

Therefore, it is possible to apply the present invention to the case in which an MOS static induction transistor (SIT) is used as a pixel, such as in the past, and also to the case of a CMD, AMI or other amplifying-type solid-state image pickup device. In applying the thirteenth embodiment of the present invention to the case in which an MOS static induction transistor (SIT) is used as a pixel or to the case of a CMD, AMI or other amplifying-type solid-state image pickup device, because it is not possible to use a pixel construction in which the photoelectric conversion element and amplifying element are separated, it is not possible to employ the method noted in the description of the eighth embodiment, that is, the method of first reading out the dark voltage, and then causing output of the combined voltage signal VD+VS, subtracting the dark voltage from the combined voltage signal.

Because of this, in the case of using an MOS static induction transistor (SIT) as a pixel and in the case of a CMD, AMI or other amplifying-type solid-state image pickup device, the method used is that which was described with regard to the solid-state image pickup devices in the prior art. Specifically, the combined voltage signal VD+VS is first output, the combined light current signal $(ID+IS+I_{off})$ corresponding to this combined voltage signal VD+VS being then stored the current-storage circuit, and the dark voltage signal VD is output and converted to the combined current signal $(ID+I_{off})$, after which the signals are superimposed in such as manner that the latter current signal is subtracted from the former current signal. By doing this, it is possible to perform a high-speed readout of a video signal from which fixed-pattern noise has been removed.

Fourteenth Embodiment

Figure 27:
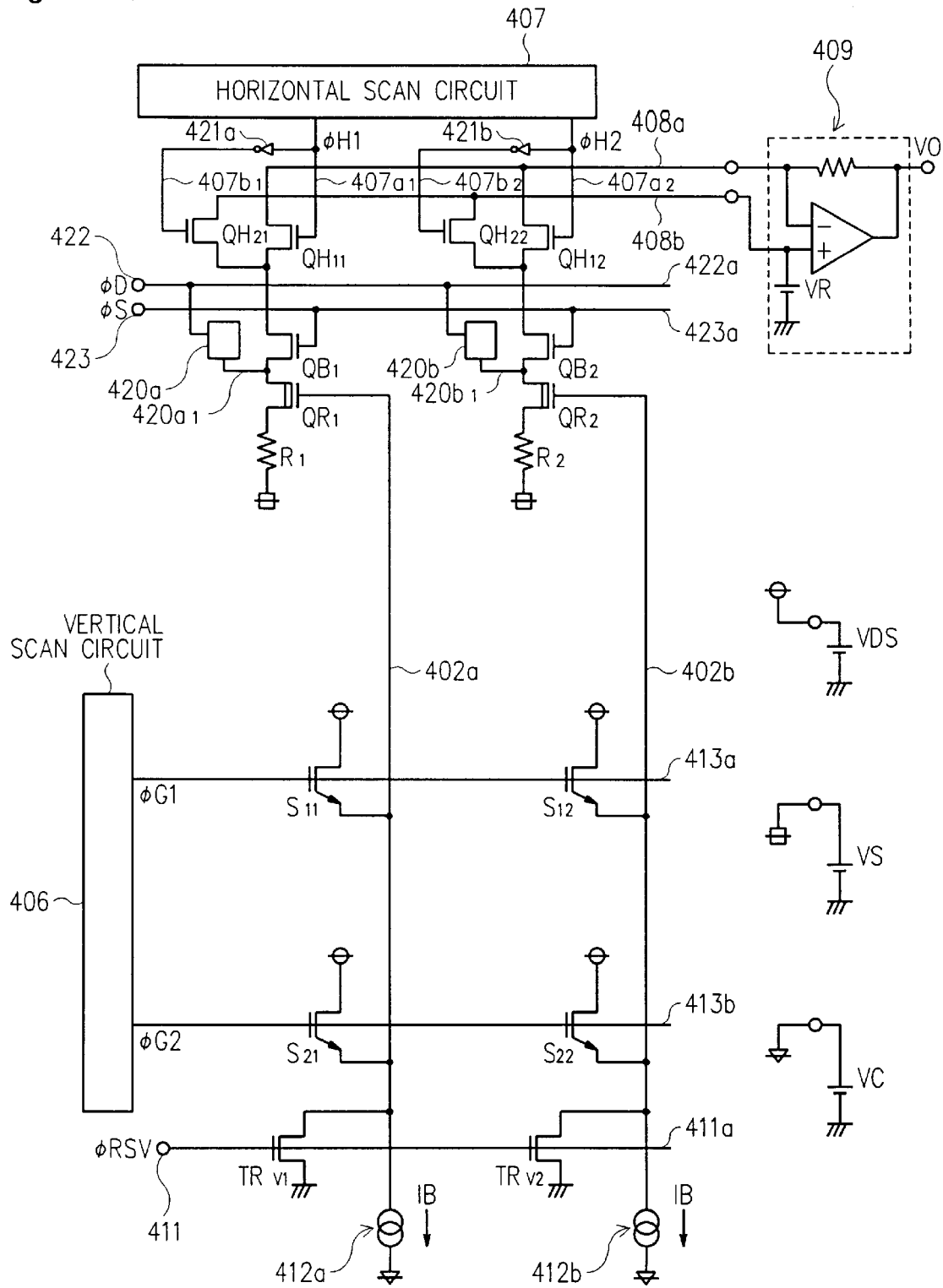
FIG. 27 is a schematic circuit diagram which shows the general configuration of the fourteenth embodiment of a solid-state image pickup device according to the present invention.

FIG. 27 is a schematic circuit diagram which shows the general configuration of the fourteenth embodiment of a solid-state image pickup device according to the present invention. This circuit has parts that are the same as shown in FIG. 22, and these parts will not be described herein.

In the solid-state image pickup device which is shown in FIG. 27, because the pixels $S_{11}$, $S_{12}$, $S_{21}$, and $S_{22}$ are SIT transistors, it is difficult after outputting the dark voltage VD to output the combined voltage signal (VD+VS). For this reason, in the case in which SIT transistors are used as pixels, in the same manner as in the case of the prior art (refer to FIG. 1), first the drive pulse $\Phi G$ having a readout level $VG_2$ is applied to a pixel of a row which is selected by the vertical scan circuit 406.

As a result the combined voltage signal (VD+VS) is sent to the gate electrodes of the voltage-to-current conversion MOS transistors $QR_1$ and $QR_2$ via the vertical source lines 402a and 402b, this being converted to the combined light current signal (ID+IS) corresponding to the combined voltage signal (VD+VS). When this is done, the offset current $I_{off}$ which flows in the voltage-to-current conversion MOS transistors $QR_1$ and $QR_2$ themselves is superimposed thereon, resulting in output of the combined light current signal $(ID+IS+I_{off})$ from the voltage-to-current conversion MOS transistors $QR_1$ and $QR_2$.

Next, the drive pulse $\Phi G$ having a resetting level $VG_3$ is applied to a pixel of a row which is selected by the vertical scan circuit 406, and the drive pulse ΦRV is set to the high level, thus placing the resetting MOS transistors $TR_{V1}$ and $TR_{V2}$ in the conducting (on) condition, thereby grounding the source lines 402a and 402b to reset the pixel of the selected row.

Next, the resetting MOS transistors $TR_{V1}$ and $TR_{V2}$ are placed in the non-conducting (off) condition, the drive pulse ΦG is again set to the readout level $VG_2$, and the dark voltage VD after the resetting of the pixel is output. As a result, the dark voltage VD is sent from the pixels $S_{11}$, $S_{12}$, $S_{21}$, and $S_{22}$, via to the vertical source lines 402a and 402b, to the gate electrodes of the voltage-to-current conversion MOS transistors $QR_1$ and $QR_2$. When this is done, the offset current which flows in the voltage-to-current conversion MOS transistors $QR_1$ and $QR_2$ themselves is superimposed, the result being that the combined dark current signal (IS+$I_{off}$) is output from the voltage-to-current conversion MOS transistors $QR_1$ and $QR_2$.

Therefore, because the combined light current signal (ID+IS+$I_{off}$) from the current-storage circuits 420a and 420b is flowing to the voltage-to-current conversion MOS transistors $QR_1$ and $QR_2$, by simply superimposing the signals, the subtraction (combined dark current signal)(ID+$I_{off}$)−(combined light current signal)(ID+IS+$I_{off}$)=(light current signal)(-IS) is performed.

Thus, only the light current signal (−IS) is output to the horizontal read line 408a via the horizontal read switching MOS transistors $QH_{11}$ and $QH_{12}$, which are sequentially scanned by the drive pulses ΦH1 and ΦH2 from the separating switching MOS transistors $QB_1$ and $QB_2$ and the horizontal scan circuit 407.

As a result, because the video signal which is output to the horizontal read line 408 is the light current signal (−IS), even if a parasitic capacitance exists on the horizontal read line 408, there is no need charge this parasitic capacitance and then reset it, thereby enabling high-speed readout of the video signal.

Fifteenth Embodiment

Figure 28:
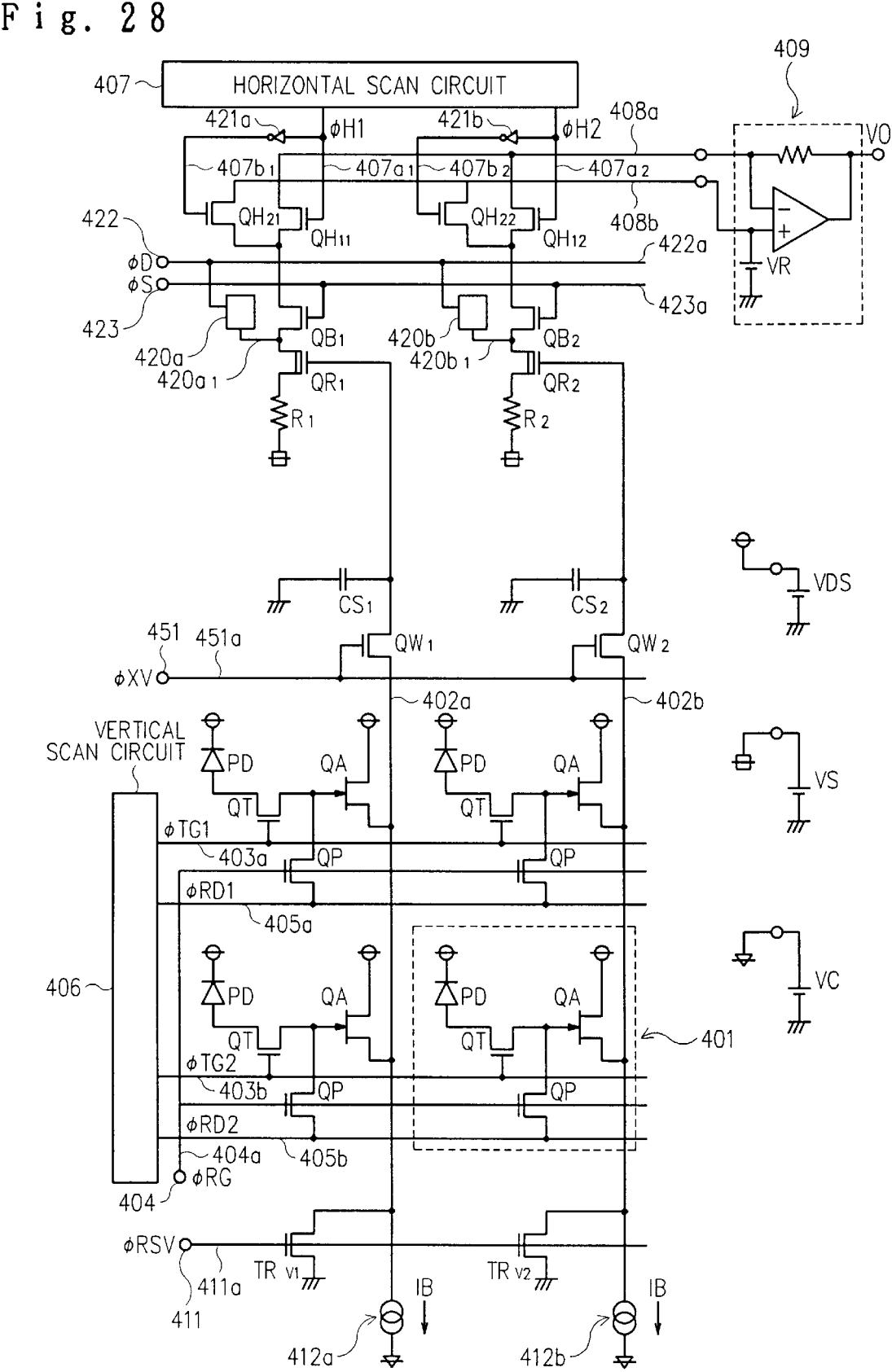
FIG. 28 is a schematic circuit diagram which shows the general configuration of the fifteenth embodiment of a solid-state image pickup device according to the present invention.

FIG. 28 is a schematic circuit diagram which shows the general configuration of the fifteenth embodiment of a solid-state image pickup device according to the present invention. This circuit has parts that are the same as shown in FIG. 23, and these parts will not be described herein.

If there happens to be a difference between the combined voltage signal (VD+VS) output from the voltage amplifying transistor QA of the closest pixel to the vertical scan circuit 406 and the value of the combined voltage signal (VD+VS) output from the voltage amplifying transistor QA of the pixel most distance from the vertical scan circuit 406, even if the combined dark current signal (ID+$I_{off}$) which is stored in the voltage-to-current conversion MOS transistors $QR_1$ and $QR_2$ is subtracted from the combined light current signal (ID+IS+$I_{off}$), a deterioration could occur in the S/N ratio of the video signal.

To solve the above problem, the combined voltage signal storage capacitors $CS_1$ and $CS_2$ and the switching MOS transistors $QW_1$ and $QW_2$ are provided on the vertical source lines 402a and 402b, so that immediately after the electrical charge from the photodiode is transferred to the gate (control region) of the voltage amplifying transistor QA, the combined voltage signal (VD+VS) is output from each of the voltage amplifying transistors QA, this being stored in the combined voltage signal storage capacitors $CS_1$ and $CS_2$.

Sixteenth Embodiment

Figure 29:
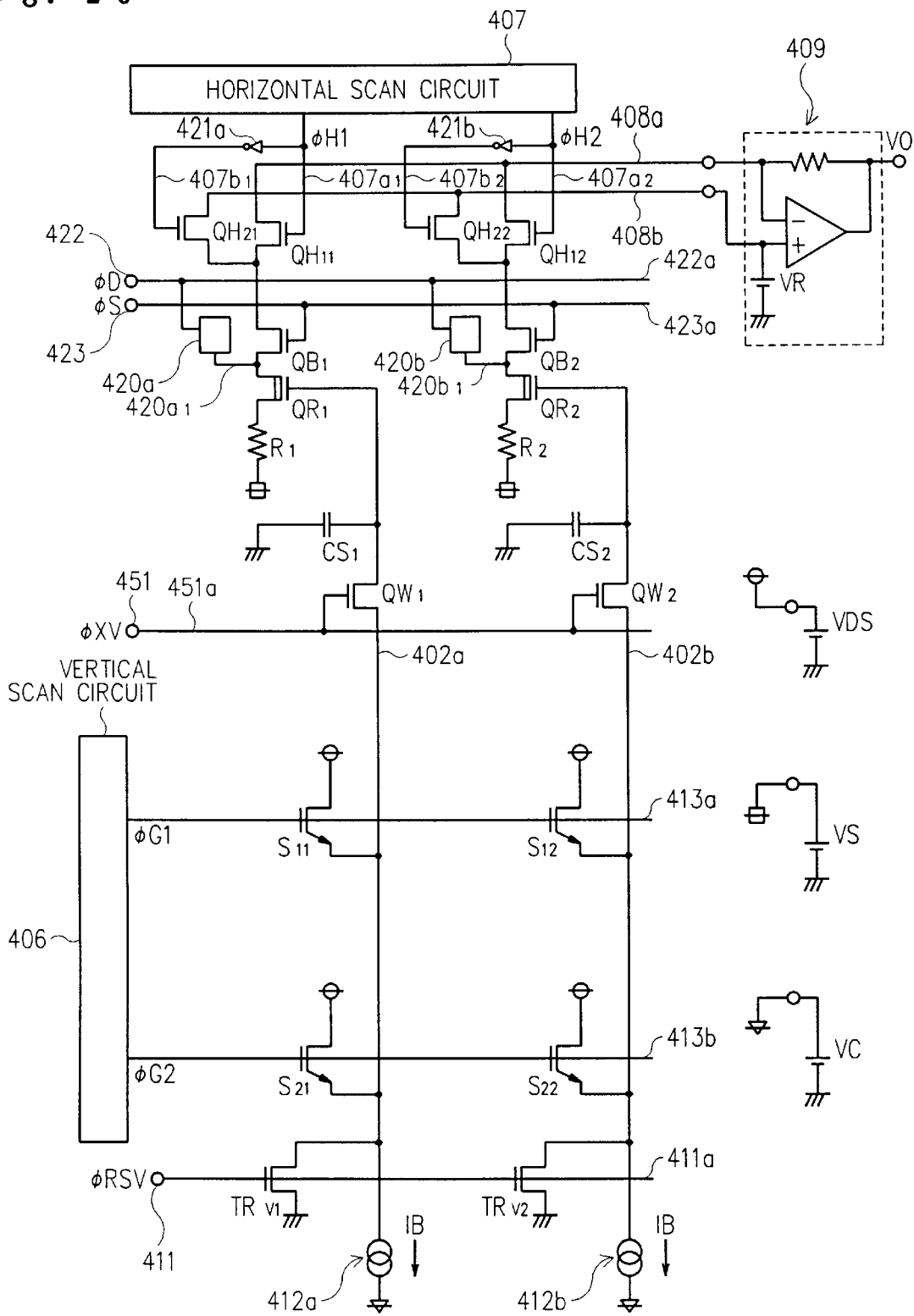
FIG. 29 is a schematic circuit diagram which shows the general configuration of the sixteenth embodiment of a solid-state image pickup device according to the present invention.

FIG. 29 is a schematic circuit diagram which shows the general configuration of the sixteenth embodiment of a solid-state image pickup device according to the present invention. In the same manner as the solid-state image pickup device described in relation to FIG. 28, the solid-state image pickup device, which is the sixteenth embodiment, in addition to being provided with dark voltage signal storage capacitors $CD_1$ and $CD_2$, one end of each of which is grounded, and switching MOS transistors $QW_1$ and $QW_2$ for the purpose of controlling the discharging of these dark voltage signal storage capacitors $CD_1$ and $CD_2$, it uses MOS static induction transistors (MOSSITs, otherwise referred to simply as SITs) $S_{11}$, $S_{12}$, $S_{21}$, and $S_{22}$ which have a photoelectric conversion section as each pixel, this point being the difference of this sixteenth embodiment with respect to other embodiments. In FIG. 29, elements which are the same as shown in FIG. 27 have been assigned the same reference symbols, and will not be described herein.

In the solid-state image pickup device which is shown in FIG. 29, because the pixels $S_{11}$, $S_{12}$, $S_{21}$, and $S_{22}$ are SIT transistors, it is difficult after outputting the dark voltage VD to output the combined voltage signal (VD+VS). For this reason, when using SITs as pixels, first the drive pulse ΦG having a readout level $VG_2$ is applied to a pixel of a row which is selected by the vertical scan circuit 406, causing the combined voltage signal (VD+VS) of the selected row to be output to the vertical source lines 402a and 402b, so that the voltage-to-current conversion MOS transistors $QR_1$ and $QR_2$ stores the combined light current signal (IS+IS+$I_{off}$), which is the combination of the light current signal (ID+IS) responsive to the combined light voltage signal (VD+VS) and the offset current $I_{off}$ in the current-storage circuits 420a and 420b.

Next, the drive pulse ΦG having a resetting level $VG_3$ is applied to a pixel of a row which is selected by the vertical scan circuit 406, thereby performing resetting of the pixel of the selected row. As a result, the dark voltage signal VD is output from the pixels $S_{11}$, $S_{12}$, $S_{21}$, and $S_{22}$, this dark voltage signal VD being stored in the dark voltage storage capacitors $CD_1$ and $CD_2$, after which the drive pulse ΦXV is applied from the drive pulse generating circuit 451 to the gate electrodes of the switching MOS transistors $QW_1$ and $QW_2$ via the clock line 451a, thereby placing the switching MOS transistors $QW_1$ and $QW_2$ into the cutoff (off) condition.

By doing this, in the same manner as the solid-state image pickup device of the fifteenth embodiment, which was described with relation to FIG. 28, when outputting the video signal (time period $t_{16}$ or time period $t_{26}$ in FIG. 25) even if the sequential readout from the vertical source line is started from a pixel which is close to the vertical scan circuit 406, since the combined voltage signal (VD+VS) value does not change, deterioration of the S/N ratio of the video signal is prevented.

Because the switching MOS transistors $QW_1$ and $QW_2$ are in the cutoff (off) condition, so that the dark voltage storage capacitors $CD_1$ and $CD_2$ are in the floating condition, during this period of time each of the fixed-current sources 412a and 412b can be turned off, thereby enabling a reduction in power consumption.

While the thirteenth through the sixteenth embodiments of the present invention were described for the case of using depletion-type MOS transistors as the voltage-to-current conversion MOS transistors $QR_1$ and $R_2$, it is of course possible to use instead enhancement-type MOS transistors or junction field-effect transistors.

Because, in the present invention as described above, one of a voltage signal consisting of a first signal component and voltage signal consisting of a second signal component output from a plurality of pixels is converted to a current signal by a voltage-to-current conversion means, a current signal which is responsive to the sum of the converted current signal and the characteristic offset current which flows in the voltage-to-current conversion means itself being stored in a current-storage means, after which the other of the voltage signal consisting of the first signal component or the second signal component output from a plurality of pixels is converted to a current signal by the voltage-to-current conversion means, a current signal being output which is obtained by a conversion from a voltage signal (video signal) consisting of a component which is responsive to the amount of incident light, which is obtained by a subtraction between the current signal which is responsive to the sum of this converted current signal and the characteristic offset current which flows in the voltage-to-current conversion means itself and the current signal which had already been stored in the current-storage means, so that parasitic capacitance is not caused to exist on the horizontal read line, this enabling elimination of the time require for the charging and resetting thereof, thus enabling high-speed readout of the video signal.

In this invention, because the video signal readout to the horizontal read line is a current signal, because there is no charge distribution caused by a parasitic capacitance, an effect produced is that of being able to obtain a good video signal S/N ratio.

Additionally, because there is no influence had by a parasitic capacitance on the horizontal read line, there is no deterioration of performance by increasing the number of pixels, thereby facilitating an increase in the number of pixels.

Because an output circuit having a low input impedance can be used, another effect produced is that of being able to reduce induced noise.

What is claimed is:

1. A solid-state image pickup device comprising:

a plurality of pixels which are arranged in a two-dimensional matrix in row and column directions, and each of which converts an electrical charge responsive to incident light to a voltage signal and outputs said signal;

a plurality of first read lines for scanning pixels belonging to each column sequentially in the column direction so as to sequentially extract voltage signals from said pixels, each of said first read lines scanning each pixel belonging to same row substantially simultaneously;

a second read line for scanning said first read lines in the row direction so as to extract a time series of voltage signals from each row of said pixels;

a plurality of first storage portions respectively provided for said plurality of first read lines, each of which stores a voltage signal which is output from the corresponding pixel to which said first corresponding read line is connected when the pixel is scanned, said first storage portion being provided for each of said first read lines;

a plurality of first switching portions respectively provided for said plurality of first read lines, each of which is connected to each of said corresponding first storage portions, and each of which controls the storage and resetting operations of said corresponding first storage portion;

a plurality of voltage-to-current conversion portions respectively provided for said plurality of first read lines, by sequentially controlling said corresponding first switching portion and each pixel in each row, each making each of said pixels output, at different times, a first voltage signal which corresponds to the sum of output corresponding to an amount of incident light and a dark output, and second voltage signal which corresponds to the dark output, and for making said first storage portion store one of said first and second voltage signals, said voltage-to-current conversion portion converting the voltage signal which is obtained from a subtraction and corresponds to the amount of the incident light into a current signal, said subtraction being performed between the other of said first and second voltage signals and the voltage signal which has already been stored in said first storage portion, after which said voltage-to-current conversion portion outputs said current signal; and a plurality of second switching portions respectively provided between said corresponding voltage-to-current conversion portions and said second read line.

2. A solid-state image pickup device according to claim 1, wherein each of said second switching portions sequentially reads the current signal output from said corresponding voltage-to-current conversion portion to said second read line.

3. A solid-state image pickup device according to claim 1, wherein each of said pixels comprises:

a photoelectric conversion element which generates and stores an electrical charge which is responsive to the incident light;

an amplifying element which generates a voltage signal which is responsive to an electrical charge that is received by its control region;

a transfer control element for selectively transferring the electrical charge which is stored by said photoelectric conversion element to the control region of said amplifying element; and a resetting element for selectively initializing the electrical charge which is received by the control region of said amplifying element.

* * * * *